US009614279B2

(12) United States Patent
McDevitt et al.

(10) Patent No.: US 9,614,279 B2
(45) Date of Patent: Apr. 4, 2017

(54) PORTABLE APPARATUS AND ASSOCIATED METHOD FOR PHASED ARRAY FIELD CALIBRATION

(71) Applicant: Raytheon Company, Waltham, MA (US)

(72) Inventors: Thomas J. McDevitt, Natick, MA (US); David A. Brennan, Maynard, MA (US); Curtis Combs, Guntersville, AL (US); Christopher A. Hamner, Huntsville, AL (US); Macdonald J. Andrews, East Douglas, MA (US); Joseph D. Corn, Grafton, MA (US)

(73) Assignee: Raytheon Company, Waltham, MA (US)

( * ) Notice: Subject to any disclaimer, the term of this patent is extended or adjusted under 35 U.S.C. 154(b) by 437 days.

(21) Appl. No.: 14/456,266

(22) Filed: Aug. 11, 2014

(65) Prior Publication Data

US 2016/0043465 A1    Feb. 11, 2016

(51) Int. Cl.
    *H01Q 3/00*    (2006.01)
    *H01Q 3/26*    (2006.01)
    *H01Q 3/36*    (2006.01)
    *G01S 7/40*    (2006.01)
    *G01S 13/74*   (2006.01)
    (Continued)

(52) U.S. Cl.
    CPC ............ *H01Q 3/267* (2013.01); *G01S 7/4026* (2013.01); *G01S 13/74* (2013.01); *G01S 13/79* (2013.01); *G01S 13/91* (2013.01); *H01Q 3/36* (2013.01); *G01S 2007/4082* (2013.01); *G01S 2013/0254* (2013.01)

(58) Field of Classification Search
    CPC . H01Q 3/00; H01Q 3/267; H01Q 3/36; G01S 2013/0254; G01S 7/4026; G01S 13/74; G01S 13/79; G01S 13/11; G01S 2007/4082; G01S 7/40
    USPC .................................................. 342/368, 174
    See application file for complete search history.

(56) References Cited

U.S. PATENT DOCUMENTS 6,252,542 B1    6/2001  Sikina et al.
6,535,734 B1    3/2003  Miller et al.
(Continued)

OTHER PUBLICATIONS

Ellgardt; "Wide-Angle Scanning Wide-Band Phased Array Antennas," KTH School of Electrical Engineering, Stockholm, Sweden; May 2009; 62 pages.

(Continued)

*Primary Examiner* — Harry Liu
(74) *Attorney, Agent, or Firm* — Daly, Crowley, Mofford & Durkee, LLP

(57) ABSTRACT

A system for calibrating an array antenna comprises a calibration antenna at a first location relative to an array antenna, a first set of calibration files, and a processor. Based on received far field data from a far field data test that was run on the array antenna, using the calibration antenna, the processor is configured to generate a model predicting the actual location of the calibration antenna relative to the array antenna and to generate predicted far field data based on the model. The model is adjusted, if needed, by comparing the predicted far field data with the received far field data. Based on the model, new calibration files are generated that substantially correlate to the actual location of the calibration antenna.

20 Claims, 41 Drawing Sheets

(51) Int. Cl.
*G01S 13/79* (2006.01)
*G01S 13/91* (2006.01)
*G01S 13/02* (2006.01)

(56) References Cited

U.S. PATENT DOCUMENTS

| | | | |
|---|---|---|---|
| 6,768,455 | B1 | 7/2004 | Werntz et al. |
| 7,119,739 | B1 * | 10/2006 | Struckman ............. G01R 29/10 |
| | | | 342/174 |
| 7,362,266 | B2 | 4/2008 | Collinson |
| 7,768,453 | B2 | 8/2010 | Mason et al. |
| 8,013,783 | B2 | 9/2011 | Lomes et al. |
| 8,154,452 | B2 | 4/2012 | Webb |
| 8,199,048 | B1 | 6/2012 | Medina Sanchez |
| 2011/0006949 | A1 | 1/2011 | Webb |
| 2012/0139776 | A1 * | 6/2012 | Malmqvist ............. H01Q 3/267 |
| | | | 342/174 |

OTHER PUBLICATIONS

Hampson et al.; "A Fast and Accurate Scheme for Calibration of Active Phased-Array Antennas;" IEEE APS Symposium, Orlando; Jan. 1999; 4 pages.

Rabinovich et al; "Typical Array Geometries and Basic Beam Steering Methods;" *Antenna Arrays and Automotive Applications*, Springer Science and Business Media, New York; Jan. 2013; pp. 23-54.

* cited by examiner

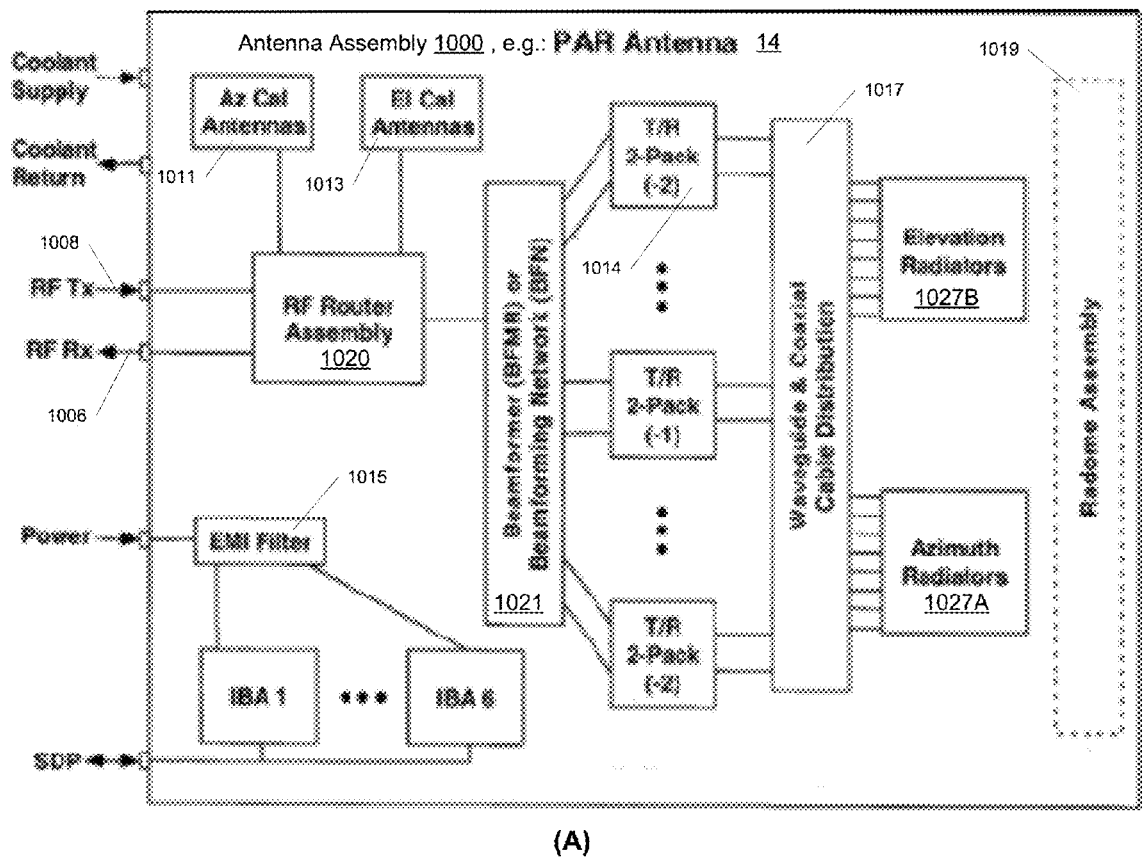
(A)
PRIOR ART
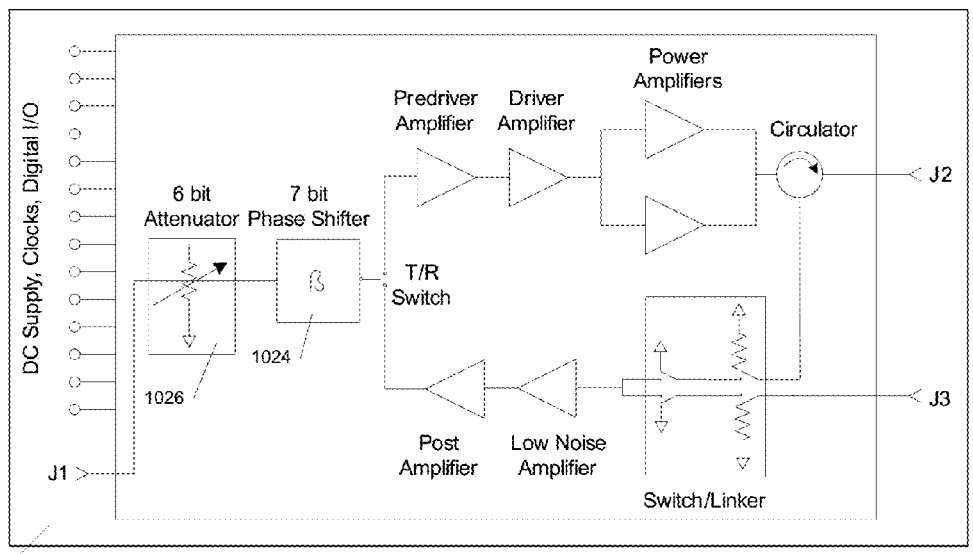
(B)
FIG. 1

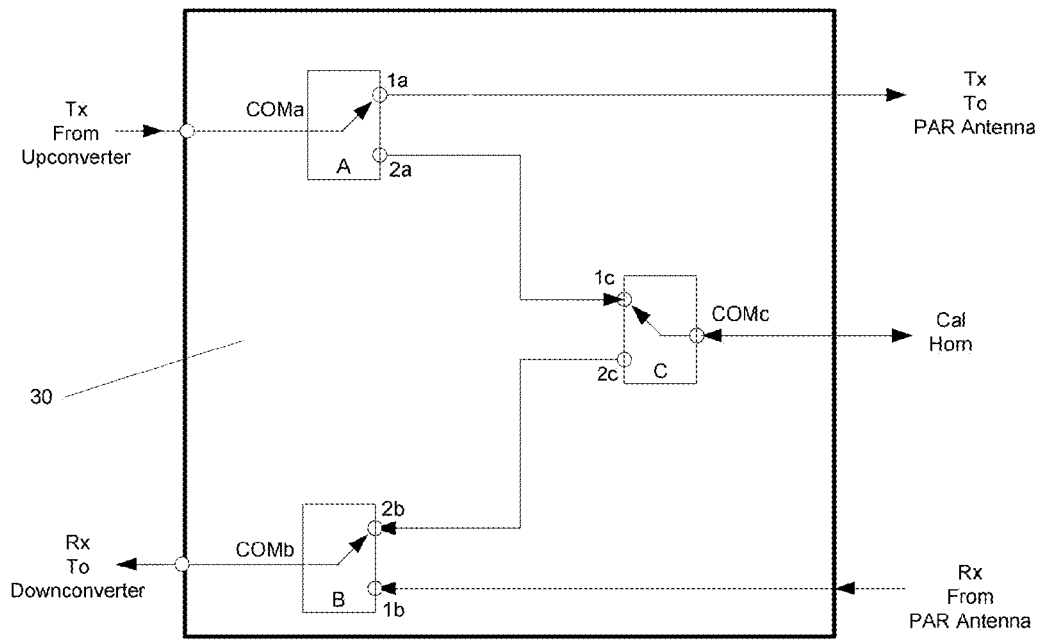
(B)
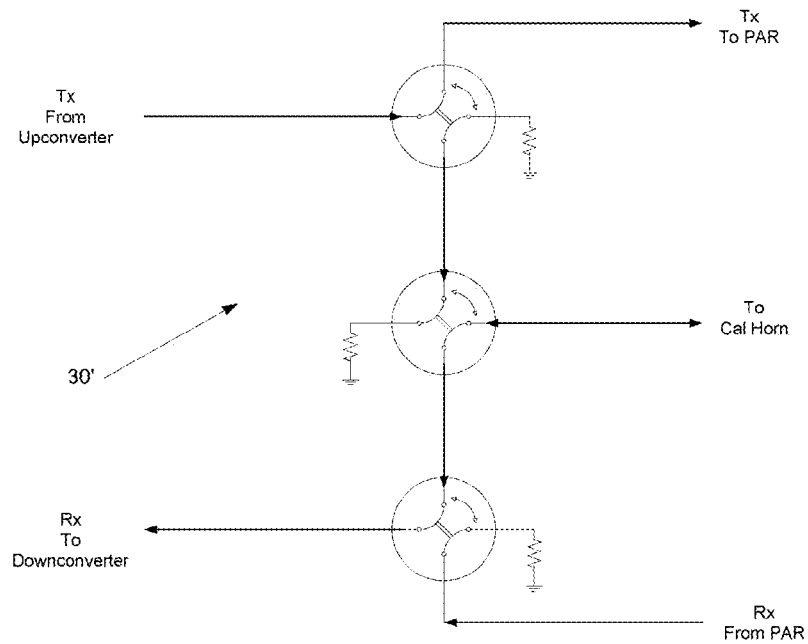
Manual rotary switch implementation
(C)
FIG. 4

Table 1 – Super Element Pattern Structure

| | Angle 1 | Gain 2 | Gain 3 | Phase 4 | Phase 5 |
|---|---|---|---|---|---|
| 1 | 0 | 0 | 0 | 248.7673 | 247.9986 |
| 2 | 1 | -0.0016 | -0.0059 | 248.7674 | 248.0001 |
| 3 | 2 | -0.0065 | -0.0237 | 248.7670 | 248.0041 |
| 4 | 3 | -0.0146 | -0.0532 | 248.7664 | 248.0109 |
| 5 | 4 | -0.0260 | -0.0947 | 248.7656 | 248.0203 |
| 6 | 5 | -0.0406 | -0.1480 | 248.7647 | 248.0325 |
| 7 | 6 | -0.0585 | -0.2132 | 248.7636 | 248.0474 |
| 8 | 7 | -0.0796 | -0.2903 | 248.7625 | 248.0651 |
| 9 | 8 | -0.1040 | -0.3795 | 248.7613 | 248.0856 |
| 10 | 9 | -0.1316 | -0.4807 | 248.7603 | 248.1089 |
| 11 | 10 | -0.1625 | -0.5940 | 248.7594 | 248.1351 |
| 12 | 11 | -0.1967 | -0.7194 | 248.7589 | 248.1642 |
| 13 | 12 | -0.2342 | -0.8572 | 248.7587 | 248.1962 |

Super Element Radiation Pattern

Azimuth Amplitude Delta Values Needing Adjustment

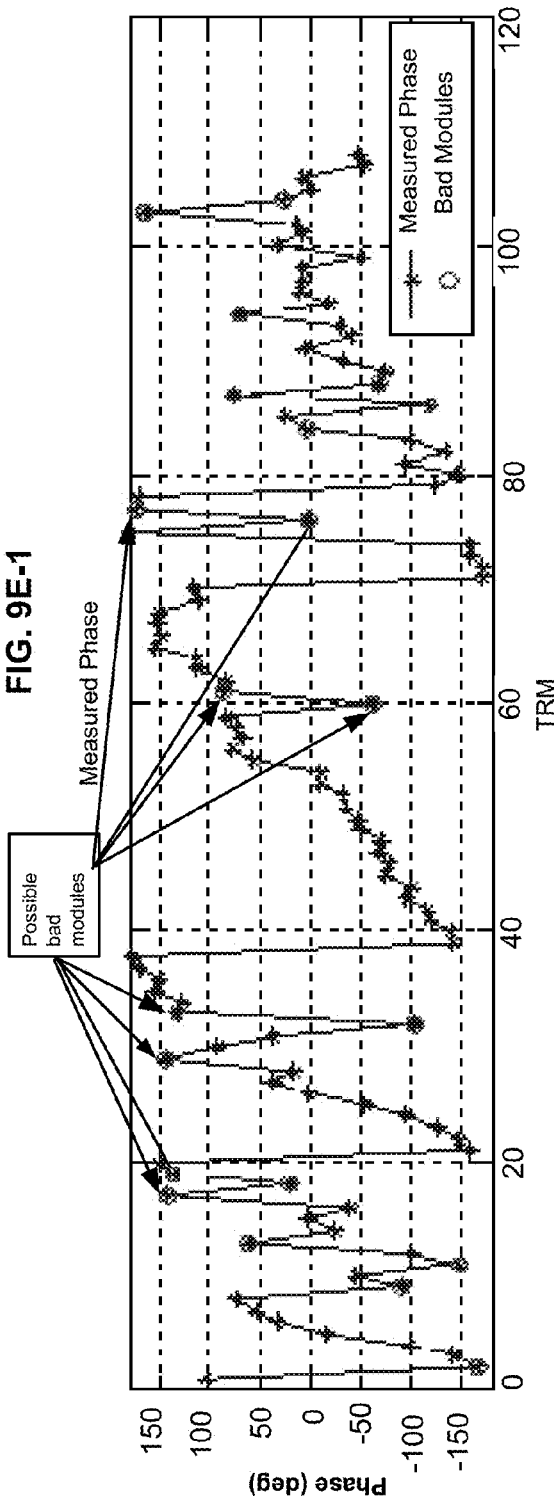
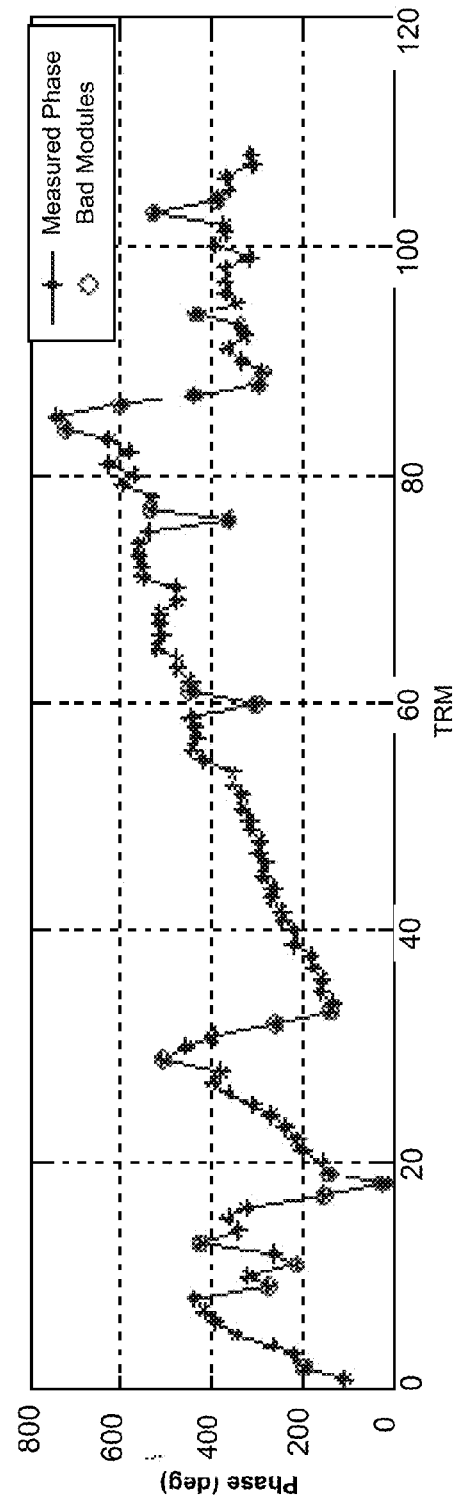
FIG. 9E-1
FIG. 9E-2

FIG. 9G-1
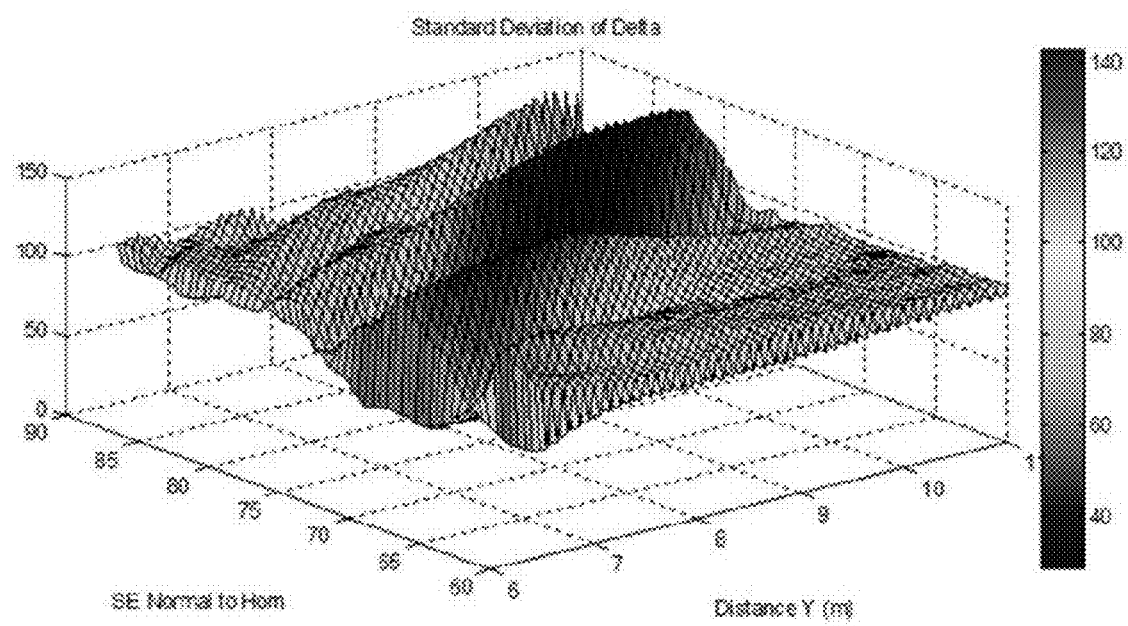
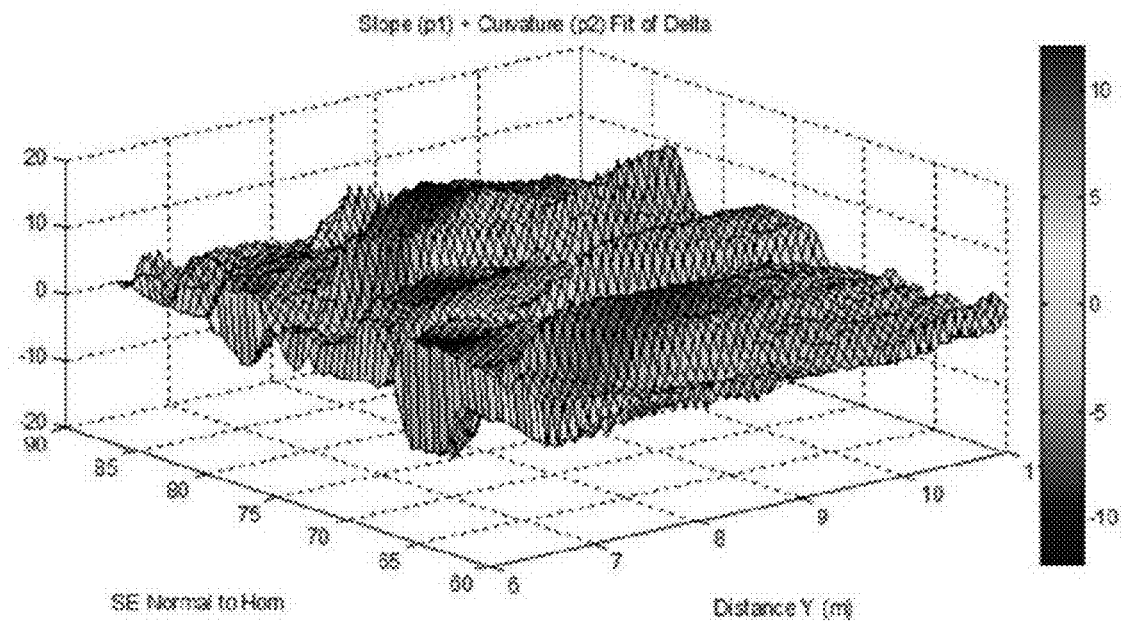
*FIG. 9G -2*

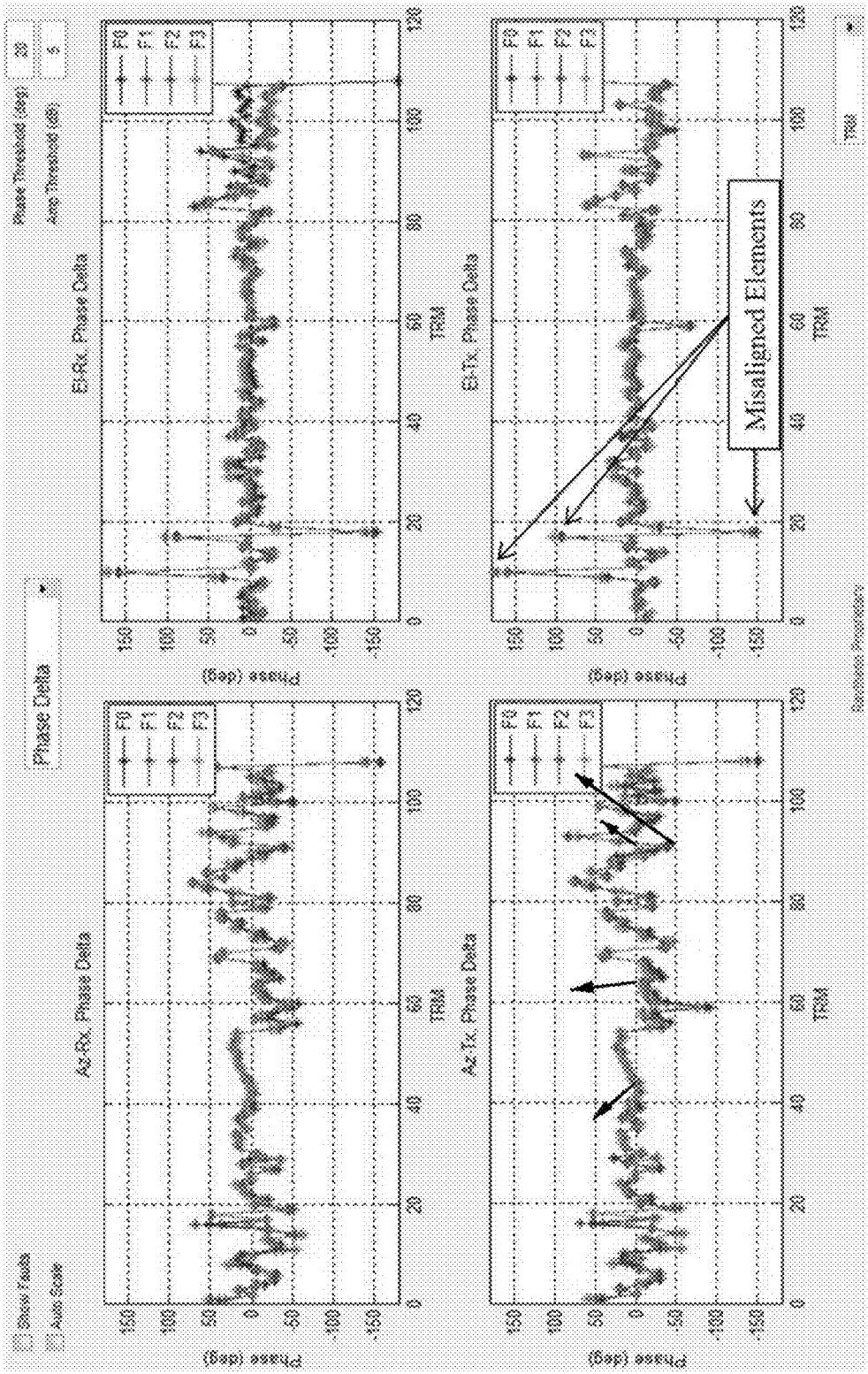

PORTABLE APPARATUS AND ASSOCIATED METHOD FOR PHASED ARRAY FIELD CALIBRATION

STATEMENT REGARDING FEDERALLY SPONSORED RESEARCH

This invention was made with Government support under contract number W31P4Q-11-C-0177, Task Delivery Order 30, awarded by the US Army. The government has certain rights in the invention. This contract is hereby incorporated by reference.

FIELD

Embodiments described herein relate to calibration of antennas. At least some of the described embodiments relate to methods and devices for portable calibration and recalibration of phased array antennas in the field.

BACKGROUND

A phased array antenna is an array of antennas in which the relative phases of the respective signals feeding the antennas are varied in such a way that the effective radiation pattern of the array is reinforced in a desired direction and suppressed in undesired directions. During transmission, phased array antenna systems can use multiple individual antennas (or, in some instance, subarrays of antennas), where each antenna is separately energized in such a way that the multiple individual antenna elements cooperate to produce a transmitted electromagnetic wave that is highly directional. The relative phases and amplitudes of signals feeding the antenna elements may be varied to steer the transmitted electromagnetic wave (e.g., a radiation pattern) in a particular direction. An exemplary phased array antenna includes a plurality of active circuits spaced apart from each other by known distances. Each of the active circuits is coupled through a plurality of phase shifter circuits, amplifier circuits and/or other circuits to either or both of a transmitter and receiver. In some cases, the phase shifter, amplifier circuits and other circuits (e.g., mixer circuits) are provided in a so-called transmit/receive (T/R) module and are considered to be part of the transmitter and/or receiver.

With a phased array antenna, each individual antenna element (or sub array) radiates energy at a different phase, respectively. Thus, the phased array can produce an equi-phase beam front or cumulative wave front of electromagnetic energy that can travel in a given direction. The given direction in which the wave or beam travels depends at least in part on the differences in phase or timing of the signals activating the antenna. Similarly, when a phased array is receiving energy, the individual antennas in the phased array detect the return beams of energy, and analysis of the return beam phase helps to determine the direction of arrival of a return beam.

A phased array requires proper calibration for the signal path of each element. In some instances, the production facility performs an initial calibration of the phased array. This initial calibration can require precisely positioned measurement equipment. During the initial calibration that is part of the manufacturing process, near-field or far-field sources can be used for calibration of phased arrays. After the antenna is deployed in the field, calibration may need to be performed again to compensate for defective elements, changes in element performance over time (e.g., graceful degradation over time), environmental factors (e.g., wind, temperature, or other influencing factors), etc. Calibration in the field also may be required to change or maintain desired radiation pattern characteristics, implement changes to the antenna, and implement other changes to maintain overall antenna performance. For example, after the phased array antenna has been out in the field, one or more of the phased array elements may degrade or fail over time and may need to be replaced in the field. After repair or adjustment to the phased array, there might be a need to perform calibration of the phased array when one or more components that affect the signal path characteristics of the phased array are replaced.

SUMMARY

The following presents a simplified summary in order to provide a basic understanding of one or more aspects of the embodiments described herein. This summary is not an extensive overview of the embodiments, and is neither intended to identify key or critical elements of the embodiments, nor to delineate the scope thereof. Rather, the primary purpose of the summary is to present some concepts of the embodiments described herein in a simplified form as a prelude to the more detailed description that is presented later.

There are several ways to calibrate (or recalibrate) fielded phased arrays. One way requires shipping the phased array back to a production facility. Production facilities are able to use expensive, high precision scanners that position a calibration antenna over each radiating element of a phased array. Shipping a phased array back to a production facility to use this equipment, however, can be costly, time-consuming, and can result in a long down time of both the equipment being calibrated and production resources. Another option for calibrating fielded phased arrays is to install permanent calibration equipment at the site of the phased array (or even as part of the phased array itself). This option can result in a more complicated equipment siting process and an increased unit cost. Installing permanent calibration equipment also may not be feasible for transportable or low cost systems. Still another option for calibrating fielded phased arrays involves positioning external calibration equipment adjacent to each antenna element, in turn, while ensuring precise positioning of the calibration equipment (e.g., ensuring that external calibration equipment is always the exact same distance from an antenna element and located at its optical center). The accuracy of this option depends on precise and complex alignment of the calibration equipment to the antenna element, which can be both expensive and time consuming.

Whether at the production facility or at the fielded phased array site, calibration of phased arrays after fielding can be performed using near-field or far field sources, or by internally distributed reference calibration signals. Use of internally distributed reference calibration signals can add complexity, cost, and weight to the antenna system. Use of external antennas or probes can also add weight and complexity and can be subject to multipath reflections and external interference. In addition, as noted above, many known external calibration antennas require precise positioning of the external antenna for proper calibration.

During some types of calibration and maintenance of fielded phased arrays, the antenna is taken offline to undergo phase and amplitude testing and calibration. With other types of calibration methods (e.g., mutual coupling methods), the antenna may not need to be taken out of service during calibration because the mutual coupling calibration method uses the inherent mutual coupling among radiating elements to perform an on-board, automatic calibration of the array. Some mutual coupling methods use regular antenna elements for calibration, such that, during testing, these elements are dedicated to calibration only. Other mutual coupling methods add in additional antenna elements in the array that are used only for calibration. The latter method can add cost and weight to the array.

In addition, with either of the above-described mutual coupling methods (where elements being used for calibration are "packed in" with the regular antenna elements), one issue is that the calibration elements are located beside the elements that they are calibrating, instead of facing the elements. This means that when signals are transmitted back and forth between the calibration elements and the regular antenna elements (i.e., the antenna elements being calibrated), the calibration elements and regular elements are at a high angle to each other. Thus, the calibration elements are not in the main beam of the radiating elements. This method of calibrating can decrease the accuracy of the calibration, and may not result in reliable amplitude and phase measurement. Another issue with using mutual coupling calibration approaches that have "built in" calibration elements is that, because no external calibration antenna is used, the phased array antenna is, effectively, being used to measure itself. Thus, it is possible that misaligned elements could be used in the calibration process, which can affect calibration of all the other elements.

In one embodiment, an embodiment of a portable phased array calibration system and method provides advantages over prior art calibration systems and methods. For example, in one embodiment, a portable calibration kit is provided that can be reused at different equipment sites (i.e., sites with antennas to be calibrated). The portable calibration kit can provides a lower lost solution than sending the array back to a production facility for calibration, and, because the portable calibration is not built into the array (and does not require specially dedicated array elements for calibration), the unit cost of production for the antenna arrays can be decreased. Furthermore, by allowing maintenance of the antenna array to be performed "on site" (i.e., at the deployment site of the antenna array), down-trine of the array and its associated equipment (e.g., radar, communications equipment, computers, etc.) is decreased. In addition, in at least one embodiment, precise positioning of the external calibration antenna is not required. The systems, apparatuses, and methods described herein are applicable to many different types of array antenna systems, including many types of phased array systems.

In one embodiment, a method is described that uses existing calibrated elements to help determine, to a high degree of accuracy, the test setup and test geometry, where the method calculates ideal calibration values using the test setup information. In one disclosed embodiment, failed and/or misaligned antenna elements are identified by comparing their test data with ideal values, where the calibration results are presented in a format that can allow detection of equipment failures and calibration of antenna elements, where the calibration is performed, in one embodiment, by updating a calibration file.

In a further embodiment, the methods, systems, and apparatuses described herein are applicable to a near field test arrangement. In this arrangement, the distance of the calibration antenna is in the far field of an individual phased array antenna element (not the far field of the entire array). The calibration method of this embodiment, in one embodiment, is used for calibrating "from scratch" (i.e., without use of a prior calibration and/or without reference to a prior calibration) if precise measurement equipment is used to position the calibration antenna and antenna under test (one time). This would allow, for example, a production facility to perform calibration without a scanning device that may be required to be precisely positioned in front of each element of the phased array.

In one embodiment, a system for calibrating an array antenna is provided, the system comprising:

a calibration antenna positioned at a first location relative to the array antenna, and operably configured to be used as part of a far field test conducted on the array antenna, wherein the first location corresponds to an estimate of an actual location of the calibration antenna relative to the array antenna;

a first set of calibration files usable during at least one of calibration and operation of the array antenna; and a processor in operable communication with the array antenna, the first set of calibration files and the calibration antenna.

The processor accesses a memory storing instructions that, when executed, configure the processor to:

(a) generate a model of a predicted calibration configuration of the calibration antenna and the array antenna, the model based at least in part on the first location, the first set of calibration files, and a first set of received far field test data generated during a first far field data test run using the first set of calibration files, wherein the model defines a predicted calibration configuration comprising information related to a prediction of the actual location for the calibration antenna relative to the array antenna during the first far field calibration test;

(b) adjust the model, if necessary, based at least in part on comparing a set of predicted far field test data generated using the model with the first set of received far field test data, the adjustment of the model configured to decrease at least a portion of a difference between at least a portion of the predicted set of far field data and the corresponding portion of the first set of received far field data; and (c) generate, based at least in part on the model, a second set of calibration files usable to replace at least a portion of the first set of calibration files.

In a further embodiment, wherein the instructions further configure the processor to identify, based at least in part on at least one of the models, the first set of received far field test data, and the predicted set of far field test data, whether one or more hardware components of the antenna array require at least one of replacement and adjustment.

In another embodiment, if at least one hardware component of the antenna array is adjusted or replaced, the instructions further cause the far field data test to be repeated using the second set of calibration files in place of at least a portion of the first set of calibration files; to result in a second set of far field data, and wherein the instructions further configure the processor to repeat steps (a) through (c), using the second set of far field data and the second set of calibration files, to adjust, if necessary, the first model, and to adjust, if necessary, the second set of calibration files.

In another embodiment, the instructions farther configure the processor to remove at least one outlier from the received far field data results before generating the first model. In another embodiment, the array antenna comprises a plurality of antenna elements and wherein the model is generated based at least in part using an assumption that a predetermined portion of the antenna elements having substantially good calibration. In another embodiment, the instructions further configure the processor to: identify at least one outlier in the first set of received far field test data, the outlier comprising at least one of an amplitude outlier, a phase outlier, and a frequency outlier; and determine, based at least in part on the identified outlier, whether one or more hardware components that comprise the antenna array require either replacement or adjustment.

In another embodiment, the prediction of the actual location comprises an approximate predetermined position, within a predetermined model range of positions; and the model is based at least in part on determining a position, within the predetermined model range of position, where at least a portion of a set of received far field test data for that position best matches to a corresponding portion of predicted far field test data for that position.

In another aspect, a system for calibrating an array antenna is provided, the system comprising:

a calibration antenna positioned at an actual location relative to an array antenna, the calibration antenna operably configured to be used as part of a far field test data test conducted on the array antenna;

a first set of calibration files usable during at least one of calibration and operation of the array antenna; and a processor in operable communication with the first set of calibration files and further in operable communication with and operable control of the array antenna and the calibration antenna, wherein the actual location of the calibration antenna is not known to the processor.

The processor accesses a memory storing instructions that, when executed, configure the processor to:

analyze a set of received far field data test generated during a far field data test, to determine if one or more data outliers exist and, if necessary, to remove at least one outlier from the far field test data results, to generate a set of processed received far field test data;

generate, based at least in part on the set of processed received far field test data, one or more curves that approximately match the set of processed received far field test data;

generate, based at least in part on the one or more curves, a first model corresponding to a second calibration configuration of the calibration antenna and array antenna, the second calibration configuration comprising information related to a predicted location for the calibration antenna, the predicated location corresponding substantially to the actual location of the calibration antenna during the far field data test;

generate, based at least in part on the first model, a set of predicted far field data results;

generate a second model for an actual position of the calibration antenna, the second model based at least in part on a comparison between at least a portion of the received far field data results and at least a portion of the set of predicted far field data results;

modify the second model, if necessary, to ensure that the at least a portion of the set of predicted far field test data correlate, within a predetermined threshold, with the set of processed received far field test data;

generate, based at least in part on the second model, a second set of calibration files usable during operation of the array antenna; and replace at least a portion of the first set of calibration files with the second set of calibration files.

In a further embodiment, the instructions further configure the processor to identify at least one outlier in the set of received far field test data, the outlier comprising at least one of an amplitude outlier, a phase outlier, and a frequency outlier; and identify, based at least in part on the identified outlier, at least one hardware component in the antenna array requiring either replacement or adjustment, In another embodiment, the predicted location comprises an approximate predetermined position, within a predetermined model range of positions; and at least one of the first and second models for the actual position of the calibration antenna is based at least in part on finding a position within the predetermined model range of positions, where at least a portion of the set processed received far field test data for that position best matches to a corresponding portion of predicted far field test data for that position. In another embodiment, the instructions configure the processor to update at least one of the first model, second model, and the second set of calibration files if a hardware component of the array antenna has been replaced or adjusted.

In another aspect, a method of calibrating an array antenna is provided, the method comprising:

(a) receiving, at a processor in operable communication with an array antenna and a calibration antenna, a set of far field test data resulting from a far field calibration test run on the array antenna using the calibration antenna, the set of received far field test data comprising data measured using a calibration configuration comprising:

a first set of calibration data files used during at least one of array antenna calibration and operation; and the calibration antenna positioned at a first location relative to the antenna array, the first location comprising an actual location that is unknown to the processor;

(b) processing the set of received far field data to remove at least one outlier from the set of received far field test data, resulting in a set of processed received far field test data;

(c) generating a model based at least in part on the set of processed received far field test data, the model corresponding to a second calibration configuration of the calibration antenna and array antenna, the second calibration, configuration comprising information related to a predicted location for the calibration antenna, the predicated location corresponding substantially to the actual location of the calibration antenna during the far field data test;

(d) generating, based at least in part on the model, a set of predicted far field test data;

(e) modifying the model, if necessary, based at least in part on a comparison between at least a portion of the set of processed received far field data and at least a portion of the set of predicted far field test data, wherein the modification is configured to reduce a difference between at least a portion of the processed received far field test data and at least a portion of the predicted far field test data to within a predetermined threshold; and (f) generating, based at least in part on the model, a second set of calibration files usable to replace at least a portion of the first set of calibration files.

In a further aspect, processing the set of received far field test data to remove at least one outlier further comprises identifying at least one outlier in the set of received far field test data, the outlier comprising at least one of an amplitude outlier, a phase outlier, and a frequency outlier; and determining, based at least in part on the identified outlier, whether one or more hardware components that comprise the antenna array require either replacement or adjustment.

In another aspect, if a hardware component in the array antenna is determined to have been replaced or adjusted, then the method farther comprises causing the far field data test to be repeated using the second set of calibration files to replace at least a portion of the first set of calibration files; and repeating steps (a) through (f). In still further embodiments, the repeating of steps (a) through (f) can be done until at least a predetermined portion of the hardware components requiring replacement or adjustment have been replaced or adjusted.

In another embodiment, the repeating of steps (a) through (f) can be done until one of the following conditions is satisfied:

amplitude and phase measurements within the set of processed received far field test data substantially match amplitude and phase measurements that are predicted based on the second model;

measured amplitude results in the set of processed received far field test data show adequate gain and substantially no saturation;

when two different sets of far field test data are compared, there is substantially no phase data oscillation; and when two different sets of processed received far field test data are compared, phase drift does not exceed a predetermined limit.

In another embodiment, the predicted location comprises an approximate predetermined position, within a predetermined model range of positions; and the model is based at least in part on finding a position, within the predetermined model range of positions, where at least a portion of the set of processed received far field test data for that position best matches to a corresponding portion of predicted far field test data for that position.

In another embodiment, the array antenna comprises a plurality of antenna elements and the model is generated based at least in part using an assumption that a predetermined portion of the antenna elements have substantially good calibration. In another embodiment, the predetermined portion comprises at least half of the antenna elements. In yet another embodiment, the model is further based at least in part on at least one of: the predicted location of the calibration antenna; a predetermined distance between the calibration antenna and the array antenna; and a predetermined distance between individual elements in the antenna array.

In a further embodiment, a system is provided for calibrating a fielded array antenna using an external calibration antenna whose position is trot precisely known. The system comprises:

means for receiving calibration antenna data, the calibration antenna data comprising information relating to the type of calibration antenna and estimated location of the calibration antenna relative to the array antenna;

means for receiving information relating to one or more operation frequencies for the array antenna;

means for receiving information relating to one or more thresholds usable with a model of the calibration arrangement of the calibration antenna and array antenna;

means for receiving results of a far field data test on the antenna array;

means for receiving measured amplitude and phase data;

means for analyzing the calibration antenna data, measured amplitude and phase data, and information relating to operation frequencies, range parameters, model, and thresholds, to generate a calibration antenna position model;

means for verifying validity of the calibration antenna position model, the calibration antenna position model comprising a substantially accurate location of the calibration antenna relative to the array antenna, to generate a verified calibration antenna position model;

means for identifying, based on the verified calibration model, one or more antenna components requiring replacement or adjustment;

means for adjusting at least one of an amplitude and phase calibration file, based at least in part on the verified calibration model; and means for generating a set of calibration files usable for calibration of the fielded array antenna, the set of calibration files, based at least in part on the adjusted at least one of amplitude and phase calibration, and on the verified calibration model.

In a further aspect, any or all of the above-described systems and method can be implemented wholly or partially using executable code embodied on a non-transitory computer-readable medium, the non-transitory computer-readable medium, when operably coupled to a processor, enabling the processor to execute the executable code so as to implement the system or method.

Details relating to these and other embodiments are described more fully herein.

BRIEF DESCRIPTION OF THE DRAWINGS

The advantages and aspects of the described embodiments will be more fully understood in conjunction with the following detailed description and accompanying drawings, in which:

FIG. 1A is an exemplary RF block diagram of an antenna assembly, in accordance with one embodiment;

FIG. 1B is an exemplary block diagram of a transmit/receive (T/R) module used in the antenna assembly of FIG. 1A, in accordance with one embodiment;

FIG. 4B is a block diagram illustrating the details of a first switch matrix usable in a first version of the embodiment of FIG. 4A;

FIG. 4C is a block diagram illustrating the details of a manual rotary switch usable in a second version of the embodiment of FIG. 4A;

FIGS. 9A-1 and 9A-2 are exemplary user interface displays of graphs of elevation phase and azimuth amplitude values, respectively, that may need adjustment, in accordance with one embodiment;

FIGS. 9C-1 and 9C-2 are a pair of graphs showing an example of the results of amplitude outlier detection, in accordance with the method of FIG. 9B;

FIGS. 9E-1 and 9E-2 are a pair of graphs showing an example of the results of phase outlier detection, in accordance with the method of FIG. 9D;

FIGS. 9G-1 and 9G-2 are first and second exemplary statistical analysis graphs associated with the method of FIG. 9F, in accordance with one embodiment;

FIGS. 14A-14D are a user interface display of graphs showing exemplary phase model delta data for different measurement configurations, for the test setup of FIG. 8, in accordance with one embodiment.

The drawings are not to scale, emphasis instead being on illustrating the principles and features of the disclosed embodiments. In addition, in the drawings, like reference numbers indicate like elements.

DETAILED DESCRIPTION

Figure 2:
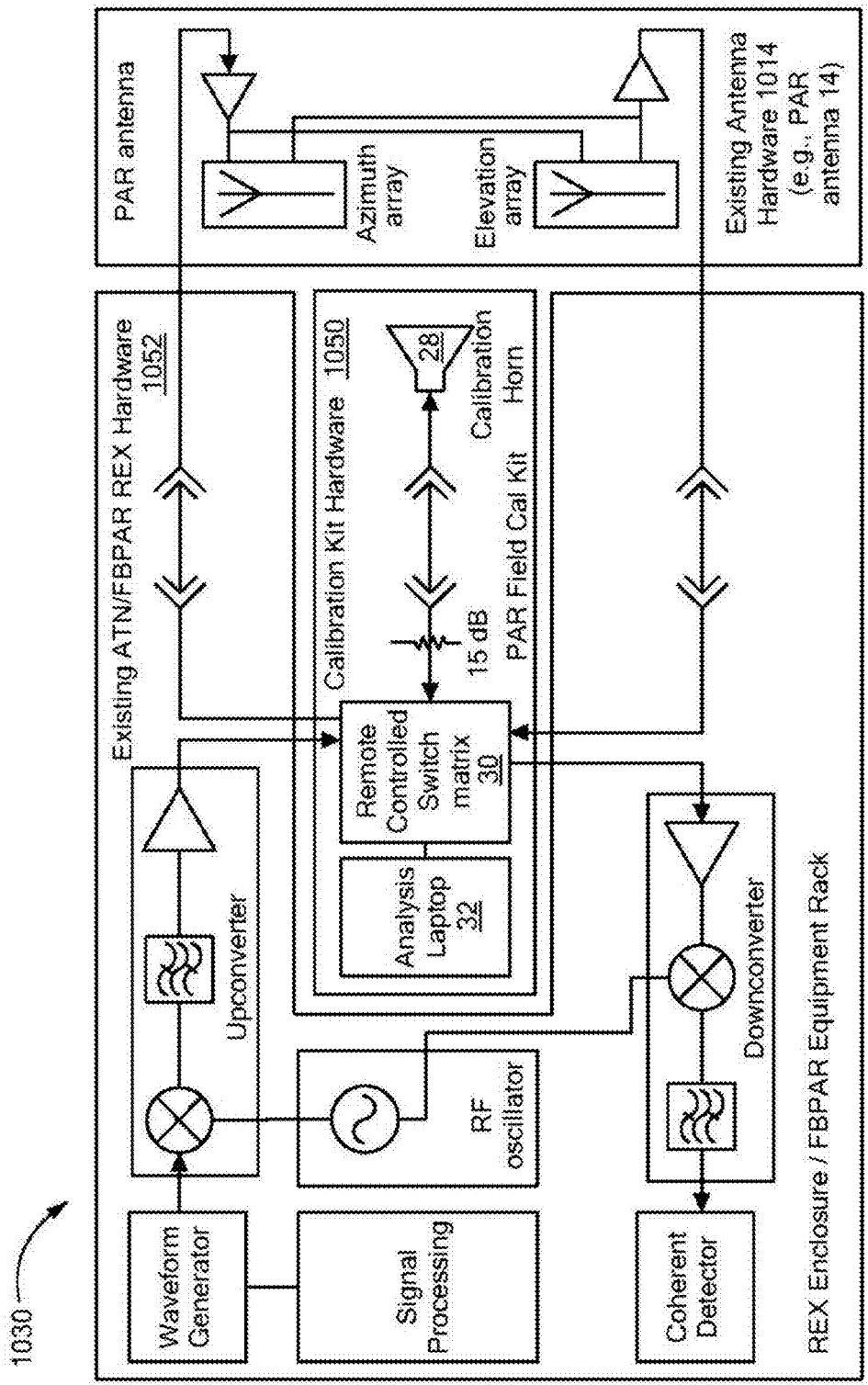
FIG. 2 is a first exemplary functional block diagram of a far field calibration setup usable with an antenna assembly of FIG. 1A, in accordance with one embodiment.

The following detailed description is provided using the context of calibration an exemplary phased array antenna system. The systems, methods, and apparatuses described herein are anticipated to be usable with many different types of antenna systems, including but not limited to phased array systems. In at least one exemplary embodiment, the systems, methods, and apparatuses described herein are used in conjunction with the phased array radar systems of at least one of Raytheon's Air Traffic Navigation, Integration, and Coordination System Precision Approach Radar (ATNAVICS PAR) and its Fixed-Base Precision Approach Radar (FBPAR), but the embodiments described herein are not limited to these systems. Furthermore, at least some of the embodiments described herein are applicable to any devices that incorporate phased array antenna devices, including but not limited to phased array radar systems and phased array communications systems, as well as low-power radars for weather sensing, phased arrays located on airborne vehicles (e.g., wings of planes, rockets, space vehicles, etc.) or on or in devices like projectiles/missiles, phased arrays coupled to satellites, and/or phased arrays used in the commercial/consumer market.

ATNAVICS PAR is a ground-controlled approach system, including air traffic control radar, that is mobile (it is transportable in a single C-130 aircraft or CH-47 helicopter) fully autonomous, and compliant with both the International Civil Aviation Organization (ICAO) and the National Airspace System (NAS) compliant. FBPAR uses the same hardware and software as the ATNAVICS PAR, differing only in its use of a pedestal that rotates to cover six predetermined runway approaches Note, however, that the FBPAR does not radiate when rotating (i.e., when FBPAR changes runways), ATNAVICS does not itself rotate, although. ATNAVICS has an ASR/SSR dish antenna that rotates. As will be appreciated, the radars being tested and described herein are not, in at least some embodiments, rotating during calibration. The PAR antennas for the ATNAVICS and FBPAR systems are, in at least one embodiment, identical.

The ATNAVICS and FBPAR Precision Approach Radar (PAR), like many kinds of array radars, contain passive and active components for which performance will inherently degrade or change over time. In the example of the PAR, although each PAR undergoes a factory near field calibration, the arrays' characteristics may gradually change in the field during use. Consequentially, a far field calibration technique has been developed, in accordance with at least some of the systems, methods, and apparatuses described herein, to perform calibration on fielded array antenna systems. This calibration also is usable to perform initial calibration of new hardware (e.g., as a result of a failed transmit/receive module or other failed component), as will be appreciated.

ATNAVICS and FBPAR each provide surveillance systems capable of controlling and landing all types of fixed and rotary wing aircraft within a 25 nautical mile (NMI) area, with capability of extended range through the use of secondary surveillance radar (SSR) out to 60 NMI. The ATNAVICS and FBPAR each include an X-band phased array antenna that comprises X-Band monolithic microwave integrated circuits (MMICs). Each also includes an S-Band air surveillance radar, and an L-Band secondary surveillance radar/identification friend or foe radar.

Figure 3:
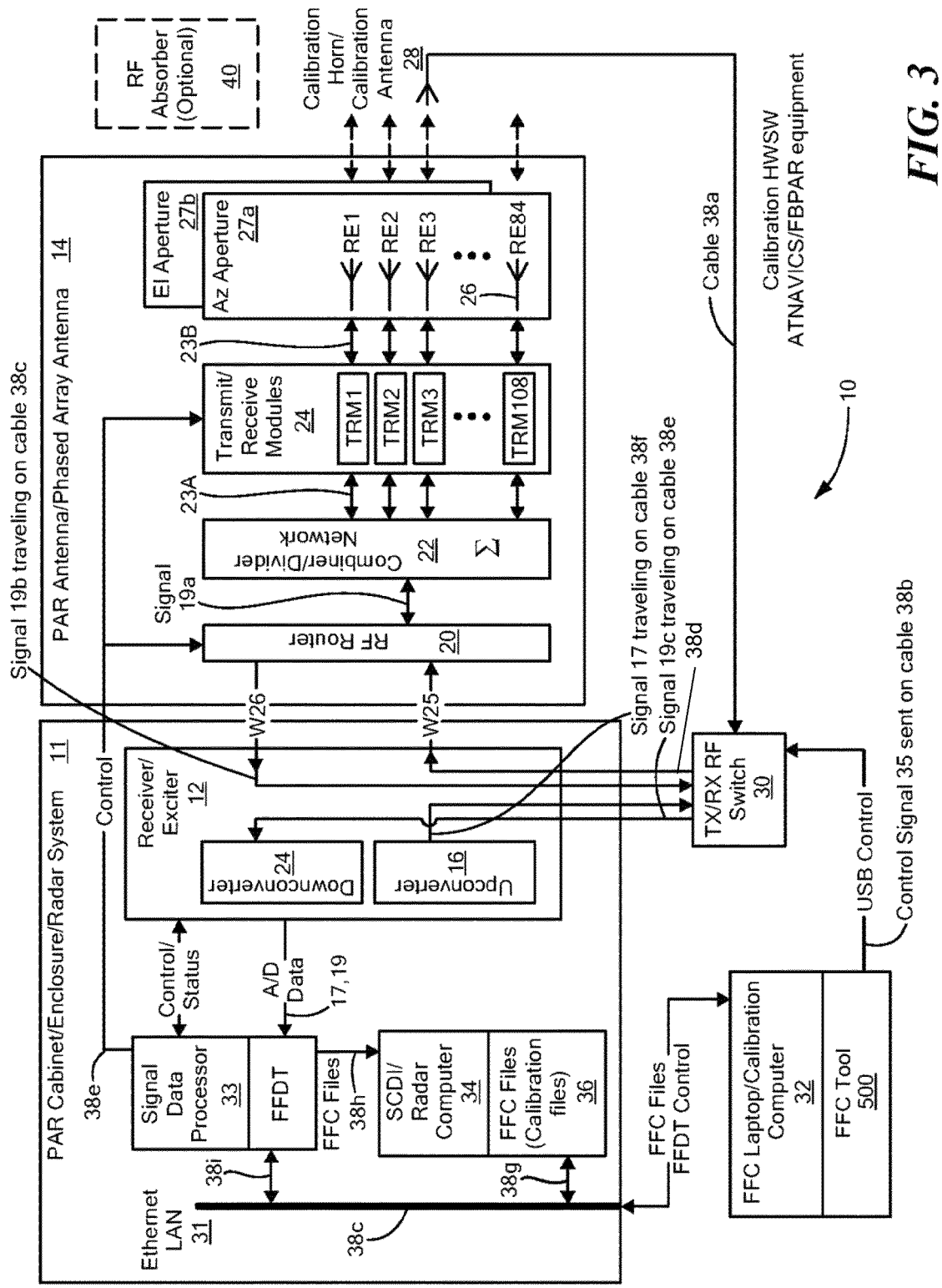
FIG. 3 is a second exemplary block diagram showing further interconnections of a far field calibration setup usable with an antenna assembly of FIG. 1A, using an exemplary PAR antenna, in accordance with one embodiment.

FIG. 1A is an exemplary RF block diagram of an antenna assembly 1000 (e.g., which can be used to implement the ATNAVICS PAR antenna 14 of FIG. 3), in accordance with one embodiment. FIG. 1B is an exemplary block diagram of an exemplary transmit/receive (T/R) module 24 used in the antenna assembly 1000 of FIG. 1A, in accordance with one embodiment.

Referring to FIG. 1A, the exemplary antenna assembly 1000 has two phased array apertures, an. Azimuth Radiator assembly 1027A and an Elevation. Radiator assembly 1028B, which scan the azimuth and elevation planes respectively. A system using the antenna assembly 1000 switches between the two apertures 1027; that is, the azimuth and elevation planes are not scanned simultaneously.

Referring to FIG. 1A, the antenna assembly 1000 has a common path for both, the X-band. Receive (Rx) and X-band Transmit (Tx) waveforms 1006, 1008, respectively. This path comprises, in transmit order, the RF Router Assembly 1020, the Beamformer Network 1021 (made up of six 18:1 Power Dividers/Combiners and one 6:1 Power Divider/Combiner, although neither is illustrated in FIG. 1A); one hundred eight T/R. Modules 24 (see FIG. 1B) that are configured on fifty-four 2-pack assemblies 1014; one Azimuth aperture 1027A made up of four Azimuth Panels, comprising a plurality of Azimuth radiators; and one Elevation aperture 1027B made up of seven Elevation Panels, comprising a plurality of Elevation radiators. There are two types of 2-packs 1014: a so-called "−1 type" in the middle of the array and a "−2 type" in the outer portions of the array. The −1 2-pack 1014 type directs energy to either the azimuth or elevation aperture through the use of a 90-degree hybrid combiner. The −2 type 2-packs 1014 utilize an RF switch at its output.

Although at least some advantageous embodiments are implemented and described in conjunction with a phased array radar like the aforementioned ATNAVICS PAR or FBPAR, none of the embodiments are limited to any particular type, configuration, or frequency band of antenna or antenna. For example, in at least some embodiments, the systems, methods, and apparatuses described herein are applied in connection with antennas formed using linear and/or planar arrays. In such embodiments, the design and test can take into account one or more considerations regarding the layout and spacing of individual radiating elements. In addition, will be appreciated, variations in the antenna design, based on frequency band, size, and other features, can be made, in accordance with the embodiments described herein.

FIG. 1B is an exemplary block diagram of the transmit/receive (T/R) module 24 used in the antenna assembly 1000 of FIG. 1A, in accordance with one embodiment. There are a total of 84 Two-Pack assemblies 1014 in the antenna assembly 1000. Each two-pack 1014 consists of two T/R Modules 24 followed by a Quadrature Hybrid Power Divider/Combiner or a dual channel SPDT Switch. There are 24 Hybrid assemblies (48 T/R Modules) which feed 24 radiating super elements. There are 30 Switch assemblies (60 T/R Modules) which feed 60 radiating super elements.

Referring to FIG. 1B, in the T/R module 24, a 7-bit phase shifter 1024 is used to adjust the phase of each T/R module 24 with respect to the location of that T/R module 24 in the antenna assembly 1000. In this exemplary module of FIG. 1B, the phase quantization is 2.8125° with 360° full range phase shift, but this is not limiting. The phase shifter commands are stored in a corresponding calibration file (these files are discussed further herein). A 6-bit attenuator 1026 is used to adjust the gain of each T/R module 24 to provide amplitude weighting for the receive antenna pattern. In this exemplary T/R module 24, the attenuation control has 0.5 dB resolution and a full attenuation range of 31.5 dB, but this is not limiting. The attenuator commands are stored in a corresponding calibration file.

FIG. 2 is a first exemplary functional block diagram of a far field calibration setup 1030 that is usable with an antenna such as the antenna assembly 1000 of FIG. 1A or the PAR antenna 14 of FIG. 3, in accordance with one embodiment. FIG. 2 also shows how an exemplary calibration kit 1050 integrates within the functions of an existing antenna assembly 1000 and with the radar equipment 11 within the equipment rack 1052. As FIG. 2 shows, in one embodiment, the components of the calibration kit 1050 include a calibration antenna 28 (which in this example is a calibration horn), a switch 30 (which in this example is a remote controlled switch matrix) and a calibration computer 32 (which in this example is an analysis laptop). The exemplary equipment in the calibration kit 1050 is not limiting; for example, many different types of switches 30, many different types of computing devices and/or controllers are usable.

FIG. 3 is a second exemplary block diagram showing further interconnections of a far field calibration setup usable with the antenna assembly 1000 of FIG. 1A, using a PAR antenna 14, in accordance with one embodiment. In FIG. 3, an exemplary system 10 usable with the methods and systems described herein uses a PAR antenna 14 that comprises two phased array apertures 27a, 27b, corresponding to an Azimuth Radiator assembly 27a and an Elevation Radiator assembly 27b, which scan the azimuth and elevation planes respectively. The system 10 of FIG. 3 switches between the two apertures, i.e., the azimuth and elevation planes are not scanned simultaneously. The PAR Antenna 14 (like the antenna assembly 1000 of FIG. 1B) has a common path for both the X-band Receive (Rx) and X-band. Transmit (TX) waveforms (which are switched in via cable assembly W25). This common path comprises, in transmit order, the RF Router Assembly 20, a combiner/power divider network 22, one hundred eight (108) Transmit/Receive (T/R) modules (TRMs) 24, the Azimuth aperture 27, and the Elevation Aperture 28. The combiner/divider network 22, in one embodiment, comprises six 18:1 Power Dividers/Combiners 22A (not shown in FIG. 3) and one 6:1 Power Divider/Combiner 22A not shown in FIG. 3). The 108 T/R modules (TRMs) 24 can, in some embodiments, be disposed on 54 "two pack assemblies 1014 (similar to FIG. 1A). The Azimuth Aperture 27a is made of four Azimuth panels (not shown). The Elevation aperture 27b made up of seven Elevation Panels (not shown).

In one embodiment, the far field calibration systems, methods, and apparatuses described herein use programmable components of the aforementioned T/R modules 24 to recalibrate the beam steering of the antenna system 14. As will be appreciated, this is readily applicable to other phased arrays having programmable components antenna or radar components that are capable of recalibrating beam steering of the array.

As noted above, a baseline calibration for an array such as the PAR antenna is done in the near field range (NFR) at manufacturing or test facility. The near field range provides a controlled environment and precision measurement techniques to provide highly reliable and stable measurements. The calibration process determines receive mode amplitude calibration factors and phase calibration factors for all TRMs 24. Taylor weighting is applied to receive mode to decrease antenna side lobes. Calibration factors are stored in corresponding calibration files that are stored on the SCDI computer 34 (radar computer 34). Upon startup, these calibration files are used for online antenna control and fault isolation. These calibration files are discussed farther herein. There may be critical need, however, for the ability to re-calibrate fielded systems to perform antenna repairs and to maintain system performance. At present, the capability and resources to perform a near field calibration on fielded systems do not exist.

As will be explained farther herein, the calibration systems, methods, and apparatuses described herein allow a user to measure calibration data using a fixed calibration horn position, without the need for precisely positioned calibration equipment. At least some embodiments of the calibration test described herein rely on at least some TRMs 24 being properly calibrated (in one embodiment, it relies on at least 50% of the TRMs 24 being properly calibrated) to determine the precise position of the calibration horn 28. With this position determined, the Far Field Calibration (FFC) tool is able to find and make improvements to at least some of the problematic TRMs 24.

Referring again to FIG. 3, the setup 10 is configured to calibrate a radar system 11 that includes a receiver/exciter 12 operably coupled to a phased may antenna 14 (which in this example is a PAR antenna). The receiver/exciter 12 includes an upconverter 16 (which is used during transmit) and a downconverter 18 (used during receive). The exemplary phased array antenna 14 may be used to transmit and/or receive signals and includes the aforementioned RF router subsystem 20 and a combiner/divider network 22, as well as a plurality of transmit/receive modules 24a through 24n, and an array having an azimuth aperture 27a and an elevation aperture 27b comprising a plurality of radiating elements 26-26n.

In the example embodiment that uses the ATNAVICS radar, for example, the plurality of radiating elements (RE) 26 includes a total of 168 elements, but this is not limiting. As an example, there are 168 total radiating elements 26 in the PAR, made up of 84 elements from each of the two sub arrays 27a, 27b. These elements are fed by 108 TRMs 24 (see FIG. 1B) that direct energy to a single sub array at a time. For the PAR, RE energy is combined from pairs of TRMs 24 in the middle of the array. For example, TRMs 24 having numbers 1-30 and 79-108 feed individual elements, and energy from TRMs 24 having numbers 31-78 is combined in pairs to feed individual elements. Other array designs may operate similarly or with a different radiating arrangement, as will be appreciated.

When the phased array antenna 14 is operating in non-calibration mode, the receiver/exciter 12 provides a transmission signal 17, out of the upconverter 16, for transmission by one or both of the arrays 27a, 27b of radiating elements 26, where the transmission signal 17 to be transmitted is coupled through the RF router 20, then to the combiner/divider network 22, where the transmission signal 17 is divided into a plurality of first sub signals 23a. Each respective first sub-signal 23a is provided to a corresponding one of the transmit/receive modules (TRMs) 24 (see also FIGS. 1A and 1B), which themselves can include one or more suitable channel components (e.g. power amplifier, low noise amplifier, phase shifter, circulator, driver, attenuator, etc.) for sending and/or receiving signals The TRMs 24 can, in some embodiments, control features of the second sub-signals 23b that feed one or both of the arrays 27a, 27b of radiating elements 26, to help direct the effective radiation pattern of the phased array 14. From the TRMs 24, the second sub-signals 23b being transmitted are then provided then to one or both of the arrays 27a, 27b of the plurality of radiating elements 26, to be radiated out of the phased array, as may be well understood. Note that, in the test setup of FIG. 3, the transmission signal is routed through the switch 30.

Similarly, when the phased array antenna 14 receives signals at one or both of the arrays 27a, 27b of radiating elements 26, it couples these many received second sub-signals 23b through the TRMs 24, then to the combiner/divider network 22 (here the many first sub-signals 23a are combined into a first single composite received signal 19a), then the first composite received signal 19a is provided to the RF Router 20, then as a second composite received signal 19b through the switch 30 (if present) then as a third composite downconverted received signal 19c to the downconverter 18 of the receiver 12. For exemplary phased array antennas 14 that are electronically scanned, the phase of the phase shifter circuits (and thus the beam direction) is selected, by sending a control signal or word to each of the phase shifter sections, where the control information is provided via one or more control signals 35 sent by a controller or processor, such as the radar computer 34 (also referred to herein as SCDI computer 34) shown in the exemplary system 10 of FIG. 3. The control signal 35 is, in one embodiment, a digital signal representative of a desired phase shill, as well as a desired attenuation level and other control data.

In at least some embodiments described herein, the applicable systems, methods, and apparatuses are not limited to calibration of antennas (e.g., phased array antennas 14) used in radar modes only, but also are applicable to antennas that transmit and/or receive signals comprising information. Information may refer to voice, data, text, audio, video, multimedia, control, signaling, other information, or any combination(s) of any one or more of the preceding.

Referring again to FIGS. 2 and 3, the calibration equipment (e.g., calibration kit 1050) used to calibrate the phased array antenna 14 includes a calibration antenna 28 (which in the example of FIG. 3 is a calibration horn 28), a transmit/receive (TX/RX) RF switch 30, a calibration computer 32, and associated cabling and connections equipment 38a through 38i that may be necessary to interconnect the calibration equipment with various components of the radar system 11. The associated cabling and connections 38a-i also includes those cables and connections that may be necessary for interconnection within the radar system. 11 itself, including the radar computer 34 (Site Control and Data Interface (SCDI) computer 34) and the connections that carry the transmitted signal 17 and received signal 19. The appropriate connections 38 can include many different types of cables, brackets, connectors, adapters, interfaces, attenuators, splitters, and the like, as may be required given the particular types of equipment used for calibration and used in the radar system 11 that may need to be operably connected during calibration. For example, in one embodiment, when a calibration horn 28 is used as the calibration antenna 28, a bracket (not shown in FIG. 3) is coupled to a transition adapter of the calibration horn 28 and then is mounted to an appropriate object, such a lighting pole or tripod, that is capable of supporting the calibration horn 28 in an appropriate fixed position relative to the antenna 14, as will be appreciated. Advantageously, the calibration kit 1050 (FIG. 2) optionally includes brackets, poles, or other hardware used to hold the calibration horn in place in an appropriate location.

Referring again to FIG. 3, the calibration antenna 28, in one embodiment, is a NARDA 640 standard gain horn antenna, available from L-3 Communications Corporation: Narda Microwave—East, 435 Moreland Road, Hauppauge, N.Y., 11788. However, other types of antennas whose beam patterns are well known also are usable for calibration, based on the range of distances used for setting up the calibration antenna 28 (with respect to the radiating elements 26), the size/spacing of the radiating elements 26, etc. Virtually any type of calibration antenna 28 is usable so long as the calibration computer 32 has calibration data for that calibration antenna 28. The calibration antenna 28 is positioned so that it is approximately located at an appropriate far field distance (based on frequency, etc.) from the array 27a, 27b of radiating elements 26, and is positioned to receive a signal transmitting from at least one of the radiating elements 26.

In one embodiment, the calibration horn 28 should be far enough away from the antenna 14 such that substantially all of the elements 26 of the antenna 14 are in the main beam of the calibration antenna 28 (to ensure lower incidence angles). The main constraint for positioning is the incidence angle between the calibration horn 38 and each radiating element 26. For a larger array, the calibration antenna 28 would be positioned at a greater distance. Advantageously, the calibration how 28 can be positioned so that its boresight is the intersection of the center of the Azimuth 27a and Elevation 27b arrays. FIG. 5B, discussed further herein, shows an illustrative example of where the calibration horn 28 is to be placed for an array such as ATNAVICS, but note that the location is very flexible. For ATNAVICS, the azimuth aperture is the horizontal aperture and the elevation aperture is vertical.

In one exemplary embodiment, the calibration horn 28 is positioned about 15-30 feet (in one embodiment, the preferred distance is 25 feet) from the azimuth and elevation apertures, but this will, of course, vary in any given embodiment, based on the far field distance for the array. For example, if the phase array antenna 14 is an X band antenna (where X band is approximately from 7.25 to 12 GHz and corresponding wavelength is from 41.1 mm to 30 mm, respectively), the far field distance can be computed as:

$$\text{Far Field distance} \geq (2*D^2)/\lambda \qquad (1)$$

where D=diameter of the radiating element, in same units as wavelength, and λ=wavelength Referring again to FIG. 3, in one embodiment, an optional RF absorber 40 can be used to block portions of the antenna array 14 (e.g., a sub array, such as the azimuth array 27a) during calibration of the remaining portion of the array 14. Use of an RF absorber 40 is not always necessary for all embodiments, of course, but may be required or recommended, for example, when calibrating arrays having sub-arrays (or other portions of the array, or nearby antennas of another type that are being driven by same signal) that may need to be wholly or partially blocked during calibration (e.g., the ATNAVICS system, which has two sub arrays). In FIG. 3, because the exemplary phased array antenna 14 of the setup 10 of FIG. 3 has a first sub-array 27a of radiating elements 26 and a second sub array 27b of radiating elements 26, during calibration of one of the two sub-arrays 27a, 27b, an RE absorber 40 is placed over the other sub-array that is not being calibrated, to block at least some leakage or other interference from the array not being calibrated to the array being calibrated. The absorber 40 is removeably attached to the antenna in any appropriate fashion, e.g., by straps, clips, screws, etc.

As may be understood in connection with the use of RF absorbers 40, it may be recognized that use of an RF absorber 40 is not required for all implementations, even those with sub-arrays, depending on the configuration of the arrays, how transmitted signals are provided to the arrays, the amount of actual interference, etc. In at least some embodiments, however, use of the RF absorber 40 may be needed, during calibration helps ensure that calibration data is being collected primarily from the element that is being calibrated, and that there is not leakage entering into the calibration horn 28 from other elements. RF absorbers 40 can be used in at least some situations where there is a potential for interference from other sources.

In one embodiment, during far field data collection, the RF absorber 40 is placed over the aperture 27a, 27b that is not under test. The RE absorber 40 serves two purposes. The first is to prevent unwanted RF signal in the array not under test. Such unwanted RF signal can, for example, result from the 90 degree hybrid combiner at the output of the 2-packs 1024 routing the signal to both the azimuth and elevation apertures 27a, 27b. The second purpose is to help identify 2-packs 1014 with stuck switches. Since the FFC data collection process (discussed further herein) alternately exercises both the array under test and the "off" array, a measured signal at the array under test when the "off" array is active (i.e. array under test is not active) may indicate an output switch problem in one or more of the associated 2-packs 1014. The RE absorber 40 can be tuned for a frequency range. In one example embodiment, the RF Absorber 40 is implemented using a ECCOSORB ANW-73, available from Emerson and Cuming Microwave Products, Inc., of Randolph, Mass., but this is not limiting. This particular brand of absorber 40 can be used as part of a test performed from within a near field range.

Figure 4A:
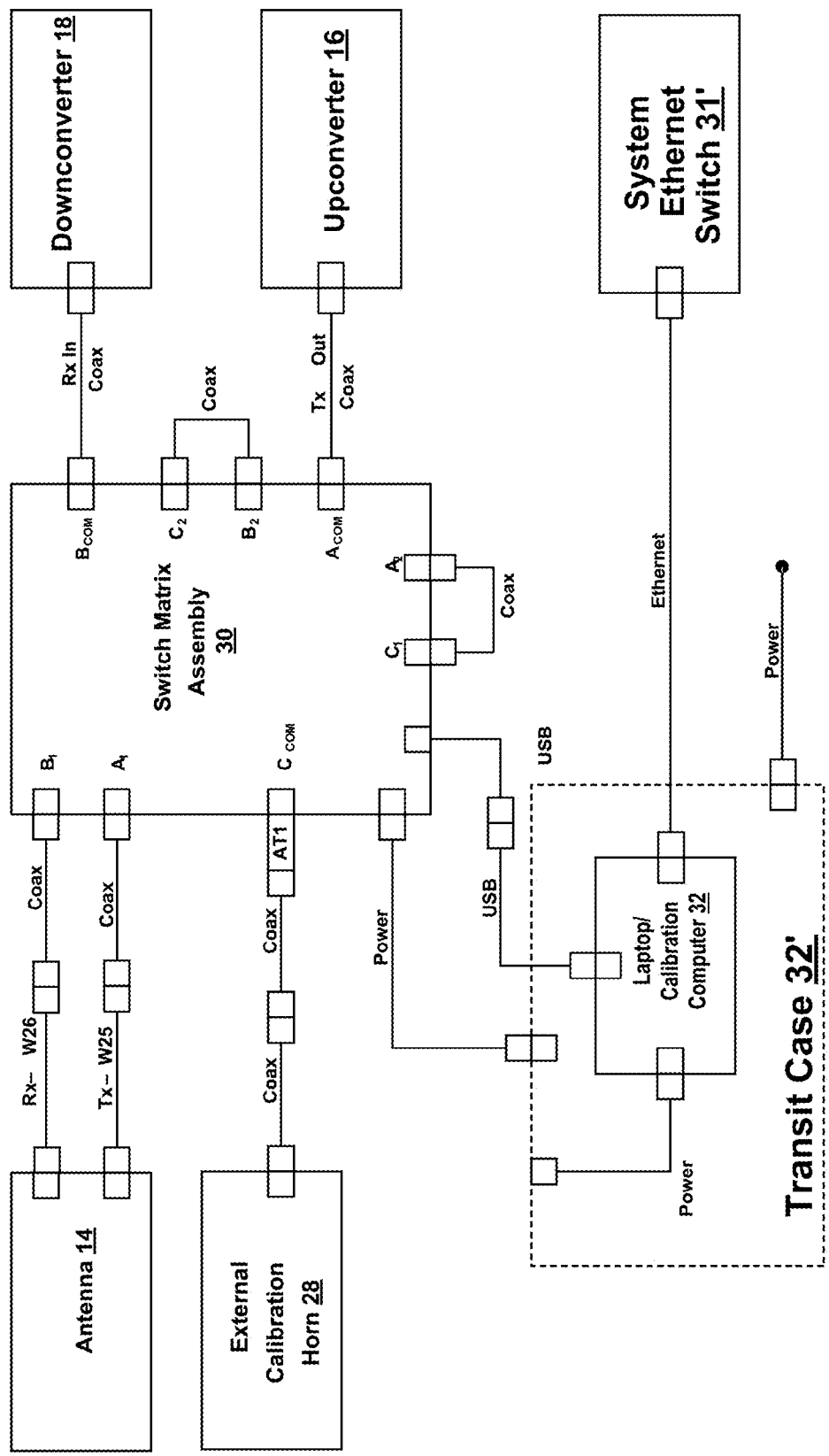
FIG. 4A is a block diagram showing interconnections in the exemplary test equipment field calibration setups of FIGS. 2A-3, in accordance with one embodiment.

The TX/RX switch 30 is, in the exemplary embodiment of FIG. 3, a USB-controlled RF switch matrix. FIG. 4A is a block diagram showing interconnections between the TX/RX switch 30 and the other test equipment in the exemplary field calibration setups of FIGS. 2 and 3, in accordance with one embodiment. The block diagram of FIG. 4A illustrates an embodiment Where the calibration computer 32 (shown for illustrative and not limiting purposes as a laptop computer) is contained within an optional transit case 32'. In addition, the block diagram of FIG. 4A illustrates that the calibration computer 32 is coupled to a computer network, such as an Ethernet Local Area Network (LAN) 31, via a System Ethernet Switch 31'.

In one embodiment, one type of USB-controlled RF switch usable with the ATNAVICS phased array radar is a model USB-4SPDT-A18 switch, available from Mini-Circuits Company, 13 Neptune Ave, Brooklyn, N.Y. 11235. FIG. 4B is a block diagram illustrating the details of this automated switch matrix 30, which is usable in a first version of the embodiment of FIG. 4A. The USB-4SPDT-A18 has four SPDT absorptive switches configurable via a local patch panel and provides a standalone graphical user interface (GUI) connection between the radar system 11, antenna 14, and calibration computer 32.

As will be appreciated, the illustrated and described type, style, and brand of TX/RX switch 30 is not limiting, and virtually any RE switch is usable as the TX/RX switch 30 so long as the switch is connectable (e.g., directly or via adapters, connectors, and/or cables/etc) to the appropriate components and has an applicable/recommended frequency range that at least includes/covers the frequency range used by the antenna being calibrated. For example, in one alternate embodiment, a manual rotary switch 30', as shown in FIG. 4C, is used in place of the switch matrix 30. The RF switch 30 can be implemented in various ways, including through use of multiple different discrete components, as may be appreciated and understood. Advantageously, if the RF switch matrix 30 is a commercial off the shelf (COTS) part, such as described in connection with FIG. 4B, no additional integration with system software is required. In at least some embodiments, the alternate manual rotary switch 30' of FIG. 4C (or other manual switch), can be used in place of and/or as a backup to, the switch matrix 30 of FIGS. 4A and 4B.

The switch 30 is configured to direct energy between the receiver/exciter 12 (via downconverter 18), transmitter (via upconverter 15), calibration antenna 28, and phased array antenna 14. For example, for a transmit test, the phased array 14 transmits to the calibration antenna 28. In particular, the switch 30 is configured so that the transmitter (upconverter 16) is connected to the phased array 14 (i.e., the transmitted signal 17 is provided as an input (see Tx-W25 in FIGS. 3 and 4A) to the phased array 14, and the calibration antenna 28 is connected to receiver (downconverter 18) via W26 and the cable 38e. For the receive test, the calibration antenna 28 transmits to the phased array antenna 28 the transmitter (upconverter 16) is connected to calibration antenna 28 via coax AT1, and the phased array antenna 14 is connected to receiver/exciter 12 (via downconverter 18) via W26 and Rx in).

Use of the TX/RX switch 30 helps the calibration setup 10 to make use of existing radar system 11 hardware during calibration, allows the radar system signals to be used during calibration, and provides a connection point for the calibration antenna 28 to be inserted into the transmit/receive path of the system 10. For example, in one configuration, the TX/RX switch 30 can be configured to route the transmitted signal 17 to the calibration antenna 28, to be radiated back into (fed into) the phased array antenna 14, so that at least one of the radiating elements 26 can receive the transmitted signal 17, and the transmitted signal received, at the radiating element 26 is routed back and provided as a received signal 18 at the receiver 18, via received signal 19, to the receiver 18. Advantageously, in one embodiment, the radar computer 34 provides an interface to control the radar 12 and collect data. When data collection has finished, data files are copied from the radar computer 34 to the calibration computer 32. The Calibration Computer 32 uses at least a portion of the information about the received signal 19 to help to determine whether the transmitted signal received at the at least one radiating element 26 indicates that the at least one radiating element 26 is properly calibrated. This is explained in greater detail herein.

In a further example, the TX/RX switch 30 can be configured (e.g., via the USB control shown in FIG. 4A, which is able to change the state or setting of the switch 30 via a signal from the calibration computer 32) to allow the transmitted signal 17 to be routed such that it propagates through the phased array antenna 14 and is radiated by at least one of the radiating elements 26 (one radiating element 26 at a time) and is received at calibration antenna 28, which then routes the signal it receives back through the TX/RF switch 30 into the downconverter/receiver 18 as a received signal 19. Information about this received signal 19 at the downconverter/receiver 18 is then provided to the radar computer 34, which then provides the information to the calibration computer 32, which uses the information about the received signal 19 to help to determine whether the transmitted signal received at the calibration antenna 38 indicates that the radiating element 26 is properly calibrated.

Refer in again to FIG. 4A, one or more fixed value attenuators (e.g., AT1) are used, in at least some embodiments, to fine tune signal level and prevent signal saturation and component damage. For example, in one embodiment, attenuation may be needed at the receiver front end (e.g., between the calibration horn 28 and the switch 30) to help ensure that A/D converters present in a coherent detector of the receiver (not shown in the figures) are kept out of saturation in both transmit and receive test modes. For example, in one embodiment, the saturation of the A/D converters is approximately −17.7 dBm signal level at the input to the coherent detectors, and the maximum rated input at the RF switch 30 is 30 dBm. In this example, incorporating 15 dBm of attenuation helps to keep the input to the coherent detector below −27 dBm (i.e., about 10 dB below saturation) in both Tx and Rx test modes. This example is illustrative and not limiting. Further, the illustrative fixed attenuators can, in some embodiments, be replaced by programmable or variable attenuators.

At least some of the calibration systems and methods described herein also use a set of calibration files 36 (also referred to herein as far field calibration (FFC) files 36) that are stored in a location where the calibration computer 32 can access them as needed. In the exemplary embodiment of FIG. 3, the calibration files 36 are stored on the radar computer 34, but this, too, is not limiting. The calibration files 36, in other embodiments, can be stored in a location other than the radar computer, such as in a storage device in operable communication with the calibration computer 32, including but not limited to a hard drive, a CD-ROM, a USB drive, or other persistent data storage devices (not illustrated in FIG. 3) presently known or developed in the future. The calibration files 36 can be stored anywhere where the calibration computer 32 and/or the radar computer 34 can access them as required for operation of the arrays 27a, 27b (even, in at least some embodiments, on the calibration computer 32 itself, such as if the calibration setup uses the radar computer 34 as the calibration computer 32), and can be stored in any form capable of being updated with new calibration information, as will be appreciated. In at least one embodiment, the calibration files 36 are used during normal operation of the phased array antenna 14 and are stored in a location accessible to the radar computer 34.

In the example embodiment of FIG. 3, the calibration computer 32 is a separate computer from the radar computer 34. As will be appreciated, having the calibration computer 32 be separate from the radar computer 34 can be more cost-effective to implement on a fielded system and also does not require changes to the radar computer 34. However, the radar computer 34, in one embodiment, can be configured to serve as the calibration computer 32, such that no separate calibration computer 32 would be required. The structure of an exemplary radar computer 34 and/or calibration computer 32, in at least some embodiments, is at least similar to the setup shown in FIG. 15 (described further herein).

Figure 6:
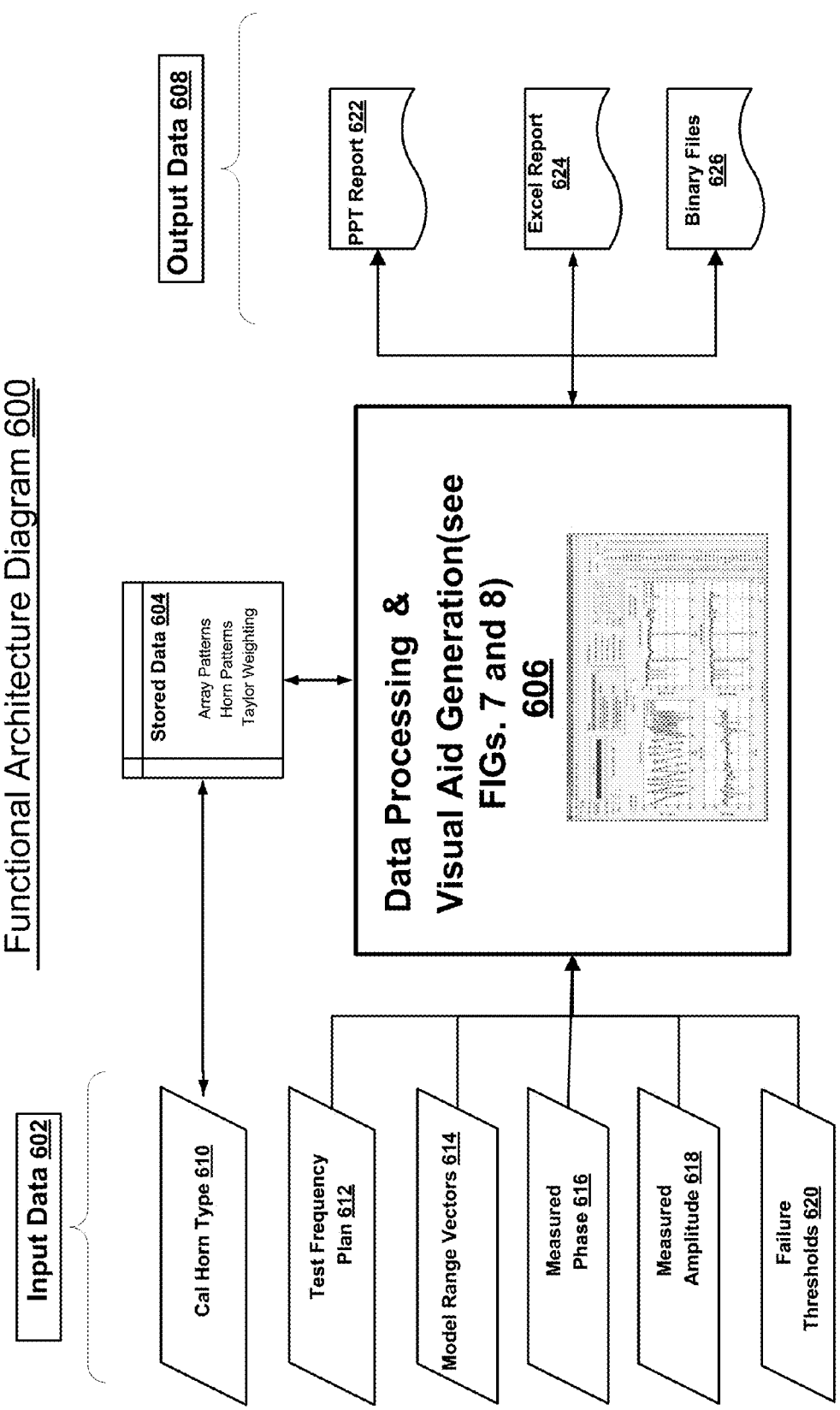
FIG. 6 is an exemplary top-level functional architecture diagram for a far field calibration (FFC) tool, in accordance with one embodiment.
Figure 7:
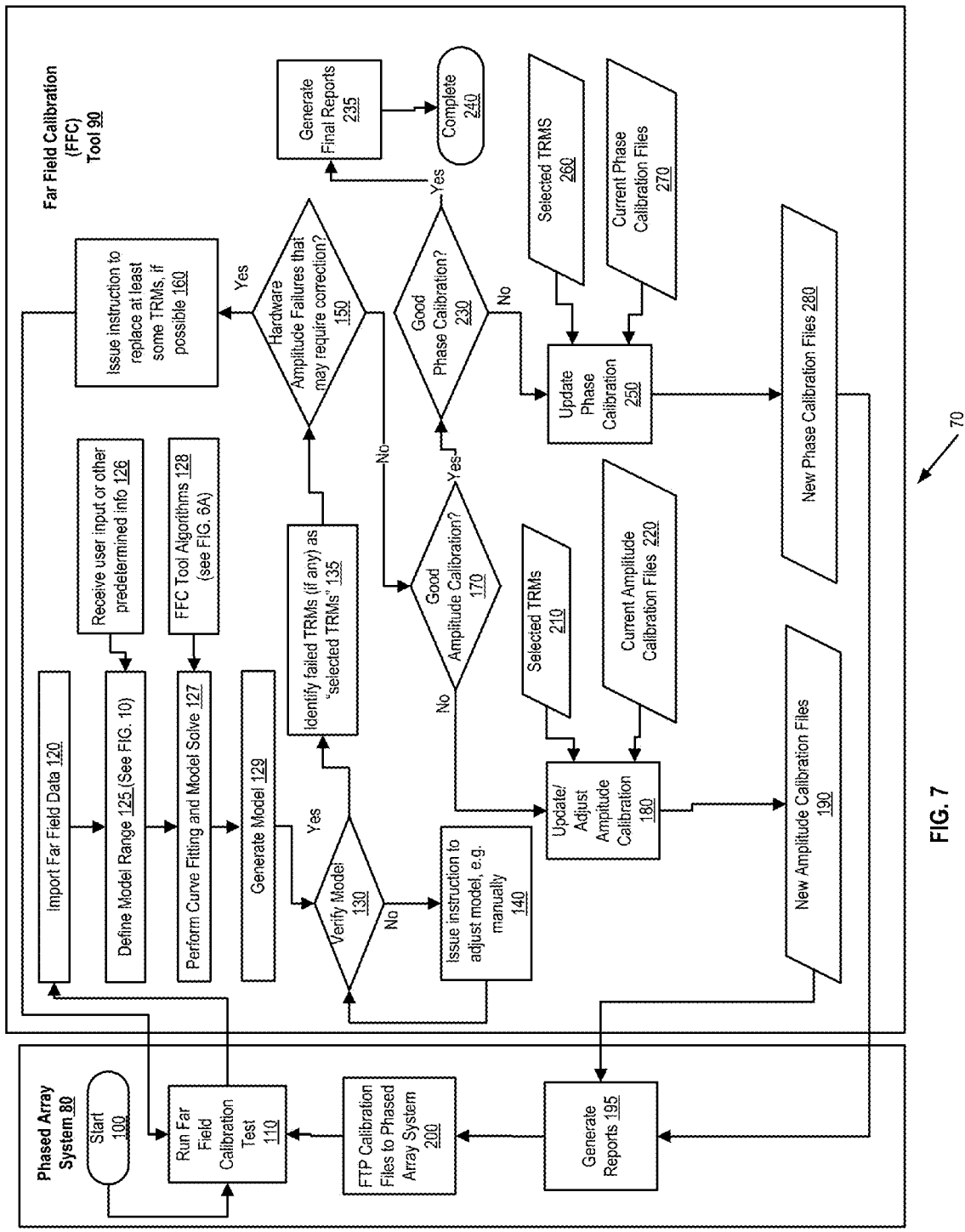
FIG. 7 is an exemplary FFC Tool Data Processing flow chart showing data processing associated with a far field calibration (FFC) tool, in accordance with one embodiment.
Figure 8:
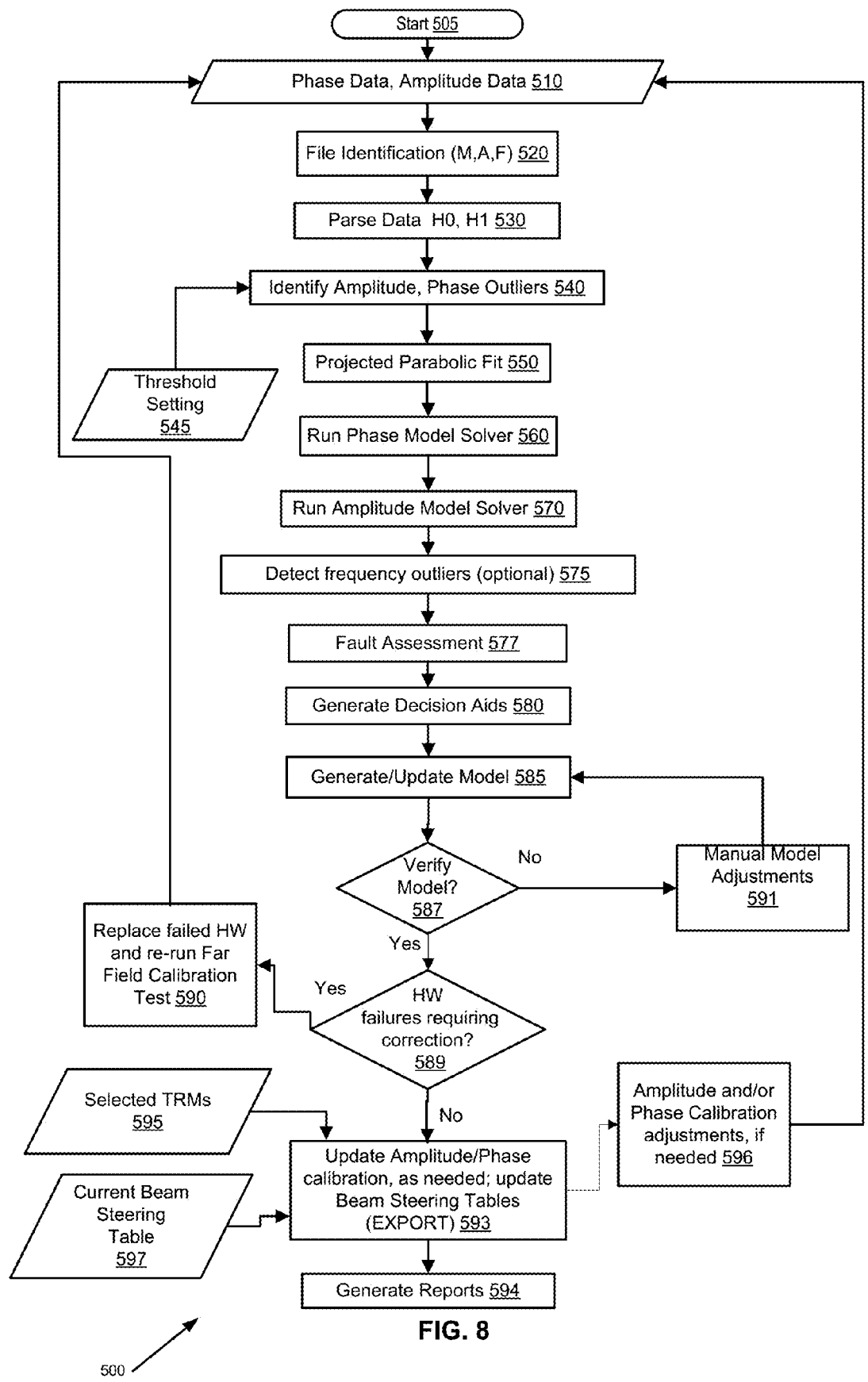
FIG. 8 is a flowchart showing data processing details for certain steps of the exemplary FFC tool data processing flowchart of FIG. 7, in accordance with one embodiment.

One or more operational algorithms running on the Calibration Computer 32 (which algorithms are described further herein, especially in connection with FIGS. 6-8, and illustrated further by information in FIGS. 9-15) help to perform a far field calibration (FFC) of the phased array antenna 14, especially when certain conditions occur that can indicate that an existing calibration may no longer be accurate, such as after the phased array antenna 14 has been moved, after phased array antenna 14 operating conditions/environment has changed, and/o after one or more radiating elements 26 or other components of the phased array antenna 14 have been replaced, repaired, or otherwise modified/adjusted. During calibration, the calibration computer 32 cooperates with the radar computer 34 to cause the array of individual radiating elements 26 to radiate. In one embodiment, the individual radiating elements 26 are radiated one at a time. Note that some of these TRMs 24 combine to radiate to the same element, but each TRM 24 is calibrated individually. For this embodiment of FIG. 3, the calibration computer 32 does not control the system 10 during the data collection. Instead the Signal Data Processor (SDP) 33 of the radar system 11 controls the system 10. The SDP 33 transfers data (e.g., far field calibration files and data) to the radar computer 34 (e.g., via connection cable 39H), and the radar computer 34 records the data to FFC files 36. The SDP 33, in one embodiment, includes at least the elements of the computer system of FIG. 15.

As referenced previously, the far field calibration (FFC) utilizes the calibration horn 28 placed in front of the array 27a, 27b to probe each array in transmit and receive modes and all four frequencies (F0, F1, F2, and F3). The calibration horn 28 is connected to the Receiver/Exciter 12(REX) of the system under test. The FFC process allows for flexibility an placement of the calibration horn 28, and there are a range of suitable locations where the calibration horn 28 can be positioned (relative to the antenna 14 under test) and pointed. In one embodiment, such as the embodiment using a PAR antenna 14, there are some constraints in relation to the distance of the calibration horn 28 from the PAR antenna 14.

For example, if using a PAR antenna 14, at distances less than 15 feet, the steep incidence angles between the transmitted wave front and PAR radiating elements 26 will begin to impact phase measurement accuracy due to pattern rolloff. Additionally, the internal calibration patch antennas of the PAR antenna 14 begin to act as corner reflectors at distances less than 15 feet, creating additional phase error for TRM measurements near the end of the array. The position of the calibration horn 28 along the aperture 27a, 27b under test also impacts the incidence angles. Gain margin decreases as calibration horn 28 distance increases, thus possibly limiting calibration horn distance. In one embodiment, it is advantageous if the calibration horn 28 is located between 15 and 30 feet from the array antenna 14 being calibrated, with a preferred distance, in one embodiment of approximately 25 feet distance between the calibration horn 28 and the antenna 14. These distances are exemplary and not limiting.

In addition, in one embodiment, it is advantageous if the minimum amplitude measurement is kept above 20 dB to maintain adequate signal-to-noise ratio (SNR). Receive mode can be the limiting mode because of the increased dynamic range of amplitude that may be needed for Taylor weighting. The pointing angle of the calibration horn 28 can be adjusted to minimize or at least decrease dynamic range. In one embodiment, it is advantageous if the calibration horn 28 is positioned such that the boresight of the horn 28 is located at the intersection of the center of the azimuth array 27a and elevation Array 27b.

In one embodiment, a mounting position for the calibration horn 28 that meets the above requirements has been chosen for the FFC procedures described farther herein. In this embodiment, a single antenna 14 position and pointing angle is used to simplify the test procedure. For example, referring briefly to FIG. 5B (which is an illustration of an exemplary calibration horn 28 mounting location 29, in accordance with one embodiment), the calibration horn 28 advantageously is mounted, according to FIG. 5B, at a position 29 that is approximately normal to the intersection of the azimuth and elevation apertures and a distance (d), parallel to the ground, at an exemplary distance of about 20 ft. The calibration horn 28, in one embodiment, is aimed (i.e., calibration horn 28 boresight) at the intersection of the center 37 of the azimuth 27a and elevation 27b arrays (as shown in FIG. 5B) to help minimize, or at least decrease, the dynamic range of amplitude measurements.

This calibration horn 28 position can be achieved reliably for an array antenna 14 such as the aforementioned ATNAV-ICS PAR (and for many other types of antennas) using a tripod mount. Horn mounting for some kinds of array antennas 14, such as FBPAR systems, can pose a challenge due to the varying site layout and platform heights that can limit the available area around the PAR antenna to mount the calibration horn antenna. For systems such as these, the calibration horn 28 can be mounted to a tripod or another suitable structure nearby, such as a pole, lightning tower, etc. As may be appreciated, the mounting of the calibration horn 28 requires engineering judgment on a case-by-case basis.

In addition, in at least one embodiment, The FFC tool 90 (FIGS. 6-8, described further herein) requires a model range to solve for the position 37 of the calibration horn 28. A tape measure or other measurement device is used to provide an initial manual estimate of the calibration horn 28 location 37. Referring again to FIG. 5B, and also to FIG. 5A (which is a graph illustrating exemplary far field geometry associated with the field calibration test setups of FIGS. 2 and 3, in accordance with one embodiment), the measurements that may be needed are: the distance of the horn 28 from the arrays 27a, 27b and the distance of the horn 28 along each aperture (azimuth and elevation). The distance along the aperture is entered in terms of radiating element number and can be measured by holding a tape measure normal to the array face to the calibration antenna and noting the location of the tape measure on the array face.

Figure 5A:
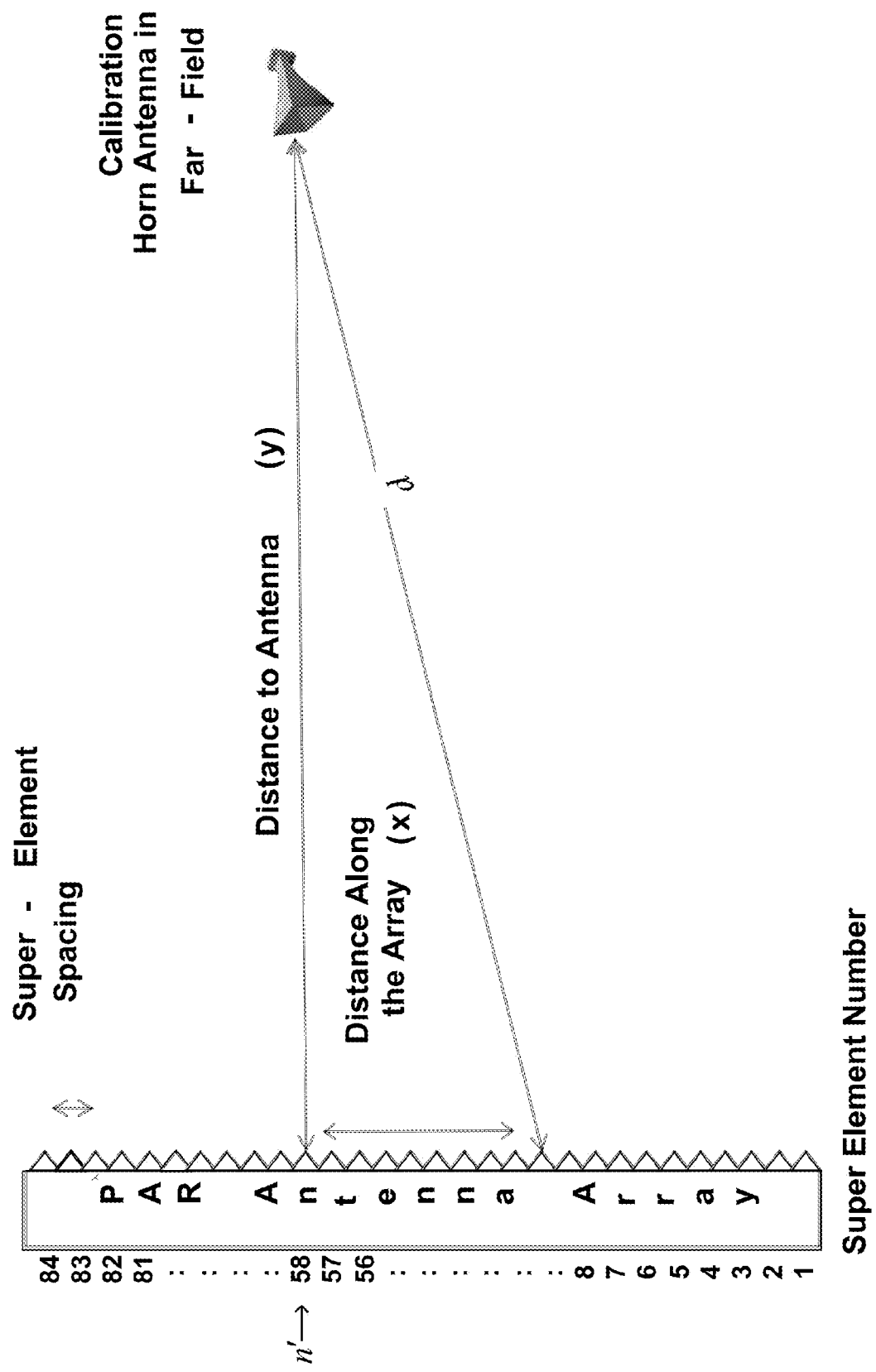
FIG. 5A is a graph illustrating exemplary far field geometry associated with the field calibration test setups of FIGS. 2A-2C, in accordance with one embodiment.
Figure 5B:
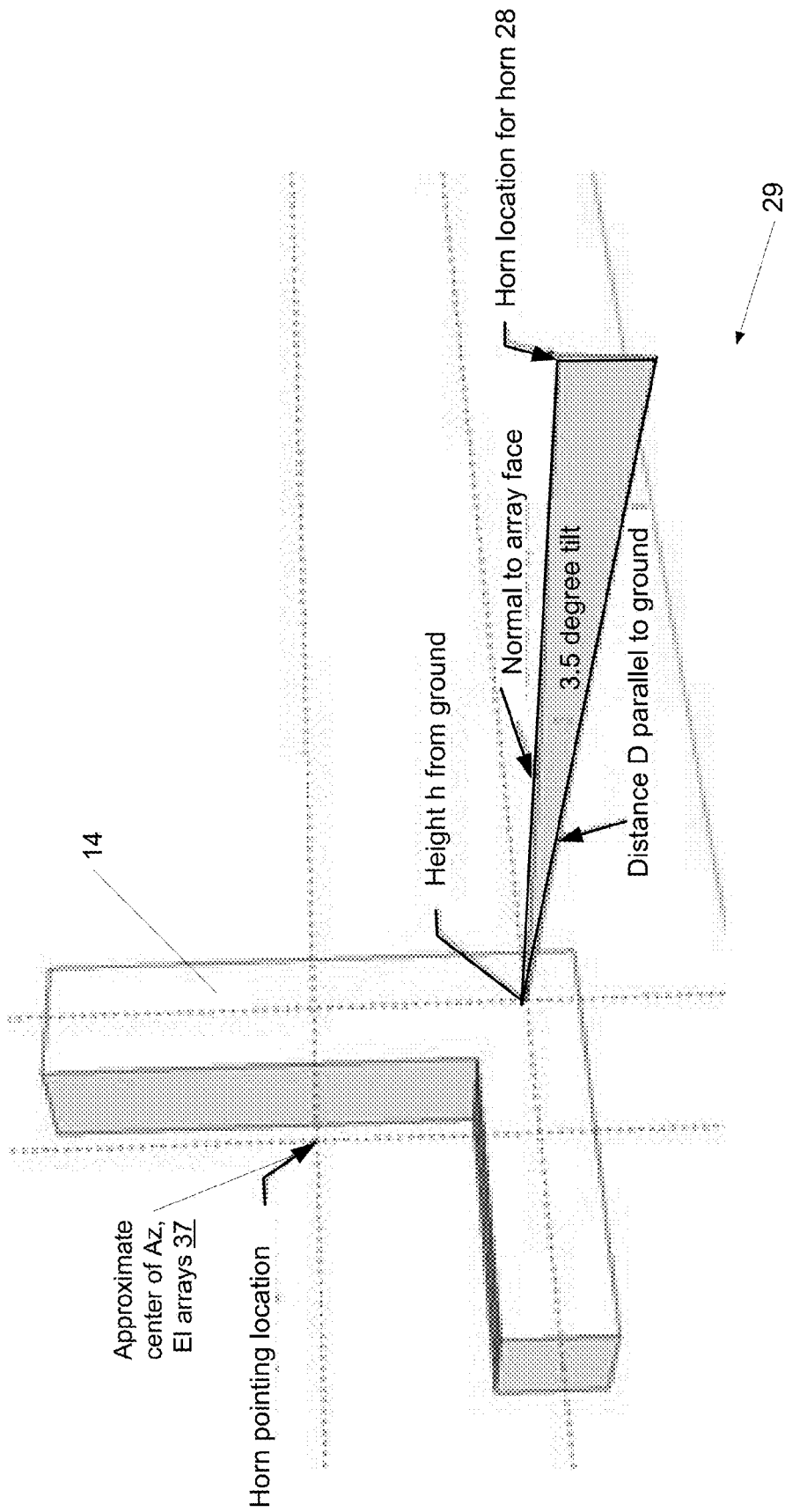
FIG. 5B is an illustration of an exemplary calibration horn mounting location, in accordance with one embodiment.

Referring to FIGS. 5A and 5B, in one exemplary array antenna 14 (e.g., the PAR antenna), azimuth aperture 27a radiating elements 26 are numbered 1-84 (with element 1 starting from the left when facing the array head-on), with a 0.852" (inch) separation between the center of each radiating element 26 (this separation is exemplary and not limiting). Elevation aperture 27b radiating elements 26 are also numbered from 1-84 starting at the bottom of the elevation aperture, with a 1.467" separation between the respective centers of each radiating element (this separation also is exemplary and not limiting). Using the horn positioning given above in FIG. 5B, the external horn distance along the array face would be azimuth radiating element 70 and elevation radiating element position −10. A negative number for Elevation is appropriate since the center of the calibration horn 38 is, in this example, below Elevation radiating element 1. Note that the FFC solver described herein (discussed further below in connection with FIGS. 6-8, herein) is designed to handle negative numbers for distance along the array face and can accommodate for uncertainty in the location of the calibration horn 28 through adjustable model ranges.

In contrast to far field testing, one advantage of the near field range is the ability to probe each element individually using an RF scanner (x-y-z plane). In this probing, an RF probe moves in front of each element to take measurements. For a far field measurement, however, a probe (e.g., the calibration horn 28) is at a fixed location in the far field for each aperture 27. Consequently, each element 26 has a unique geometric relationship to the calibration horn 28, resulting in the phase and amplitude measurements being a function of the geometric parameters. FIG. 5A is a graph illustrating exemplary far field geometry associated with the field calibration test setups of FIGS. 2 and 4, in accordance with one embodiment, and FIG. 5A also illustrates at least some of the relevant parameters for modeling the far field phase and amplitude (these are discussed further herein in connection with the phase model).

FIG. 6 is an exemplary top-level functional architecture diagram 600 for a far field calibration (FFC) tool 90 (FIG. 7), in accordance with one embodiment. Referring to FIG. 6, the far field calibration (FFC) tool 90 is designed to automate the post processing of measured data. The FFC tool 90 provides the ability to automatically tune configuration parameters. In at least some embodiments, the FFC tool 90 provides an interactive user interface that allows a user to manually tune configuration parameters and view multiple decision aids to develop an action plan. The binary calibration and beam steering files can be directly updated based on user or automated assessment of each TRM 24 for each mode, array, and frequency. The FFC tool 90, in some embodiments, provides a data processing and visual aid generation module 606 that is responsive to a set of input data 602 and stored data 604 (which can include array patterns, horn patterns, and Taylor weighting) to produce a set of output data 608. Additional inputs and outputs (not shown in FIG. 6) also may be part of the FFC tool 90 and its functional architecture diagram 600. This functional architecture 600 can be adapted to be usable with different types of antennas 14 and radar systems 11, including by providing selection options enabling custom configuration and/or selection of calibration equipment, test frequencies, model data, stored data, etc. Note that user input and control of parameters is not part of all embodiments and can, in some embodiments, be used in combination with automated assessments of the parameters.

The set of input data 602 includes calibration horn type 610, test frequency plan 612, model range vectors 614, measured phase 616, measured amplitude 618, and failure thresholds 620. These inputs can be provided "on the fly" (e.g., during the calibration test itself), whether automatically or manually from a file, manually provided by a user, etc., or in advance, as part of the set of input data 602. For the calibration horn type 610, a calibration horn 28 is selected from a pre-defined selection list for each array 27, and the selection will determine the antenna pattern to use in data processing. For the test frequency plan 612, the specific F0, F1, F2, and F3 frequencies used on the system are selected/provided, where the selected frequencies impact the wavelength calculation, and in-turn the model solver. Model range vectors 614 can be provided as part of a model range solver, where ranges can be specified for configuration parameters that the FFC tool 600 can auto solve. Note that if a single value is provided for start and stop ranges, the auto-solver functionality (discussed further herein in connection with FIGS. 7 and 8) is not necessarily used in all embodiments. For measured phase 616 and measured amplitude 618, information is provided about input files that contain the measured amplitude and phase. For failure thresholds 620, phase and amplitude thresholds can be set, and the FFC tool 90 uses these thresholds to detect TRM 24 failures. Failure thresholds 620 also can be used to drive the calibration updates.

The set of output data 608, in this illustrative example, includes a MICROSOFT POWERPOINT (PPT) report 622, a MICROSOFT EXCEL report 624, and a set of Binary Files 626 (calibration files 626). Note that use of specific MICROSOFT data formats (e.g., EXCEL and POWERPOINT) is merely exemplary and not limiting; it will be appreciated that information that output can be arranged into any format a user or receiving system requires. The PPT report 622 provides a way to export all decision aids into a presentation type of package. In the Excel report 624, all output data is exported to a spreadsheet file (such as an EXCEL file) that contains model parameters, delta calculations, and statistical data.

For the set of binary files, the FFC tool 90 outputs three files used as Sensor Unique calibration data by an antenna system such as ATNAVICS/FBPAR. These files contain PAR calibration data and are described in detail herein. As an example, three binary files that are included are listed below with a date/time stamp format that is appended by the FFC Tool 90:

(a) Coupling_data.o.yyyymmdd_hhmmss: Generated after selecting 'Generate Calibration Files with Phase Adjustments'

(b) Beam_pos_table_1.o.yyymmdd_hhmmss: Generated after selecting 'Generate Calibration Files with Phase Adjustments' or Generate Calibration Files with Amp. Adjustments'

(c) Beam_pos_table_2.o.yyyymmdd_hhmss: Generated after selecting 'Generate Calibration Files with Phase Adjustments' or Generate Calibration Files with Amp. Adjustments'

Referring to FIGS. 3, 6, and briefly to FIG. 7, a Far Field Data Test (FFDT) (see Signal Data Processor 33 of FIG. 3) (block 110) is used to control the array antenna and collect far field data (e.g., in ASCII file format, but this is not limiting). These data files are then transferred from the antenna 14 system under test to a calibration computer 32 for processing by the FFC tool 90 shown in FIGS. 6 through 8 (these tests also can be done by the radar system computer 34). The process of FFDT data collection and FFC tool analysis are, in some embodiments, repeated over multiple passes, where each pass includes an incremental improvement including hardware replacement, amplitude calibration, and phase calibration. FIGS. 6 through 8 are discussed further below.

For example, in one embodiment, during calibration, test pulses are transmitted between the antenna 14 and the external calibration horn antenna 28. The external calibration horn 28 is connected (e.g., via cable 38A) to the receiver/exciter 12 (REX) enclosure 11 of the system under test, via switch 30, to utilize the test signal generation and processing functions of the receiver/exciter 12 for data collection. The setup in this example includes an RF switch matrix 30 that is used to switch between receive and transmit modes. For receive mode, the RF switch 30 directs energy to transmit from the upconverter 16 through the calibration horn 28 and connects signal W26 from the RF router 20, on cable 38E, to the downconverter 18, via cable 39G, to receive through the antenna 14. For transmit mode, RF switch settings in the switch 30 are changed such that RF energy is transmitted by the antenna. 14 to the calibration horn 28 which feeds the received signal to the downconverter 18. In one embodiment, the radar system 11's Sensitivity Time Control (STC) feature is used for attenuation of the test signal to prevent receiver saturation. A full set of far field data is collected in one or more ASCII files (e.g., the FFC files 36) and is transferred to the FFC laptop/calibration computer 32 for data analysis and processing.

At least a portion of the existing calibrated elements 26 in the array 27 of elements 26 are used to determine the calibration test setup and calibration geometry (e.g., the positioning of the calibration antenna 28 relative to one or more radiating elements 26-26n in the array 26 of radiating elements, i.e., the positioning of the antenna 14 itself), as will be explained further herein. The calibration computer 32 calculates ideal calibration values based at least in part on information about the calibration test setup and calibration geometry (for example, a range of possible calibration horn 28 locations is provided as a model solver range; e.g., an example distance of calibration horn 28 from the antenna 14 is four (4) to five (5) meters) and, in one embodiment, the calibration computer 32 generates one or more curves, displayed on a user interface, to aid in analysis (e.g., as shown in the exemplary user interface displays of FIGS. 10A-10K, discussed further herein). The curves based on the ideal calibration values (e.g., theoretical or predicted curves) are compared with, curves generated from measuring signals emitted from the radiating element(s) under test (i.e., measured or actual curves). At least some of the failures and misaligned antenna elements can be readily identified after automatically comparing curves generated from these measured signals and comparing those curves with the "ideal" values on the ideal curves.

For example, in one embodiment, the FFC tool 90 automatically solves for the location of the calibration antenna 28 (e.g., via "best fit" curve fitting, as described further below) and also automatically solves for identification of failed components and/or misaligned elements 26, which are outliers from this best fit curve. Failure identification is based on a predetermined threshold, such as a user-defined threshold. Also for both cases (the location of the calibration antenna 28 and the identification of failed/misaligned components), in at least one embodiment, the user has the option to make manual changes (e.g., through entering a different calibration horn 28 location or through selecting/deselecting TRMs 24 for calibration). This is explained in greater detail herein.

Based on the calibration results, the algorithms running on the calibration computer 32 modify the calibration files 36, as needed, to adjust amplitude and phase calibration as may be needed. These adjustments in the calibration files then are used during operation of the phased array 14. Calibration, and the associated adjustments, is explained further below.

In one embodiment, the algorithms and methods associated with the FFC tool 90 run on the calibration computer 32 and help determine component failures and deficiencies within the radar system 11 and provide alerts and/or reports indicating which components may require replacement, adjustment, and/or calibration. In another embodiment, these algorithms and methods associated with the FFC tool 90 run on the radar computer 34, in addition to the one or more operational algorithms already running on the radar computer 34 that implement basic operational functions of the radar system 11.

The radar computer 34, optionally, can disable or turn off a given component in the radar system 11 so that the component can be repaired, adjusted, removed, (e.g., for repair or for external adjustments or calibration), or replaced. In one embodiment, an algorithm running on the calibration computer 32 (or, if applicable, the radar computer 34, if the radar computer 34 is being used as the calibration computer) uses the information contained in the calibration files 36 during operation and/or self-testing, to detect possibly faulty components, augment/modify amplitude and phase correction information stored in and/or used by the TRMs 24 to ensure correct operation, and, based on calibration information, apply appropriate corrections, if needed, to all TRMs 24, (and, optionally, to other antenna 14 components and/or receiver/exciter 12 components).

The Far Field Data Test (FFDT) is used for far field amplitude and phase data collection in block 110 of FIG. 7. The test is included in the FFC software (FIGS. 6-8). In one embodiment, the FFDT runs as part of the PAR Control and Monitoring (PARCM) firmware executed on the PAR Signal Data Processor (SDP) 33. The four FFDT configurations, in one embodiment, consist of the aperture and mode combinations: azimuth receive, azimuth transmit, elevation receive, and elevation transmit. Any order of configurations can be run for this test. The test collects a pair of amplitude and phase measurements for all applicable data. The values for each pair can be compared to assess the stability of the far field measurements, RF router 20 and TRM 24 commands are sent to set up transmit and receive paths and −2 type TRMs 24 are controlled to radiate through one of the two apertures 27. "Off Array" amplitude values are collected to assess the performance of the −2 type TRM switches, where the off array is the aperture that has absorber 40 applied during the test. Amplitude calibration factors and phase calibration factors are applied during data collection.

In this exemplary embodiment, running a configuration data collection generates 4 files (one for each frequency) and a full pass of far field data will consist of the 16 files listed below in Table 1.

TABLE 1

Far Field Data Files

| Az Rx | Az Tx | El Rx | El Tx |
|---|---|---|---|
| FF_AZ_RX_F0.txt | FF_AZ_TX_F0.txt | FF_EL_RX_F0.txt | FF_EL_TX_F0.txt |
| FF_AZ_RX_F1.txt | FF_AZ_TX_F1.txt | FF_EL_RX_F1.txt | FF_EL_TX_F1.txt |
| FF_AZ_RX_F2.txt | FF_AZ_TX_F2.txt | FF_EL_RX_F2.txt | FF_EL_TX_F2.txt |
| FF_AZ_RX_F3.txt | FF_AZ_TX_F3.txt | FF_EL_RX_F3.txt | FF_EL_TX_F3.txt |

In one embodiment, the calibration antenna 28, calibration computer 32, TX/RX RF switch 20, cabling 38 (and, optionally, the RF absorber 40), as described above, together form a portable calibration kit 1050 (FIG. 2) that can be re-used at different equipment sites, to calibrate the antenna systems 14 at those sites.

Figures 1, 9A:
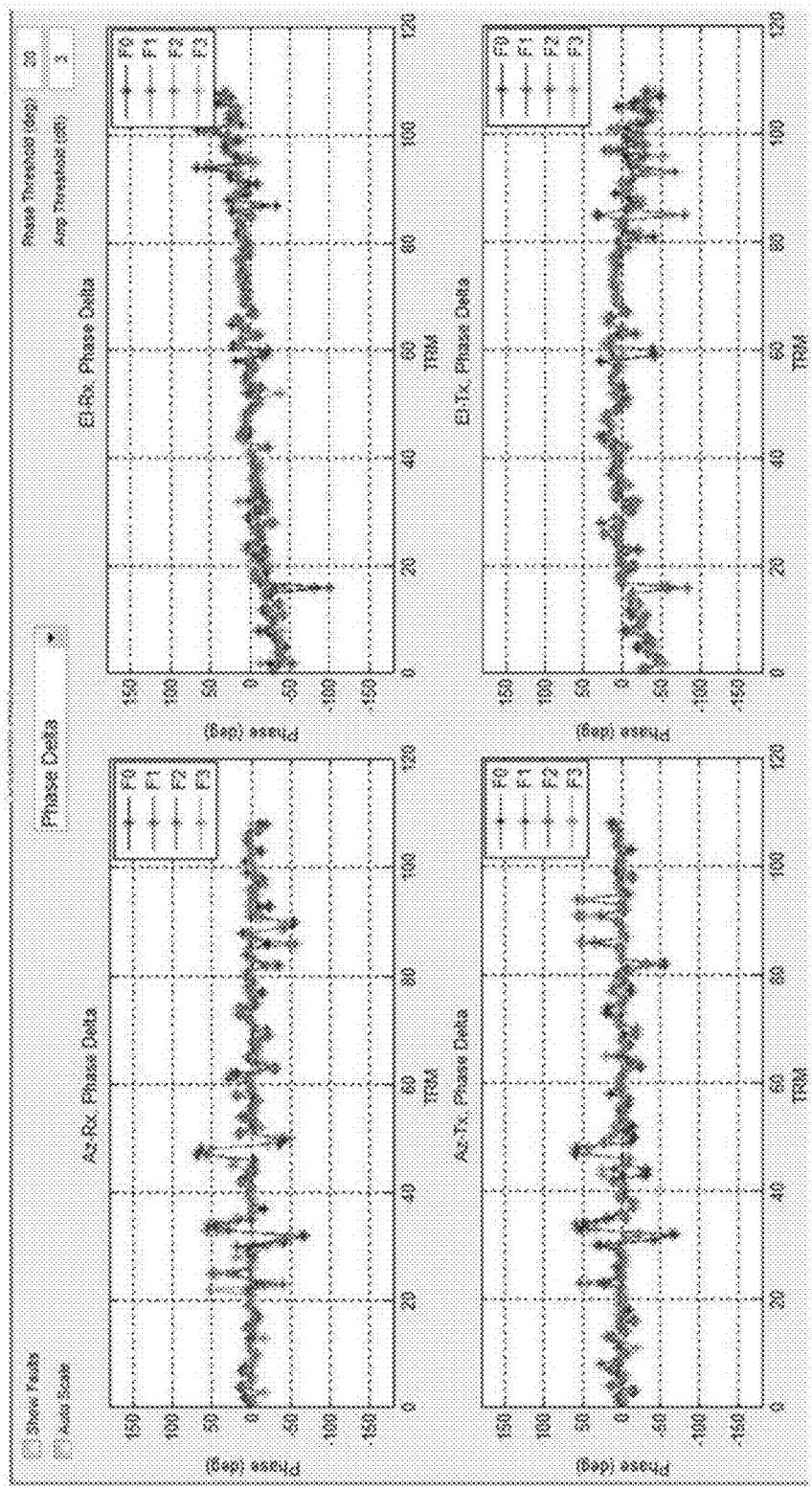
Figures 2, 9A:
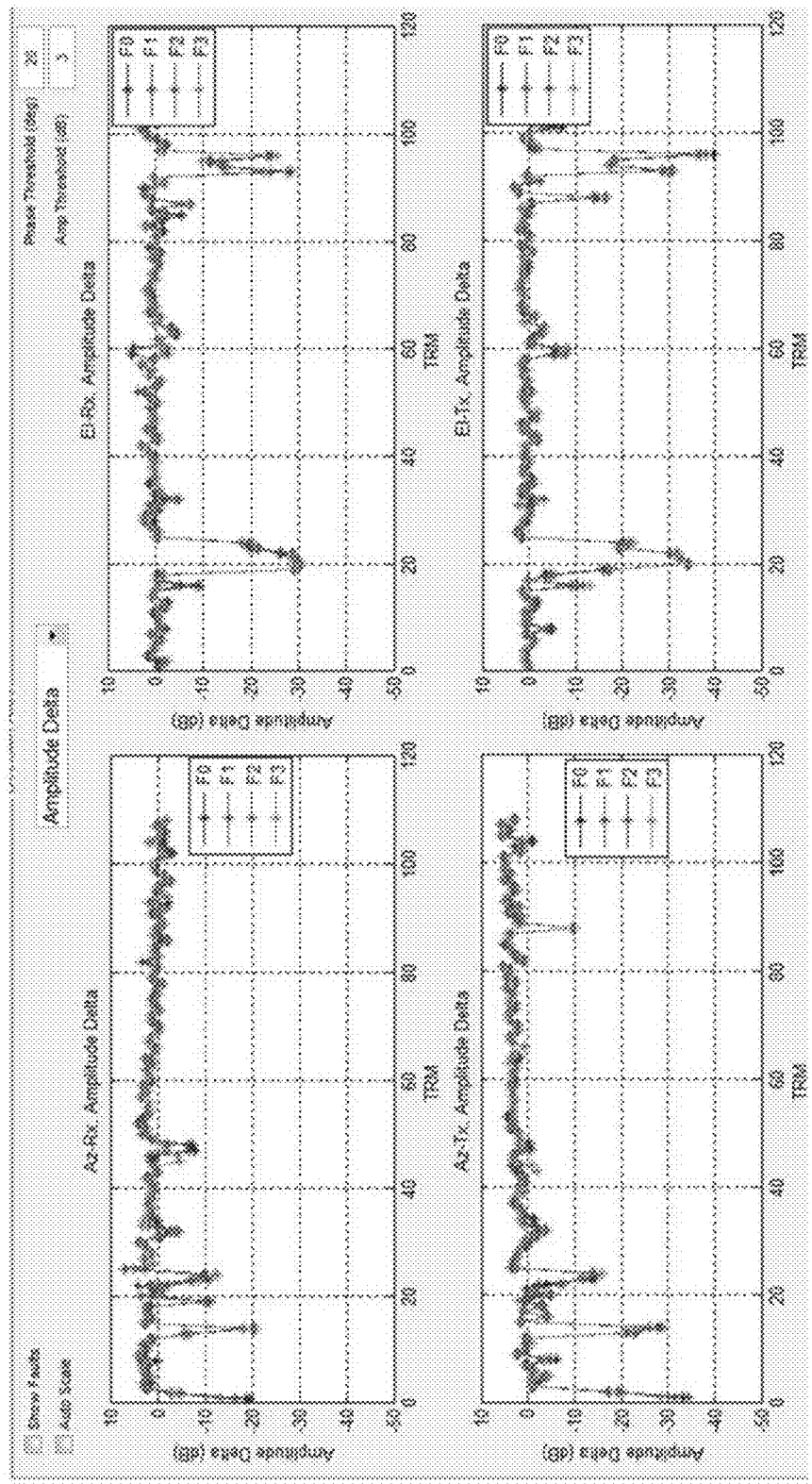
Figure 15:
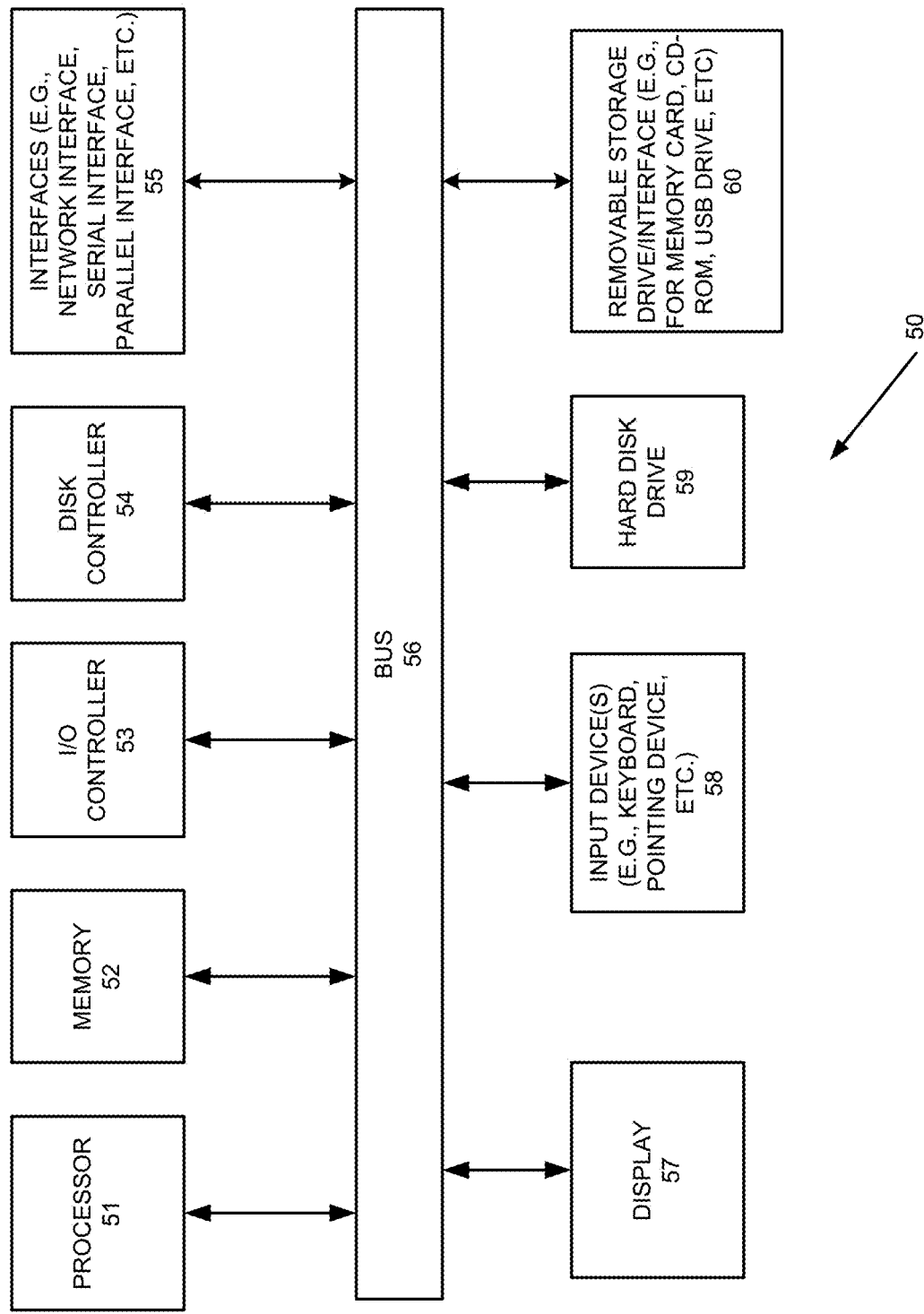
FIG. 15 is a block diagram of a computer system usable with at least some embodiments, including the calibration setups and phased array antennas of FIGS. 1 and 2.

Before getting into a detailed description of the operation of far field, calibration tool 90, referral is made briefly to FIG. 15, which shows a block diagram of a computer system 50 usable with at least some embodiments, including the calibration setup 10 of FIGS. 1 and 3. For example, the computer system 50 can be used to implement the calibration computer 32 of FIGS. 1 and 2 and/or the radar computer 34 of FIGS. 1 and 2.

Referring again to the computer system 50 of FIG. 15, systems and methods in accordance with at least some embodiments can be implemented using any type of computer system running any one or more types of operating systems. Exemplary types of computer systems on which at least some embodiments can be embodied include any system or device having a processor (or equivalent processing functionality) installed or embedded, including but not limited to a desktop computer, personal computer (PC), laptop computer, notebook computer, tablet computer, handheld computer, netbook, personal, digital device (including but not limited to personal digital assistant (PDA), mobile communications device (including but not limited to radio, conventional telephone, mobile/cellular telephone, smart phone, combination phone-tablet computer, music playing device, electronic reading device) server, workstation, and interconnected group of computers, as well as any other type of device having a microprocessor installed or embedded thereto, such as a field-programmable gate array (FPGA).

The exemplary computer system 50 of FIG. 15 includes a central processor 1, associated memory 2 for storing programs and/or data, an input/output controller 3, a disk controller 4, a network interface 5, a display device 7, one or more input devices 8, a fixed or hard disk drive unit 9, a removal storage device/drive (optional) 13, optionally a backup storage device (e.g., a tape drive unit) (not shown) and a data bus 6 coupling these components to allow communication therebetween.

The central processor 1 can be any type of microprocessor, such as a PENTIUM-family processor, made by Intel of Santa Clara, Calif. The display device 7 can be any type of display, such as a liquid crystal display (LCD), plasma display, cathode ray tube display (CRT), light emitting diode (LED), and the like, capable of displaying, in whole or in part, any desired information. The input device 8 can be any type of device capable of providing the desired inputs, such as keyboards, numeric keypads, touch screens, pointing devices, switches, styluses, and light pens. The network interface 5 can be any type of a device, card, adapter, or connector that provides the computer system 50 with network access to a computer or other device, such as a printer. For example, the network interface 5 can enable the computer system 50 to connect to a computer network such as the Internet. Other computer accessories that are now known or developed in the future (e.g., microphones, cameras, speakers, biometric access-control devices such as fingerprint scanners, etc.), although not illustrated in the block diagram of FIG. 15, can of course be included as part of the computer system 50.

Computer systems embodying at least some embodiments described herein need not include every element shown in FIG. 15, and that equivalents to each of the elements are intended to be included within the spirit and scope of the described embodiments.

In at least one embodiment, one or more computer programs define at least some of the operational capabilities of the computer system 50. These programs can be loaded into the computer system 50 in many ways, such as via the hard disk drive 9, the removable storage driver 13, or the network interface 5 (e.g., wirelessly, via the Internet, etc.). Alternatively, the programs can reside in a permanent memory portion (e.g., a read-only-memory (ROM)) chip) of the main memory 2. In another embodiment, the computer system 50 can include specially designed, dedicated, hard-wired electronic circuits that perform all functions described herein without the need for instructions from computer programs.

In at least one embodiment, the computer system 50 is networked to other devices, such as in a client-server or peer to peer system. The computer system 50 can, for example, be a client system, a server system, or a peer system. In addition, at least one embodiment is implemented at the server side and receives and responds to requests from a client, such as a reader application running on a user computer.

The client can be any entity, such as the computer system 50, or specific components thereof (e.g., terminal, personal computer, mainframe computer, workstation, hand-held device, electronic book, personal digital assistant, peripheral, etc.), or a software program running on a computer directly or indirectly connected or connectable in any known or later-developed manner to any type of computer network, such as the Internet. A client may also be a notebook computer, a handheld computing device (e.g., a PDA), an Internet appliance, a telephone, an electronic reader device, or any other such device connectable to the computer network.

The server can be any entity, such as the computer system 50, a computer platform, an adjunct to a computer or platform, or any component thereof, such as a program that can respond to requests from a client. The server also may include a display supporting a graphical user interface (GUI) for management and administration, and an Application Programming Interface (API) that provides extensions to enable application developers to extend and/or customize the core functionality thereof through software programs including Common Gateway Interface (CGI) programs, plug-ins, servlets, active server pages, server side include (SSI) functions and the like.

In addition, software embodying at least some embodiments resides in an application running on the computer system 50. At least one embodiment is embodied in a computer-read able medium usable with the general purpose computer system 50. At least one embodiment is embodied in a data structure stored on a computer or a computer-readable program medium. At least one embodiment is embodied in an application programming interface (API) or a user interface. In addition, at least one embodiment is embodied in a data structure.

Referral is now made to the test setup 10 of FIG. 3, and also to FIG. 7, which is a process flowchart showing an overall calibration method for the FFC tool of FIG. 6, in accordance with one embodiment. FIG. 8 is an additional flowchart showing further data processing details, applicable to the top level process of FIG. 7, in accordance with one embodiment. Each of these figures and flowcharts is discussed individually, and in relation to each other, further below.

Referring first to FIG. 7, the method shows two functional blocks, the Phased Array System block 80 and the Far Field Calibration (FFC) Tool block 90. In one embodiment, the processing steps shown in the Phased Array System block 80 take place in the radar computer 34, and the processing steps shown in the FFC Tool block 90 take place in the calibration computer 32, but this is not limiting. It will be appreciated that the processing steps shown in FIG. 7 can be broken up to run in many different ways, including all on the radar computer 34, all on the calibration computer 32, certain steps on the radar computer 34 and certain other steps on the calibration computer 32, etc. All or some of the processing in these blocks also can be implemented using one or more additional processors, as will be readily understood.

Before the calibration begins, the test setup is arranged as shown in FIGS. 2, 3 and 5. The calibration antenna 28 is positioned in front of the phased array antenna 14, at a predetermined orientation (i.e., at a predetermined height and distance, e.g., an appropriate far field distance, as discussed above in connection with FIGS. 5A and 5B), where positioning in front of the phased array helps to improve the coupling between elements. It is not required that the calibration antenna 28 be precisely positioned; rather, knowledge of the calibration antenna 28 position itself can be approximately known, or predicted, or estimated, and the distance between the radiating elements 26 be known, so that information about the position is able to be provided to the calibration algorithms. As explained further herein, rough measurements of the position of the calibration horn 28 are taken and this position is provided to the ITC tool 90, plus or minus (+/−) a "model range," where the FFC tool 90 performs curve fitting over this model range. The measured data is curve fitted to a set of "model data" which is dependent on the location of the calibration horn 28. The FFC tool 90 finds a location for the calibration horn 28, within the model range, where the measured data best fits the model data. This "best fit" helps, in at least some embodiments, to more precisely determine the actual position of the calibration antenna 28.

The TX/RF switch 30 is connected in between the receiver/exciter 12, the phased array antenna 14, and the calibration computer 32, as shown in FIG. 3. The calibration computer 32 (which in one exemplary embodiment is a laptop, but this is not limiting) is connected to both the calibration antenna 28 and the TX/RX RF switch 30. Advantageously, in one embodiment, at least some of the existing hardware and software of the radar system 11 (e.g., the receiver 18, transmitter 16, radar computer 34, TRMs 24, etc.) are also used during calibration and for data collection, which helps to simplify the hardware that may be used for calibration.

Thus, in accordance with at least some embodiments, a "calibration kit" 1050 that can be used at fielded sites for calibration of fielded antenna systems can include passive components such as the TX/RX switch 28, the calibration antenna 28 (e.g., a horn antenna), associated cables 38, and also includes the software usable to run the calibration tests on a suitable calibration computer 32 (which can be any computer, controller, or other device capable of running the calibration software). During the calibration steps described below, the transmitter 16 is controlled via signals sent from the radar computer 34 to generate a signal that is routed to the receiver of the system under test. For example, the signal can be radiated outward from the phased array antenna 14 to be received at the calibration antenna 28, to calibrate die transmit path, or provided to the calibration antenna 28 to be received at the phased array antenna 14, to calibrate the receive path. The existing phased array control software (which in some embodiments is running on the radar computer 34, and in other embodiments, such as embodiments using ATNAVICS, is running on the SDP 33) controls the individual TRMs 24, as well as the receiver/exciter 12, to enable individual radiating elements 26 to be calibrated/tested and to enable the signals that are received (either at the receiver 18 or at the calibration antenna 28) to be processed, before providing information about them to the calibration computer 32. The calibration computer 32 controls the TX/RX switch 30 to receiver 18 and measures the amplitude, phase, and polarization measurements.

Referring again to FIG. 7, at the time that the process starts, (block 100) the far field calibration test is begun (block 110). The processing that takes place in block 110, run far field calibration test, includes the calibration computer 32 sending control commands to the radar computer 34 to cause the radar computer to control the radar system 11 as indicated by the calibration test, including controlling when the transmitted signal 17 is generated, as well as its frequency, signal level, phase, etc processing the received signal 19, as will be understood, and acquiring all far field test data that is later used in blocks 120-280.

Because of the interdependence of antenna components, amplitude calibration, and phase calibration, the FFC calibration process of FIG. 7, in at least one embodiment, actually involves multiple "process subsets" of incremental changes to the antenna and calibration (where a "process subset" in this context refers a set of related blocks in the process, such as a baseline assessment process subset, a module replacement and assessment process subset, an amplitude calibration and assessment process subset, and a phase adjustment and calibration process subset). Hardware changes, such as replacement of 2-pack modules 1014 or TRM 24 input cables, can be performed first, then amplitude calibration, and finally phase calibration. The impact of these changes is assessed along the way. Each process subset thus can involve multiple "passes" of far field data collection and analysis if expected results are not achieved on a given pass through the method of FIG. 7. That is, the method shown in the FIG. 7 may be run multiple times, in multiple passes, as component are replaced and/or as calibration and/or other values are adjusted or updated.

With each pass of far field data collection (block 110), the far field data is, in one embodiment, advantageously, validated to ensure that:

(a) amplitude and phase measurements substantially follow the model values;

(b) there is adequate gain and substantially no saturation shown in measured amplitude; and (c) that there is substantially no large phase data oscillation or drift (greater than +/−10 degrees) between two sets of collected data as indicated in the stability data.

In one embodiment, the far field calibration test that takes place in block 110 runs on the SDP 33, independently from the calibration tool and calibration computer 32. During the far field calibration test, the SDP 33 controls the phased array to radiate from individual TRMs 24 and collects amplitude and phase information, and the SDP 33 collects this data and stores this information in a file accessible to the calibration computer 32 (e.g., by writing the data to a file on the calibration computer 32). The far field calibration test can include performing some averaging to decrease measurement error. The far field calibration test controls the TRMs 24 to radiate and the system to collect amplitude and phase data for each TRM 24. The far field calibration test applies signal level adjustment and controls amplitude taper and phase control. During phase measurements, different phase values are commanded and then averaged to provide a phase measurement. The far field calibration test applies the current amplitude and phase calibration coefficients. The processing that takes place in block 110 also includes the calibration computer 32 configuring the TX/RX switch 30 as indicated during the calibration test.

Referring still to block 110, in one embodiment, the far field calibration test collects far field data in the four configurations described above in connection with Table 1. In addition, in one embodiment, the first set of far field data collected is a baseline assessment, which helps to give an indication of the state of the system prior to making at least some types of repairs or calibration changes. Baseline far field data is used for comparison with the final pass of far field data, giving an indication of the net improvements made to the antenna through far field calibration.

After the far field calibration test of block 110, is complete, the data acquired during the test is received at the calibration computer 32 (block 120), and processing moves on to defining and processing the model of the calibration setup, including radar system calibration horn 28 position. A model range is automatically defined (block 125), based at least in part on predetermined input, such as input from a file or from a user (block 126) or other predetermined or default model range input, in one example embodiment, a default predetermined model range is used that is workable with a predetermined calibration horn location (or set of locations), such that no user input is, necessarily, needed. In another embodiment, if the calibration horn is moved to a location different than the predetermined calibration horn location (or set of locations) the range for the model can be provided by a user or another source of information, such as stored file.

For example, in one embodiment, a user enters a model range for the position of the calibration horn 28 based on the current test setup prior to loading importing the data, where the information comes from the previous tape measurement. During the data load, the FFC tool 90 solves for the theoretical phase and amplitude values over this inputted model range and then uses best match curve fitting (block 127) between the theoretical model and measured data to solve for the location of the calibration horn 28. Because best fit curve fitting is used with measured antenna data, it may be preferable for this embodiment of this method that a certain number of TRM's 24 (roughly 50% in at least one embodiment, but this is not limiting) are properly calibrated, to more accurately perform this curve fit. As will be appreciated, the greater the percentage of properly calibrated TRM's 24, the more accurate the curve it will tend to be. In one illustrative example, a model range of +/−0.5 meters and +/−5 elements around the measured calibration horn 28 position is used. If the calibration horn 28 location is more precisely known, this range can be tightened to decrease solver time.

Referring to FIGS. 7 and 8, more detail about the curve fitting and model solving (block 127) is performed by the FFC tool algorithms (block 128) of FIG. 8 (discussed further herein). Defining and processing the model also is further described beginning in block 505 of FIG. 8 (described later herein). After the model is determined (block 129), it is verified (block 130). This is all described further herein.

Referring again to FIG. 7, during the far field calibration test (block 110), the existing hardware and software of the radar system 11 is used to make measurements of amplitude and phase, with the calibration antenna 28 in a fixed position, using any standard technique or method now known or developed in the future. For purposes of computation of results, the analysis of the far field calibration test of block 110 (including verification of the model) takes into account the known distance between the radiating elements 26. In at least one embodiment, the algorithm used during far field testing solves for the variance between the set of model values (for all TRMs 24) and the measured values and chooses the calibration horn 28 position that minimizes, or at least decreases, this variance. Providing a model range (measured position +/− a tolerance) (blocks 125-126) gives a bound for the model solver methods. This is discussed further herein in connection with FIG. 9D, which is a phase model solver algorithm.

Advantageously, knowledge as to the location of the calibration antenna 28 can potentially allow for accuracy that can be an improvement over calibration with a built in calibration antenna, as is done in some prior art systems. For example, in one embodiment, when the ATNAVICS phased array antenna is being calibrated, locating the calibration antenna as described herein can provide an accuracy of about 1 dB for amplitude and about 5 degrees for phase. In addition, avoidance of high incidence angles can be another advantage in the described location for the calibration antenna 28. This location allows measurements to be taken with coupling of the main beam of the both the calibration antenna as well as each element. At high incidence angles, there is a large variation in measured data die to antenna nulls and side lobes.

Referring again to FIG. 7, after the far field calibration test is run (block 110), its output information, i.e., its far field data (block 120) is imported, where the far field data (e.g., FFC File 36) is transferred from the SCDI computer 34 to the FFC software resident on the calibration computer 32. The far field data from the far field calibration test is used to help provide an estimate as to the actual, precise position of the calibration antenna 28, where this estimate becomes part of the model defined in block 125 and also to help establish whether the calibration data is consistent. A range for the model (block 125) also is computed, and in at least some embodiments this range is computed based at least in part on user input (126), although in at least some embodiments the computation of range for the model is based on one or more data files. After the model solve is complete (i.e., after the precise location of the calibration antenna 28 is known), the amplitude and phase model values give the ideal amplitude and phase values, and the model is generated (block 129). The calibration values are then adjusted (for each TRM 24) by the difference between the model value and the measured value (block 127). This information helps to determine whether the model can be verified (block 130).

For example, in one embodiment, a model range is defined, e.g., via received information (blocks 125 and 126) (e.g., via a stored file, a previously stored model range, or via user input) for the position of the calibration horn 28, based on the current test setup, prior to loading the far field calibration data. During the data loading from the SCDI computer 34 to the FFC software resident on the calibration computer 32, the FFC tool 600 solves for the theoretical phase and amplitude values over this model range and then uses best match curve fitting between the theoretical model and measured data to solve for the location of the calibration horn 28. Because best fit curve fitting is used with measured antenna data, a certain number of TRMs 24 (for example, in one embodiment about 50% of the TRMs 24) may be required to be properly calibrated to accurately perform this curve fit. In one embodiment, a model range of +/−0.5 meters and +/−5 elements around the measured position of the calibration horn 28 is used. If the location of the calibration horn 28 is more precisely known, this range can be tightened to decrease solver time.

In one embodiment, what happens prior to determining that the model is verified (block 130) is verifying that the calculated model values for amplitude and phase substantially follow the measured values (excluding outliers). Thus, methods are provided to help automatically exclude the outliers. Detection and correction of amplitude outliers is discussed further below in connection with FIG. 8.

FIG. 8 is an exemplary FFC Tool Data Processing flow chart 500 showing further detail relating to the data processing associated with the far field calibration (FFC) tool 90 of FIG. 7 and the FFC architecture diagram 600 of FIG. 6, in accordance with one embodiment. This flow chart 500 shows sequentially the processing and calculation steps that are performed once the phase and amplitude files to be loaded have been selected and imported (block 120 of FIG. 7). As explained further below, during the file identification (block 520) and data parsing (block 530). a far field data test generates a set of files (e.g., 16 files) for a full antenna test, including all combinations of:

Azimuth or Elevation Array (2)
Transmit or Receive (2) and
4 Frequencies (4)

As part of these file identification and data parsing blocks, the FFC tool 90 loads Far Field Test Data (e.g., in a formatted form, such as ASCII). The FFC tool 90 parses the far field test data to identify which of sixteen (16) possible confirmations is associated with the data. In one embodiment, the data after identification/parsing (blocks 520, 530) is then stored in a structured format. An illustrative example of a data structure used to store this data, in accordance with one embodiment, is:

data.AzRx.phase[180,4];
data.AzRx.amp[180,4];
data.AzTx.phase[180,4];
data.AzTx.amp[180,4];
data.ElRx.phase[180,4];
data.ElRx.amp[180,4];
data.ElTx.phase[180,4];
data.ElTx.amp[180,4];

After identifying the type of data (block 520) and before solving for phase (block 560) and amplitude (block 570), the FFC tool 90 detects (and, if possible and/or necessary, corrects for) potential phase and amplitude data outliers (block 540), without knowledge of the theoretical model. As explained further below, the FFC tool 90, in one embodiment, uses curve fitting algorithms (block 127 of FIG. 7 and block 540 of FIG. 8) to determine data trends and identify potential outliers. These methods, in one embodiment, rely on the some predetermined portion (e.g., in one embodiment, a majority, or at least 50%) of the phase and amplitude data being valid. The methods discussed herein will still work with fewer than 50% valid amplitude phase data, but the resulting model may, of course, become less accurate the more the phase and/or amplitude data becomes invalid, as will be understood.

Referring again to FIG. 8, phase and amplitude data (which data is measured at the calibration antenna 28 and/or receiver 18 and processed at radar computer 34, as noted above) is received (block 510) from the radar computer 34 (this is the same as the "far field data" of block 120 in FIG. 7). For example, in the array of FIG. 3, having radiating elements 26 through 26n, this phase and amplitude data corresponds to transmit and receive data for each antenna element 26-26n in the array 27 (i.e., each TRM 24a-24n), where the data is taken at a given azimuth and elevation, and is run at several different frequencies.

This data corresponds to the phase and amplitude data associated with each radiating element 26, at a given azimuth and elevation, during transmit and receive, for one or more operation frequencies. For example, the aforementioned ATNAVICS system has four operating frequencies, and these frequencies are used during testing and calibration. During the far field calibration test (block 110 of FIG. 7), the calibration computer 32 controls the radar system 11 (via radar computer 34), the tx/rx switch 30, and the calibration antenna 28, to provide a signal, advantageously at one or more of the operating frequencies, to the transmit and receive paths of the phased array antenna 14. Amplitude and phase data associated with providing this signal to the transmit and receive paths is acquired, such as by acquiring signals at the calibration antenna 28 and/or the receiver 12, then parsing/processing this data to generate a plurality of sample sets of data H0-HN. In one exemplary embodiment, two sample sets of phase and amplitude data are acquired: H0, H1, but his is not limiting.

In block 520, the files are identified. In one embodiment, the data is part of different files for different combinations of mode ("M") (transmit (tx) or receive (rx)), aperture ("A") (azimuth in (az) or elevation (el)), and frequency ("F") (F0-F3). In other embodiments, all data could be written to the same file. Many combinations are possible, as will be appreciated. The phase and amplitude data from the H0 and H1 sample sets is parsed (block 530). In a further embodiment, blocks 520 and 530 could be combined into a "load and parse data" block (not shown in FIG. 8). Blocks 520 and 530 show in greater detail what is happening in block 120 of FIG. 7. Referring again to FIG. 8, a threshold setting (block 545) is applied to the parsed data to identify outliers in the amplitude data (block 540). Data falling above the threshold levels for phase and amplitude is considered to be an outlier. An illustrative threshold setting for phase is 20 degrees (°) and for amplitude is 5 dB, as shown in FIGS. 11A-11D (for phase data) (discussed further herein), but this is not limiting.

Similar to blocks 127-130 of FIG. 7, in FIG. 8, for each set of data that is parsed (block 530), after the outliers in the amplitude and phase data are identified (block 540) a projected parabolic fit (e.g. a best fit curve for the remaining data) is generated (block 550), using, for example, methods known in the art. For example, in one embodiment, the position of the calibration horn 28 is swept over the defined model range (block 125 of FIG. 7). For each value in the sweep, a set of model amplitude and phase data is generated for each TRM frequency and aperture mode combination. The model data that best fits the measured data is selected as a model (block 585) and thus is used for generating the "theoretical" data. The outliers are identified, in at least some embodiments, based on the methods described previously, in connection with FIGS. 9B-9E-2.

Based on the resulting curves for amplitude and phase, a model can be generated of the precise geometric location of the calibration antenna 28 (block 585), and, once this model is validated, it can be used to compute theoretical amplitude and phase values that are usable to help calibrate the antenna, help determine whether calibration is good or not, etc.

Figure 9B:
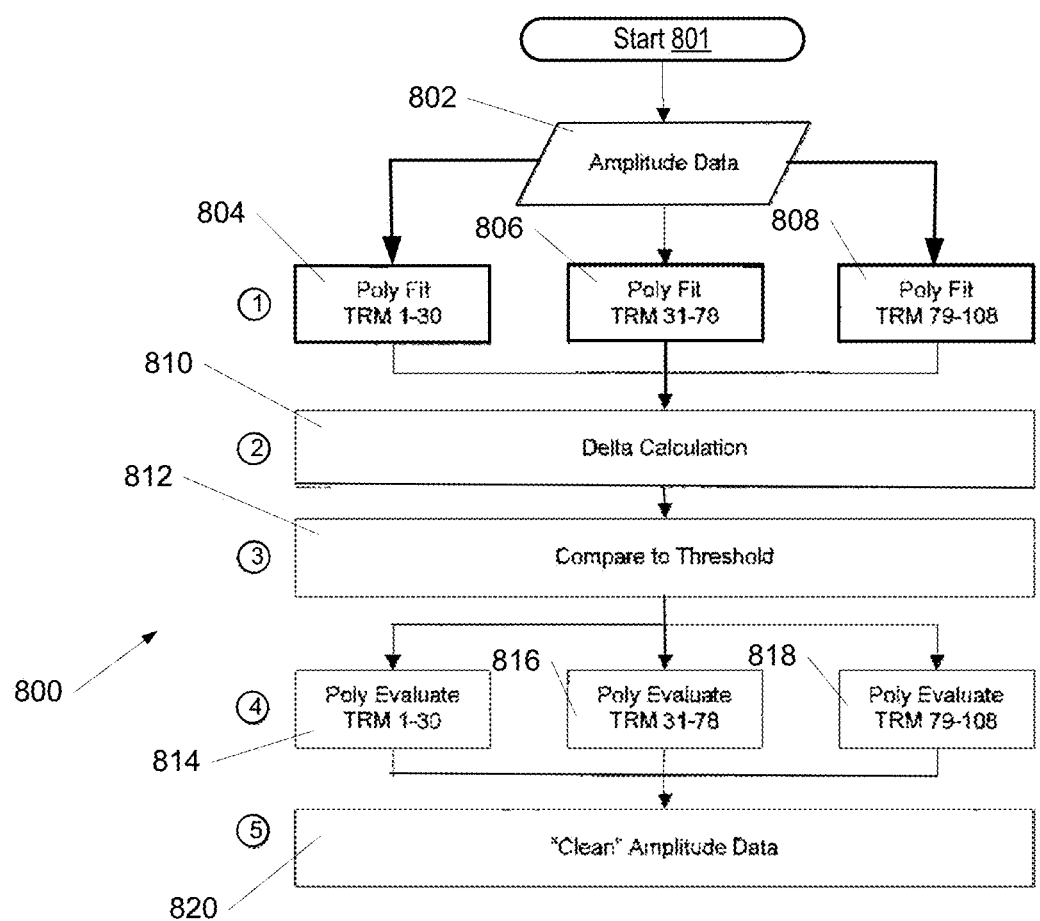
FIG. 9B is a flowchart showing details of a method for detecting amplitude outliers, usable with the processes of FIGS. 7 and 8, in accordance with one embodiment.

Regarding identification of amplitude and phase outliers (block 540 of FIG. 8), reference is now made briefly to FIG. 9B, which is a flowchart showing details of a method 800 for detecting amplitude outliers, usable with the top level process of FIG. 7 and the more detailed process of FIG. 8 (discussed further below), in accordance with one embodiment. Referring to FIG. 9B, the method 800 takes the received amplitude data (block 802) and divides it into 3 sections of the array 804, 806, 808 (e.g., as shown in FIG. 9B, TRMS 1-30, 31-78, and 79-108, but this is not limiting). Note that division into three sections is not limiting, and other ways of dividing the array are, of course, possible. This division is due to the hybrid 2-packs 1014 creating a discontinuity in the amplitude data. For each respective subdivided section, a polynomial fit is computed (blocks 804, 806, 808, respectively).

Then, the delta is calculated between the respective polynomial fits and the actual data (block 810). The delta is compared to a predetermined threshold to determine outlier TRMS 24 (block 812). For each respective subdivided section of the array, the outliers are evaluated (blocks 814, 816, 181, respectively) and replaced with values from the polynomial fits computed in blocks 804, 806, and 808 respectively. Then, the 3 subdivided sections (with replaced values) are combined for a new "clean" data set (block 820). This clean data is used during the curve fitting and model solving of blocks 127-130 of FIG. 7 and for identifying amplitude outliers in block 540 of FIG. 8 (discussed further herein).

Figures 1, 9C:
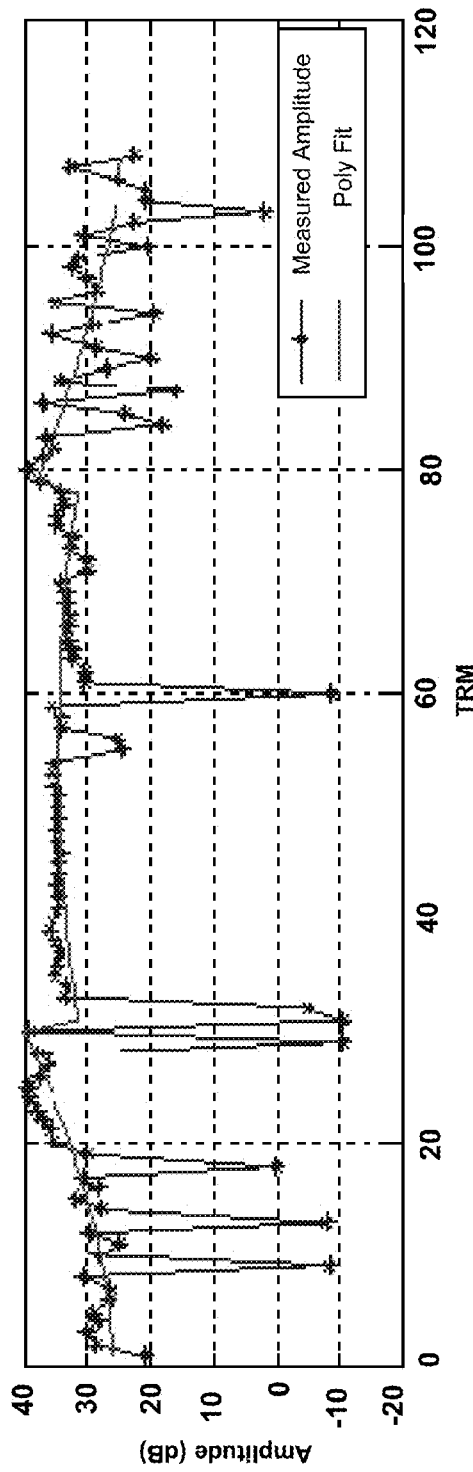
Figures 2, 9C:
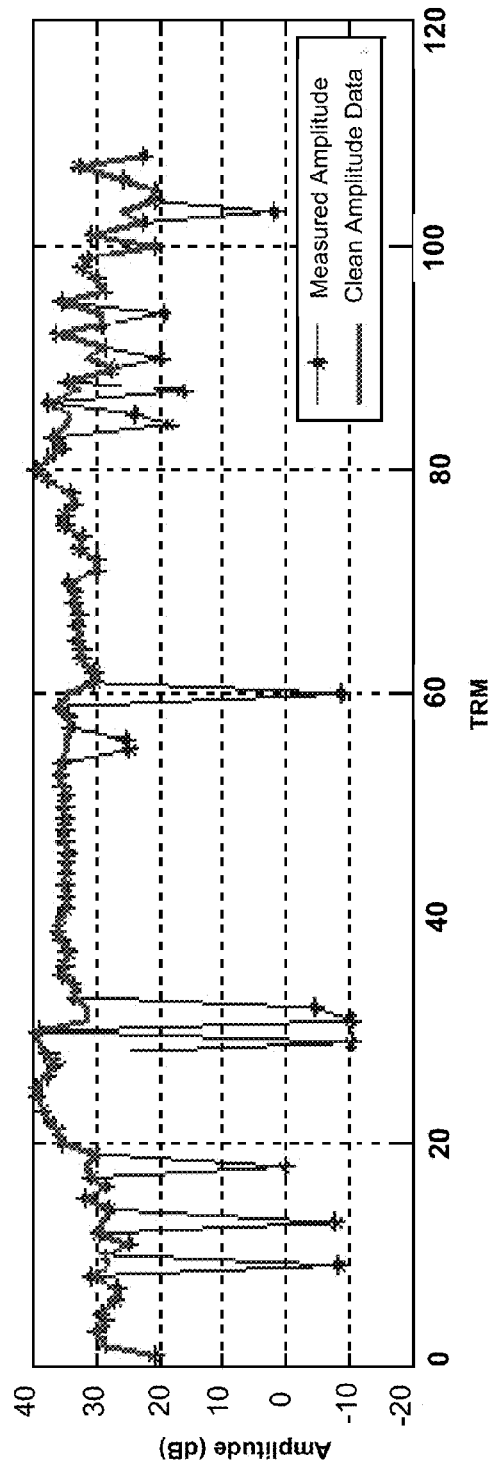

FIGS. 9C-1 and 9C-2 show example results of the amplitude outlier detection using the method of FIG. 9B. FIG. 9C-1 shows the measured amplitude data with the polynomial fit. FIG. 9C-2-shows the data after it has been cleaned using the polynomial evaluations of FIG. 9B, where the darker line running along the top of the graph substantially follows the path of the "poly fit" line in FIG. 9C-1.

Figure 9D:
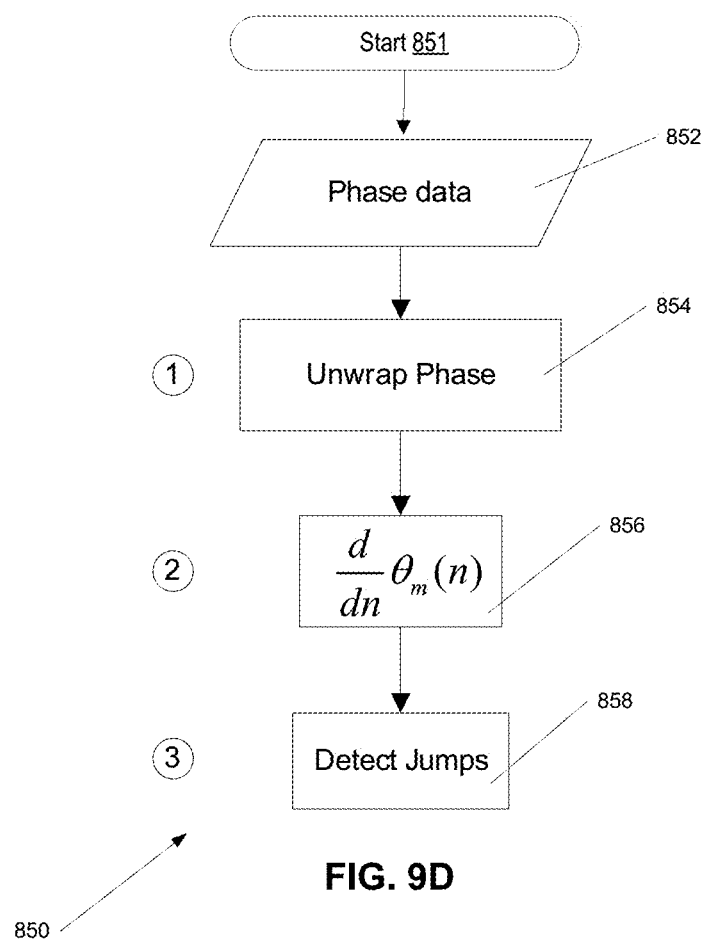
FIG. 9D is a flowchart showing details of a method for detecting phase outliers, usable with the top level process of FIG. 7, in accordance with one embodiment.

For phase outliers, FIG. 9D is a flowchart showing details of a method for detecting phase outliers, usable with the top level process of FIG. 7 and the more detailed process of FIG. 8, in accordance with one embodiment, and FIGS. 9E-1 and 9E-2 are a pair of graphs showing an example of the results of phase outlier detection, in accordance with the method of FIG. 9D. As will be appreciated, detecting phase outliers, in some instances, can be challenging due to the so-called "phase wrapping" of the measured data. FIG. 9D shows the steps used to determine phase outliers, in accordance with one embodiment. The TRM's 24 that are flagged as phase outliers are excluded when running the phase model solver of FIG. 9F (block 560 of FIG. 8). Referring now to the flow chart 850 FIG. 9D, when the phase data (block 852) is received, the phase data is unwrapped (block 854). While unwrapping, a derivative of unwrapped phase is taken (block 856). Based on that, the method can detect "jumps" or discontinuous behavior in the unwrapped phase data (block 858).

For example, FIGS. 9E-1 and 9E-2 illustrate an example of phase data that indicates multiple modules with bad phase. FIG. 9E-1 shows measured phase along the x-axis, and shows the raw data with identified outliers marked as indicated with a circle (some, but not all of the outliers are labeled as "Possible bad modules." For clarity, only some of the outliers are specifically labeled herein, although any outlier possibly could correspond to a bad module. The x-axis in FIG. 9E-2 shows the attempted unwrapping of that phase with detected outliers marked. As can be appreciated, the method for phase outlier detection and correction of FIG. 9D could, in some embodiments, be modified to use a recursive phase unwrap algorithm, which can help reduce a tendency to remove valid points as a result of a jump back from a bad point.

Referring again to FIGS. 7 and 8, at block 127 (FIG. 7), the process for solving for the model (which is described further herein in connection with blocks 560-570 of FIG. 8) and the projected parabolic fit (block 550 of FIG. 8) also compares measured data (for amplitude and phase) with the theoretical data. The theoretical data for phase and amplitude is based on the phase distance and free space path loss, which is all dependent upon the far field geometry (e.g., as shown in FIG. 5A).

Regarding theoretical phase first, referring to FIGS. 5A and 7, the theoretical phase, $\theta_t(n)$, at each super-element is dependent on the distance between the horn 28 and the array 27, measured in wavelengths. Each wavelength equates to $2\pi$ radians; therefore the expected phase is calculated by multiplying the distance in wavelengths by $2\pi$. In equation form, $$\theta_t(n) = \left(-\mathrm{mod}\left[d(n) + \left(\frac{\Phi}{2\pi}\right)*\lambda\right], \lambda\right)*2\pi \right) \tag{2}$$

where n is the super element number (1-84)
mod is the modulos operation
$\Phi$ is the phase offset (rad)
$\lambda$ wavelength (m)
d(n) is the distance from the horn to the array super element.

Figure 9F:
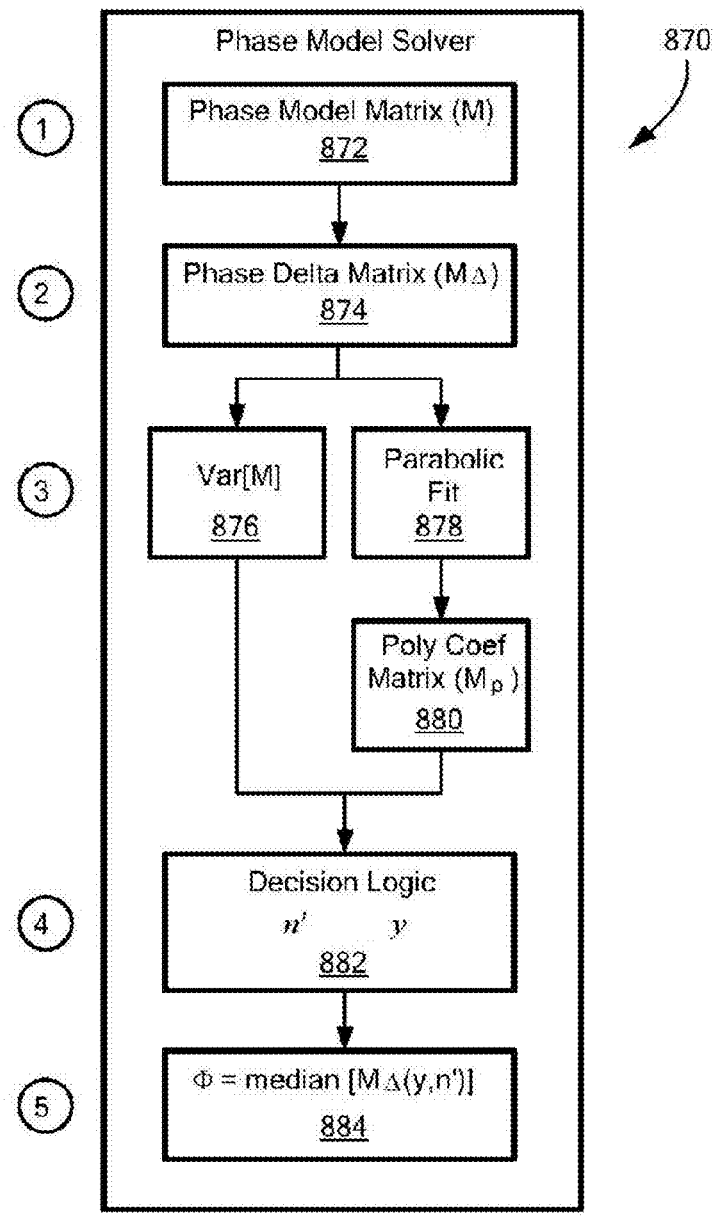
FIG. 9F is a flowchart showing a method of solving for unknowns in a phase model equation, in accordance with one embodiment.

FIGS. 9D through 9F and their associated discussion provide further information on solving for the unknowns in equation (2). The distance from the horn to the array can be expressed as follows:

$$d(n) = \sqrt{x(n)^2 + y^2} \tag{3}$$

where y is the horns distance (m) normal to the phased array
x(n) is the distance (m) along the array, perpendicular to the y vector.

The distance x(n) can be calculated based on the element spacing and the array super element that is normal to the horn 28 (see FIG. 5A). In equation form, $$d(n) = \sqrt{x(n)^2 + y^2} \tag{4}$$

The phase delta is calculated by comparing the measured phase, with the theoretical phase.

$$\theta_\Delta(n) = \theta_t(n) - \theta_m(n) \tag{5}$$

where $\theta_t(n)$ is the theoretical phase $\theta_m(n)$ is the measured phase Regarding theoretical amplitude, the theoretical amplitude can be calculated as the summation of losses in the BF path. The relative gain between super elements is of concern, not the absolute gain. An offset term is used to align the theoretical with measured, however the geometric parameters will define the relative gain. In equation form:

$$A_t(n) = L_{total}(n) + A_{offset} \tag{6}$$

where $L_{total}(n)$ is the total RF chain loss in dB $A_{offset}$ is the amplitude offset in dB The total RF loss is a summation of multiple parameters including a 3 dB loss due to polarization loss between antennas (circular to linear).

$$L_{total}(n) = L_p(n) + G_h(n,\phi) + G_a(n,\phi) + \beta(n) + \gamma(n) + 3 \tag{7}$$

where $L_p(n)$ is free space path loss (dB)

$G_h(n,\phi)$ is the horn antenna gain (dB)

$G_a(n,\phi)$ is the array antenna gain (dB)

$\beta(n)$ is the Taylor weighting (dB)

$\gamma(n)$ is the 2-pack loss (dB)

The Free Space Path Loss (FSPL) is calculated as follows:

$$L_p(n) = 10 * \log\left(\frac{4\pi d}{\lambda}\right) \tag{8}$$

Figures 5C, 5D:
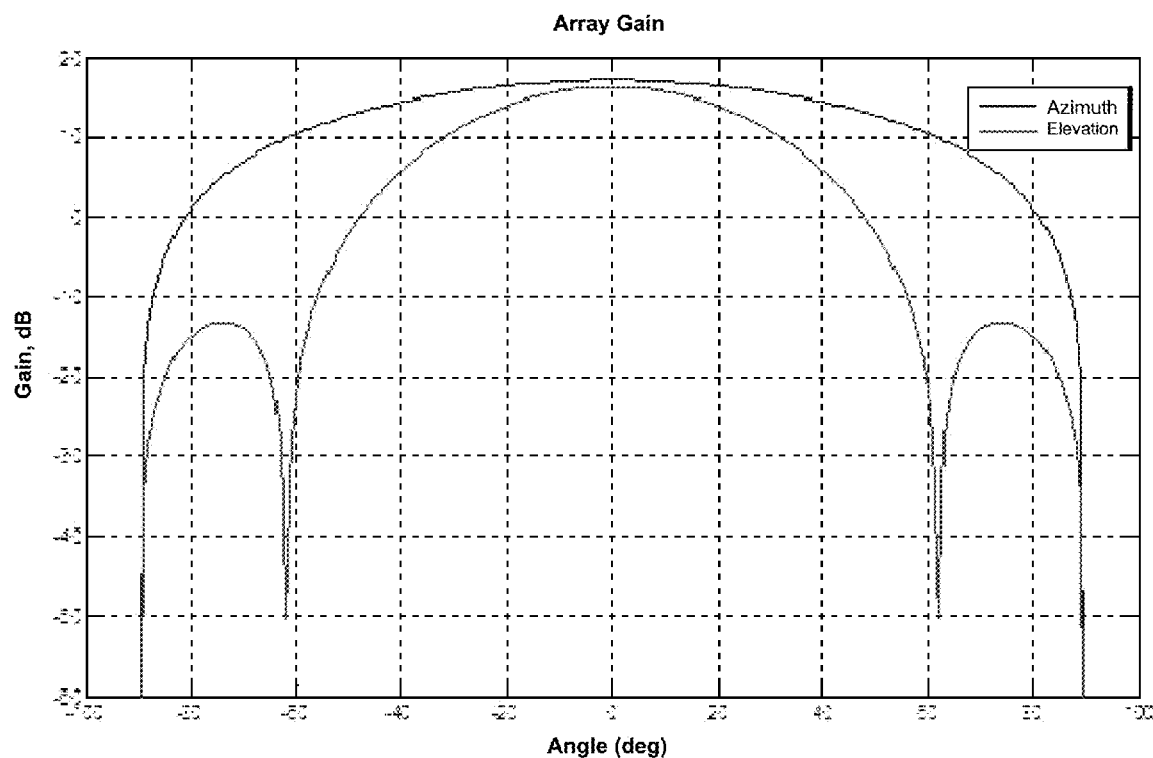
FIG. 5C is a table of an exemplary Super Element pattern structure, in accordance with one embodiment.
FIG. 5D is a plot of an exemplary Super Element Radiation Pattern, in accordance with one embodiment.
Figure 5E:
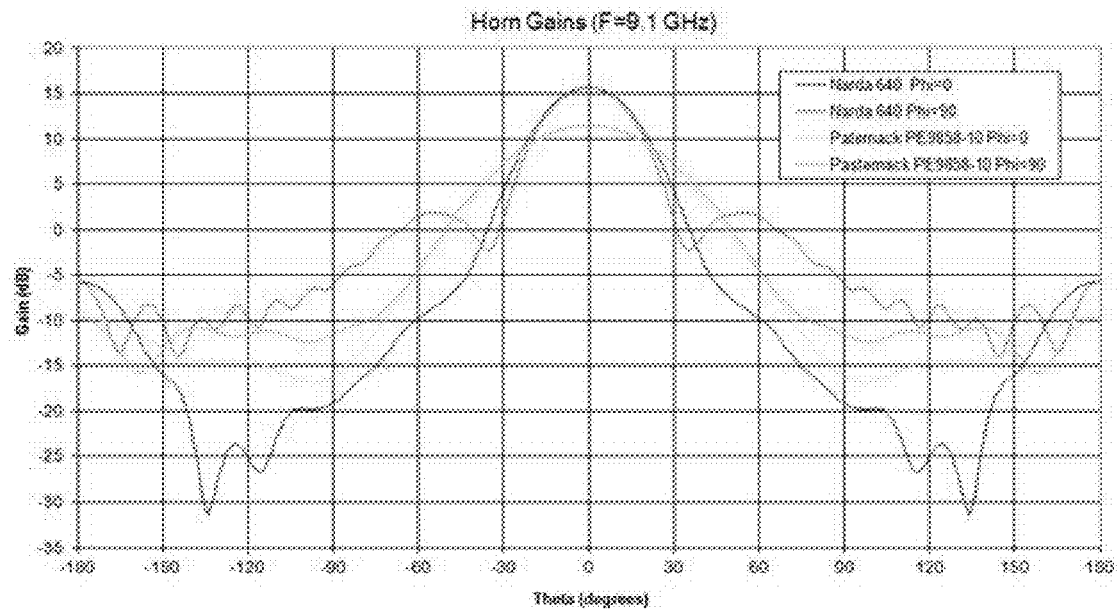
FIG. 5E is a plot of calibration horn gain patterns for several exemplary calibration horns, in accordance with one embodiment.
Figure 5F:
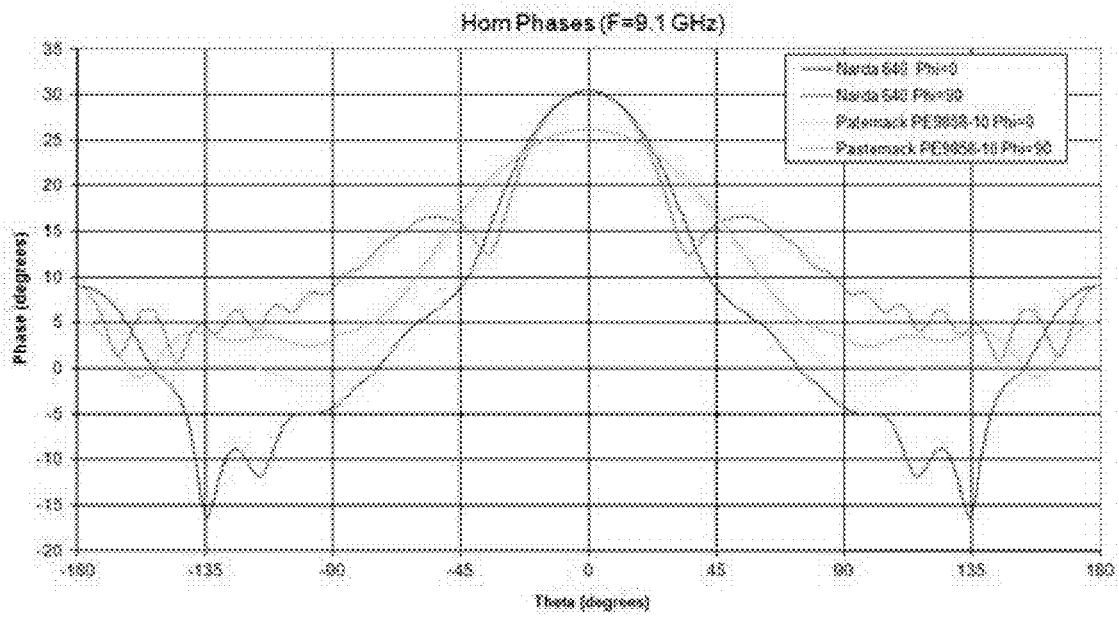
FIG. 5F is a plot of calibration horn phase patterns for several exemplary calibration horns, in accordance with one embodiment.

The antenna gains are determined from normalized lookup tables. For example, FIG. 5C is a table of an exemplary Super Element pattern structure, in accordance with one embodiment, showing gain and phase. That is, in FIG. 5C, the first column is angle, second and third columns are gain, and fourth and fifth columns are phase. FIG. 5D is a plot of an exemplary Super Element Radiation Pattern, in accordance with one embodiment. The incident angle to the antenna may be required to account for the tilt along the aperture under test, φ, of the calibration horn 28. In addition, reference patterns for the calibration horn 28 in use can also provide relevant information. FIGS. 5E and 5F provide, respectively, gain and phase patterns for exemplary calibration horns 28 (the brands used are the Narda 640 and the Pasternack PE9858, but these examples are not limiting).

Figure 5G:
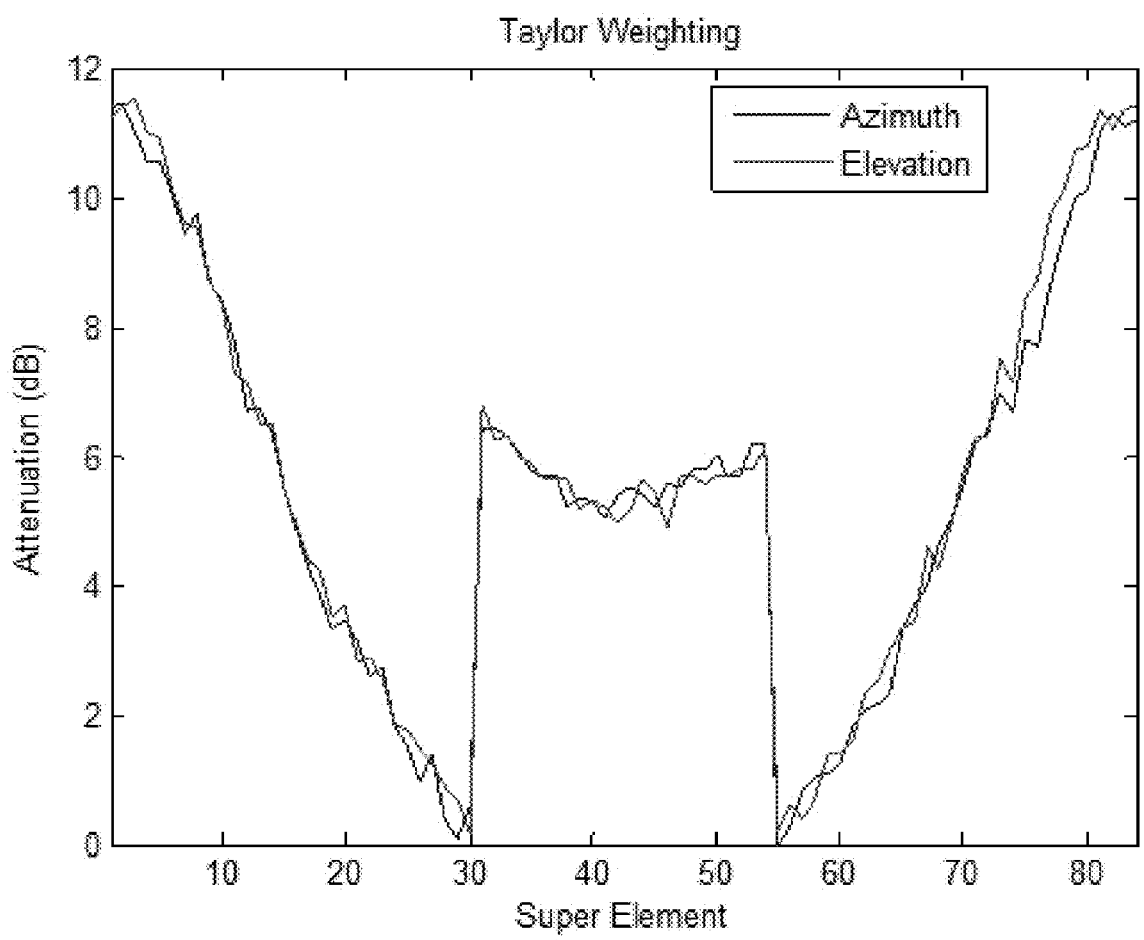
FIG. 5G is a plot of Taylor weighting loss, in receive mode only, in accordance with one embodiment.

The Taylor weighting term in equation (7) above provides amplitude weighting to achieve low sidelobe levels in receive mode, specifically −30 dB sidelobe levels with 4 minor lobes of nearly constant amplitude. An illustrative example of amplitude Taylor weighting (taken from measured data), usable with at least some embodiments, is shown in FIG. 5G. The 2-pack 1014 loss accounts for the hybrid TRMs 24 on the receive path. The amplitude delta is calculated by comparing the measured amplitude with the theoretical amplitude:

$$A_\Delta(n) = A_t(n) - A_m(n) \tag{9}$$

In addition to the above computations, in one embodiment, Amplitude and Phase Delta decision aids (discussed further below) help to show the difference between the theoretical model and measured values. When the phase solver (discussed below) is finished running, the phase delta plots should look similar to the azimuth (left) plots in FIG. 9A-1. Amplitude delis plots should look similar to the elevation (right) plots in FIG. 9A-2. In these plots, outliers can be seen but there is no general trending of the data. However, the elevation plots in FIG. 9A-1 and the azimuth plots in FIG. 9A-2 are not normalized correctly. They show a tilt or bow trending of the measured data. In at least some embodiments, the automatic portion of the tool performs most of the adjustments of the normalization issues. In at least some of these situations, however, some manual fine-tuning adjustments may be necessary to manually adjust normalization issues and correct them before moving on with at least some of the LRU or calibration changes.

Referring again to FIGS. 7 and 8, after the projected parabolic fit (block 550) is generated based at least in part on detecting and correcting amplitude and phase outliers (blocks 127 of FIG. 7 and 540 of FIG. 8), as discussed herein, phase (block 560) and amplitude (block 570) model solvers can be run. The aforementioned theoretical phase information is used (see discussion of FIG. 7, blocks 125-130, above) to further solve for the phase (block 560). In addition, in at least one embodiment, a phase model solver process is used to solve for equation (2) above (see FIG. 9F).

Regarding the phase model solver (block 560), more detail is found in FIG. 9F, which is a flowchart 870 showing a method of solving for unknowns in the phase model equation (2), in accordance with one embodiment. The phase model solver 870 of FIG. 9F is intended to solve, automatically, the unknowns of equation (2). In an alternate embodiment, if desired, a user can manually enter values for some of the unknowns, such as the distance (y) of the calibration horn 28, the super element normal to the horn (n'), and the phase offset (Φ), or the User they can specify a search range to solve for these parameters. If manual inputs are selected, the solver algorithm 870 of FIG. 9F is bypassed.

Assuming that the solver algorithm of FIG. 9F is being used, at block 872, a phase model matrix is generated. Specifically, based on a predetermined (e.g., user specified) range of possible horn distances and super-elements normal to the horn, a phase model matrix of all possible combination of y and n' is generated. This results in a three dimensional matrix of size m×n×p. Where m is the number of y points, n is the number of n' points, and p is the number of TRMs (108). In equation form:

$$M_\theta = [\theta_t(i,j,k)]_{m \times n \times p} \tag{9}$$

Note—at this point there is an assumed phase offset. After the Phase Model Matrix is created, in block 874, a Phase Delta Matrix ((M_Δ) is created, and a matrix of all possible delta values calculated. In equation form:

$$M_\Delta = [\theta_\Delta(i,j,k)]_{m \times n \times p} \tag{10}$$

Next, in blocks 876-880, a statistical analysis is performed. In these blocks, the FFC tool identifies at least some relevant statistical behaviors of the delta matrix computed in block 874, to identify potential model solutions. Ideal model solutions, in one embodiment preferably have substantially flat delta data across all TRM's (i.e., low variance as analyzed in block 876) and have a low statistical spread. The best fit model can be determined by comparing the deviation and the slope of the delta data. FIGS. 9G-1 and 9G-2 show example results of processing a delta matrix.

Figure 9H:
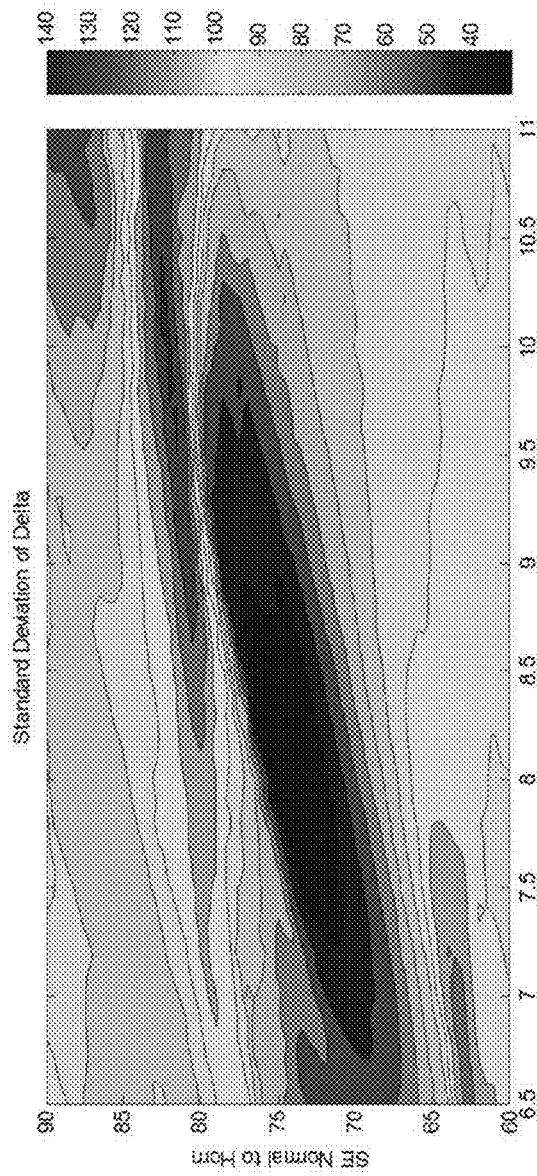
FIG. 9H is a first exemplary graph of overlap regions associated with the method of FIG. 9F and the graphs of FIGS. 9G-1 and 9G-2, showing standard deviation of data, in accordance with one embodiment.
Figure 9I:
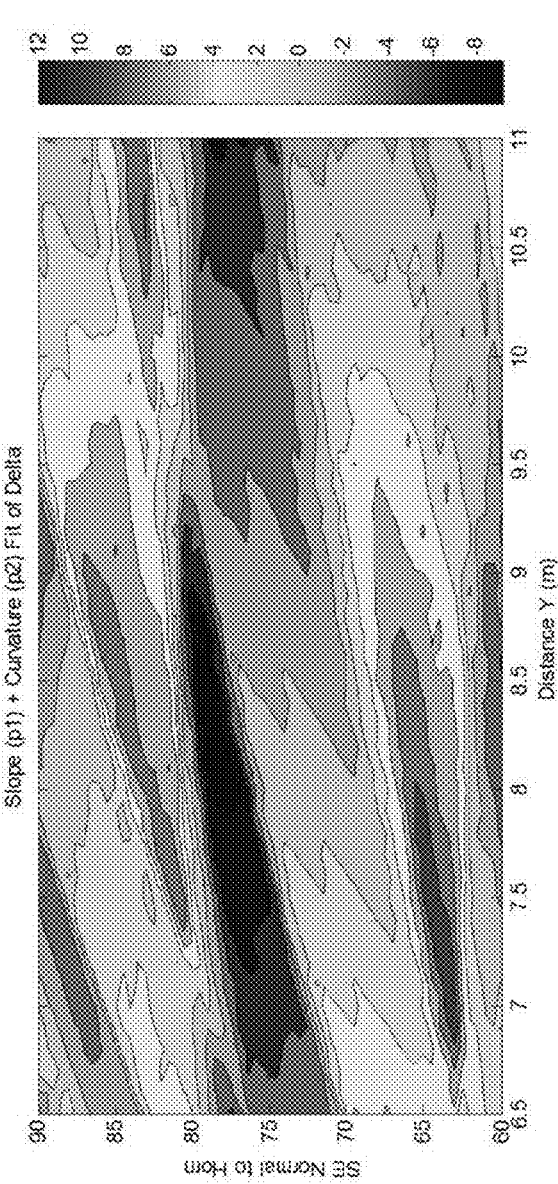
FIG. 9I is a second exemplary graph of overlap regions associated with the method of FIG. 9F and the graphs of FIGS. 9G-1 and 9G-2, showing slop and curvature fit of data, in accordance with one embodiment.

In the decision logic (block 882), statistical data is used to determine the ideal model based on the lowest standard deviation and the minimum slope/curvature of the delta data. The method looks for overlap between the two statistical measurements and chooses the best fit horn's distance (y), and super-element normal to the horn (n'). FIGS. 9H and 9I are exemplary graphs illustrating the overlap regions for the statistical data represented in FIGS. 9G-1 and 9G-2. For this illustrative example, there is overlap around y=8.4 m and around n'=76.

Referring again to the flow chart 870 of FIG. 9F, in block 884, the phase offset is calculated. At this point, the horn 28 distance (y), and super-element normal to the horn 28 (n') have been determined. Next, the phase offset (Φ) determined by taking the median of the delta vector:

$$\Phi = \text{median}[M_\Delta(y,n',:)] \quad (11)$$

Figure 9J:
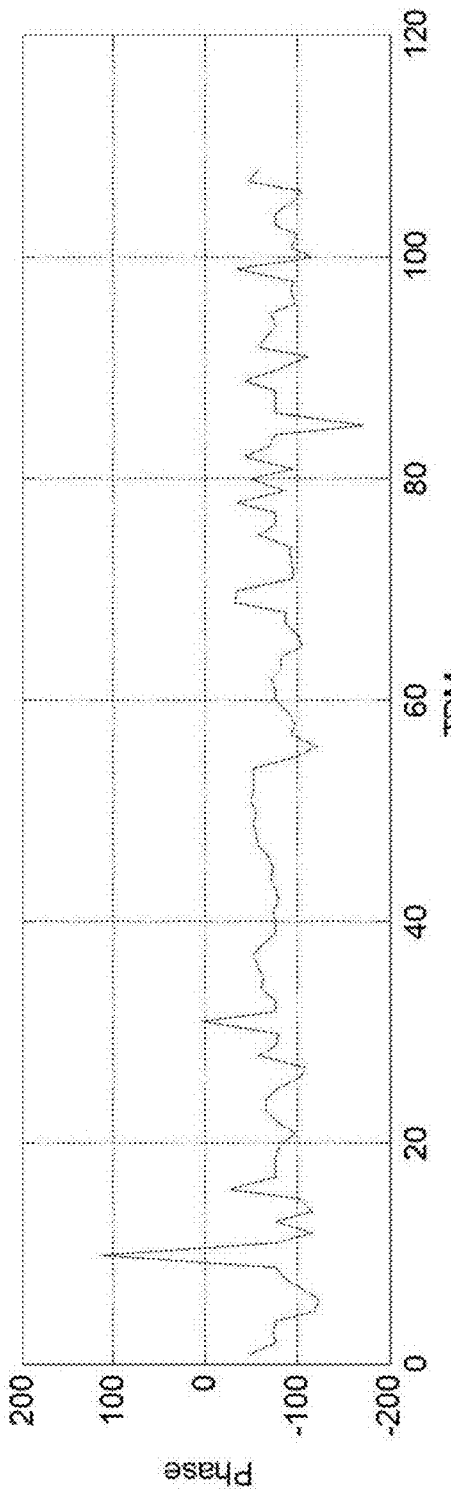
FIGS. 9J and 9K are exemplary graphs of phase offset calculation, in accordance with one embodiment.
Figure 9K:
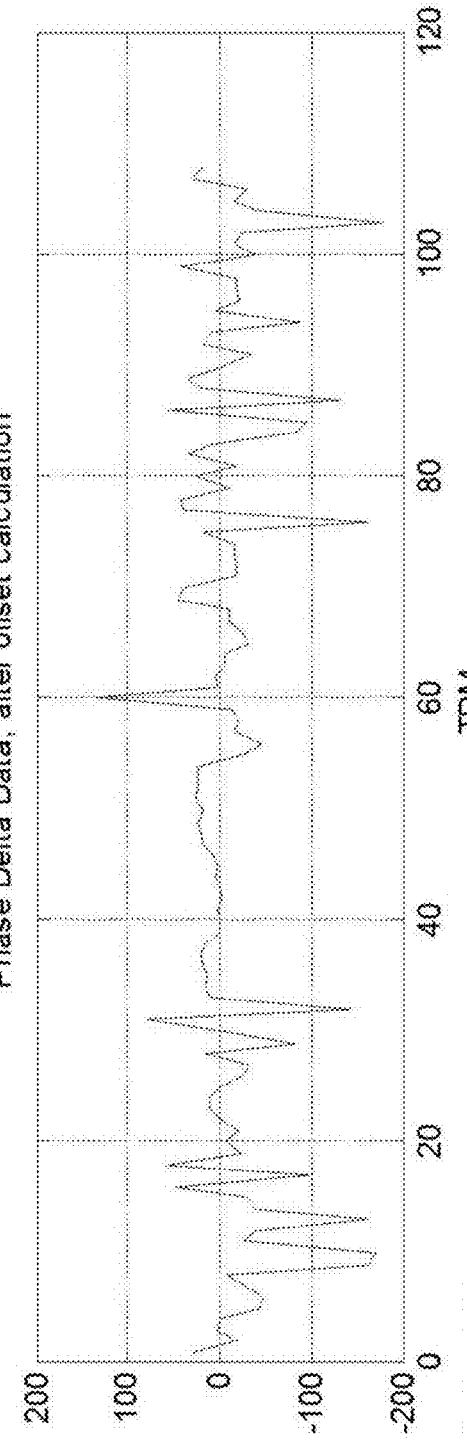

In one embodiment, two iterations of the method of FIG. 9F are used to eliminate issues from phase wrapping. For example, FIGS. 9J and 9K show example phase offset calculations. The bottom axes show the phase delta after the phase offset has been applied.

Referring again to FIGS. 7 and 8, another solver that can be run as part of the solving for model and verification of model (blocks 127-130 of FIG. 7 and block 570 of FIG. 8) is the amplitude model solver (block 570). In the amplitude model solver block 570, a solution is found for amplitude model, equation (6) (discussed above). After calculating the position of the calibration horn 28 using the Phase Model Solver (block 560), there are two unknowns from that equation that will be resolved as part of the amplitude model solver: the amplitude offset ($A_{offset}$) and the horn tilt (φ).

Figure 9L:
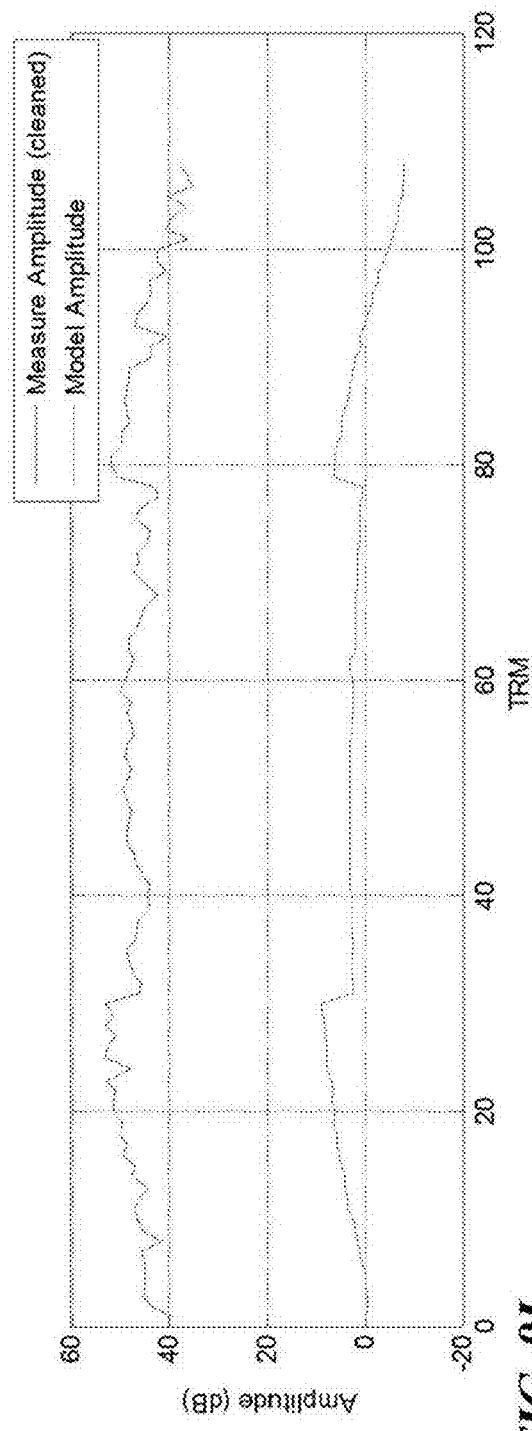
FIGS. 9L and 9M are exemplary graphs of an amplitude model, in accordance with one embodiment.
Figure 9M:
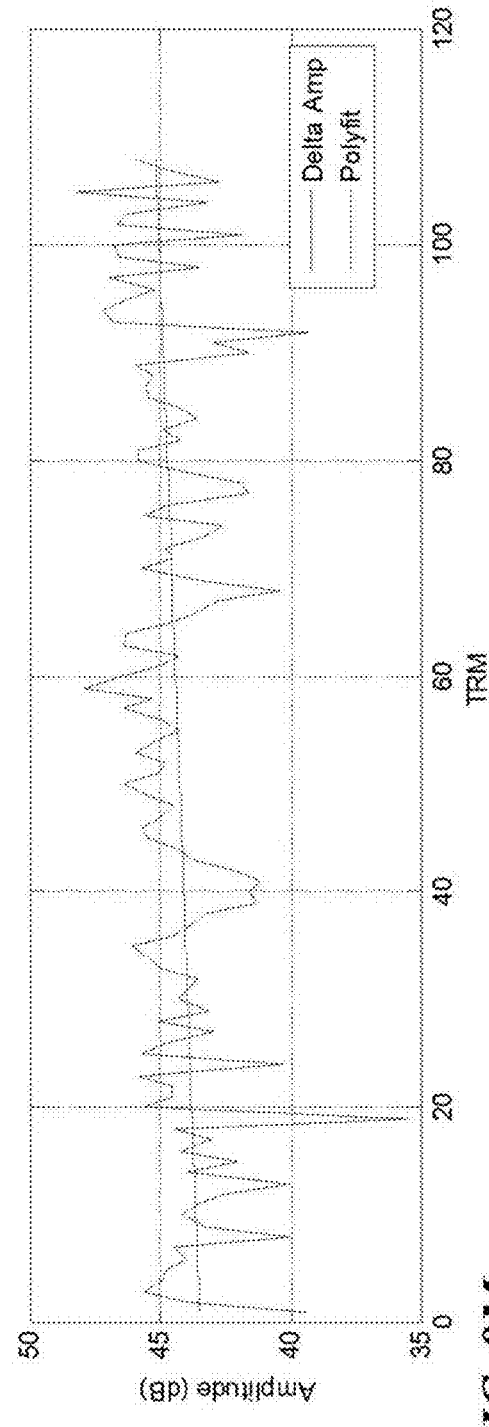

FIGS. 9L and 9M show illustrative examples of an amplitude model with $A_{offset}=0$ and φ=0. FIG. 9L shows the measured amplitude versus the model amplitude. FIG. 9M shows the delta between measured and modeled (equation (8)), with a $1^{st}$ order polynomial fit (green). $A_{offset}$ and φ will be adjusted such that the polyfit has a zero slope and zero intercept. The polynomial fit can be expressed as the conventional slope intercept equation y=mx+b. The tilt is simply the slope multiplied by the number of super elements, multiplied by a deg/dB factor of 1.2. This factor is an estimate and is an opportunity for improvement.

$$\phi = m*84*1.2$$

The amplitude offset is simply the median of y.

Figure 9N:
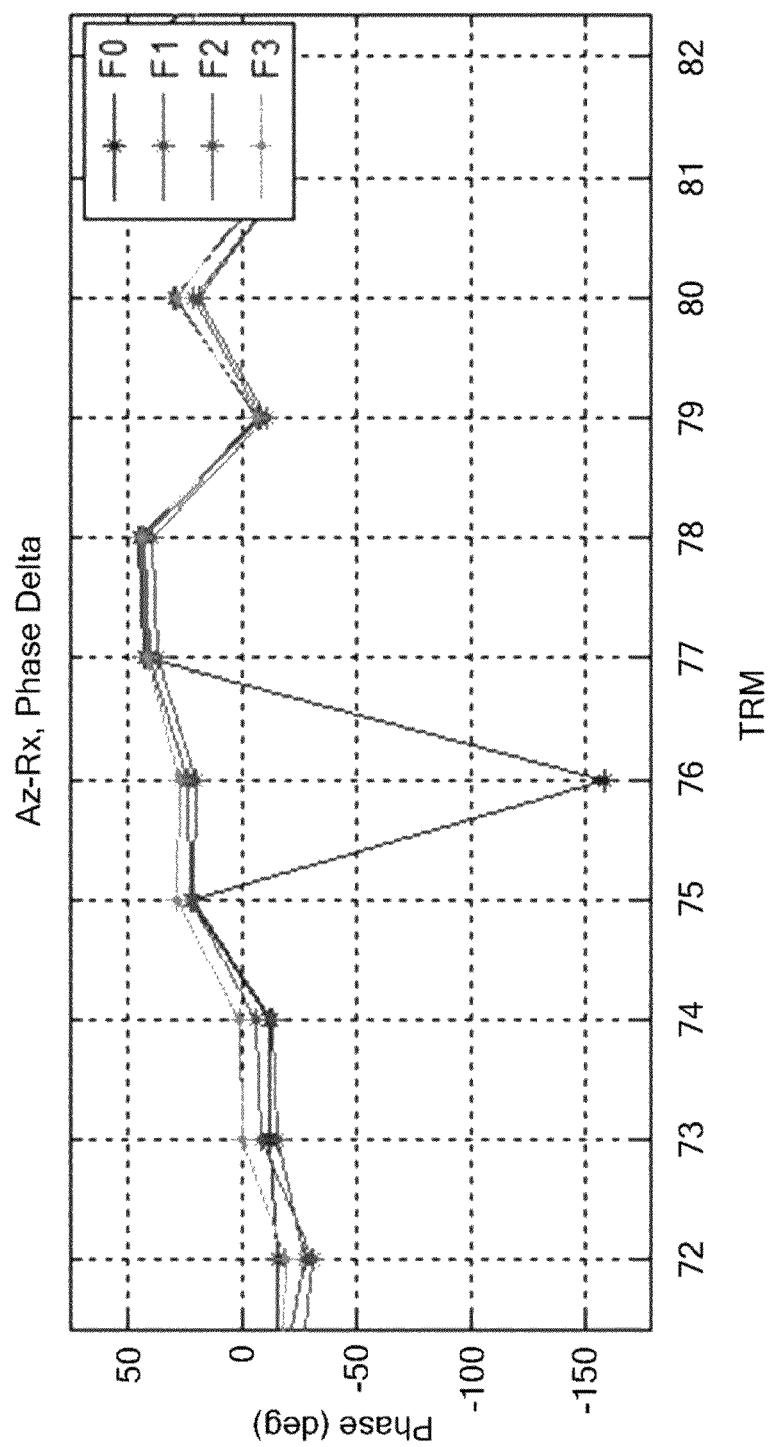
FIG. 9N is an exemplary graph of a frequency outlier, in accordance with one embodiment.

Referring again to FIG. 8, after the phase model solver (block 560) and amplitude model solver (block 670) are run, at this point, each data set (array, mode, frequency) has been processed. The next (optional) step, in some embodiments, can be detecting outliers in frequency data (block 575). FIG. 9N shows an illustrative example of a frequency outlier. In this example of FIG. 9N, F1, F2, and F3 are all showing roughly the same phase delta, while F0 is significantly different. This type of result indicates that the 76th TRM phase measurement for F0 is an outlier. If the other frequency points are not failing, the tool will not consider these outlier data points in the fault assessment. The tool factors in phase wrapping when performing frequency outlier detection.

Referring again to FIGS. 6, 7, and 8, in at least some embodiments, after the amplitude and phase model solvers are run, a fault assessment (block 577) can be run. A fault, in this example and context, means that a TRM 24 phase or amplitude delta does not fall within a predetermined threshold, which can (in some embodiments) be a user defined threshold or other predetermined threshold. That is, if the absolute value of the phase delta exceeds a predetermined phase threshold, then a TRM 24 phase fault is declared. If the absolute value of the amplitude delta exceeds a predetermined amplitude threshold, then a TRM 24 amplitude fault is declared. For example, in one embodiment, a table of TRMs 24 is populated, automatically, with the corresponding delta values for each TRM 24 and an indication as to which TRMs 24 (if any) have a "declared" amplitude or phase fault. These faults can be communicated to a processor, a user (or to another entity helping to perform repairs) in any way desired, as will be appreciated, such as via one of the reports, a notification or alert, etc.

Figure 10A:
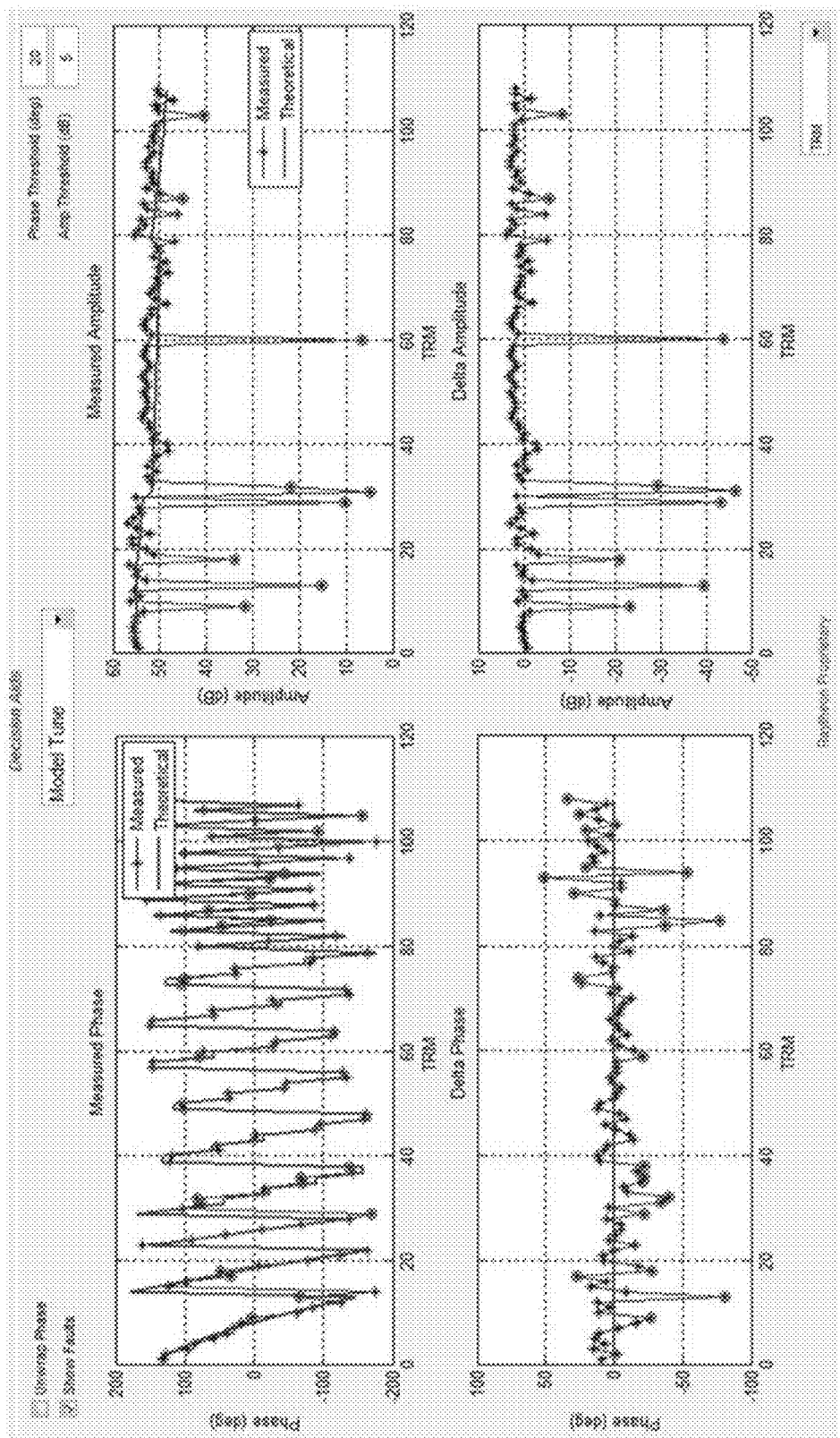
FIG. 10A is an exemplary user interface display of graphs of model tune view decision aids, in accordance with one embodiment.

Referring again to FIGS. 7 and 8, after fault assessment (block 583) is run, and data processing is complete, decision aids (e.g., graphs/plots) can be generated, as well (block 580). For example, in one embodiment, decision aids are provided in the form of data plots/graphs. The plots provide detailed insight into the radar system 11 performance and provide an alternate way to verify data processing calculations. In one embodiment, the decision aid plot can be tailored to a selected, predetermined type of view, such as Model Tune view, Amplitude View, Amplitude Delta View, Phase Delta View, Stability View, and/or Off Array View. These types of views are illustrative and not limiting. Within each view, a choice can be made as to what set of data (array, mode, frequency) is plotted in the decision aid panel, For example, FIG. 10A is an exemplary user interface display of graphs of model tune decision aids, in accordance with one embodiment. The model tune view of FIG. 10A is intended to visually confirm the accuracy of the theoretical model solver. The measured phase/amplitude is compared with the theoretical phase/amplitude data as a function of TRM/Super Element (SE) (selectable in lower right; the SE is the element antenna fed by the TRM). This view can be used to confirm that the delta plots have a slope and offset close to zero. Based on what is in this view, the model can be fine-tuned, if needed, using the Model Tuner panel (e.g., of a graphical user interface (GUI) presented to a user), which enables adjustment of aspects of the model. Some or, advantageously, all of this fine-tuning process also can be automated.

In FIG. 10A, the "measured phase" graph (top left of the exemplary user interface display) shows a theoretical model phase, compared to measured phase, as a function of TRM/SE. The Measured amplitude graph (top right), shows a theoretical model amplitude, compared to measured amplitude, as a function of TRM/SE. The Delta phase graph (bottom left) shows the delta between the theoretical and measured phase. The delta amplitude graph (bottom right) shows the delta between the theoretical and measured amplitude.

Figure 10B:
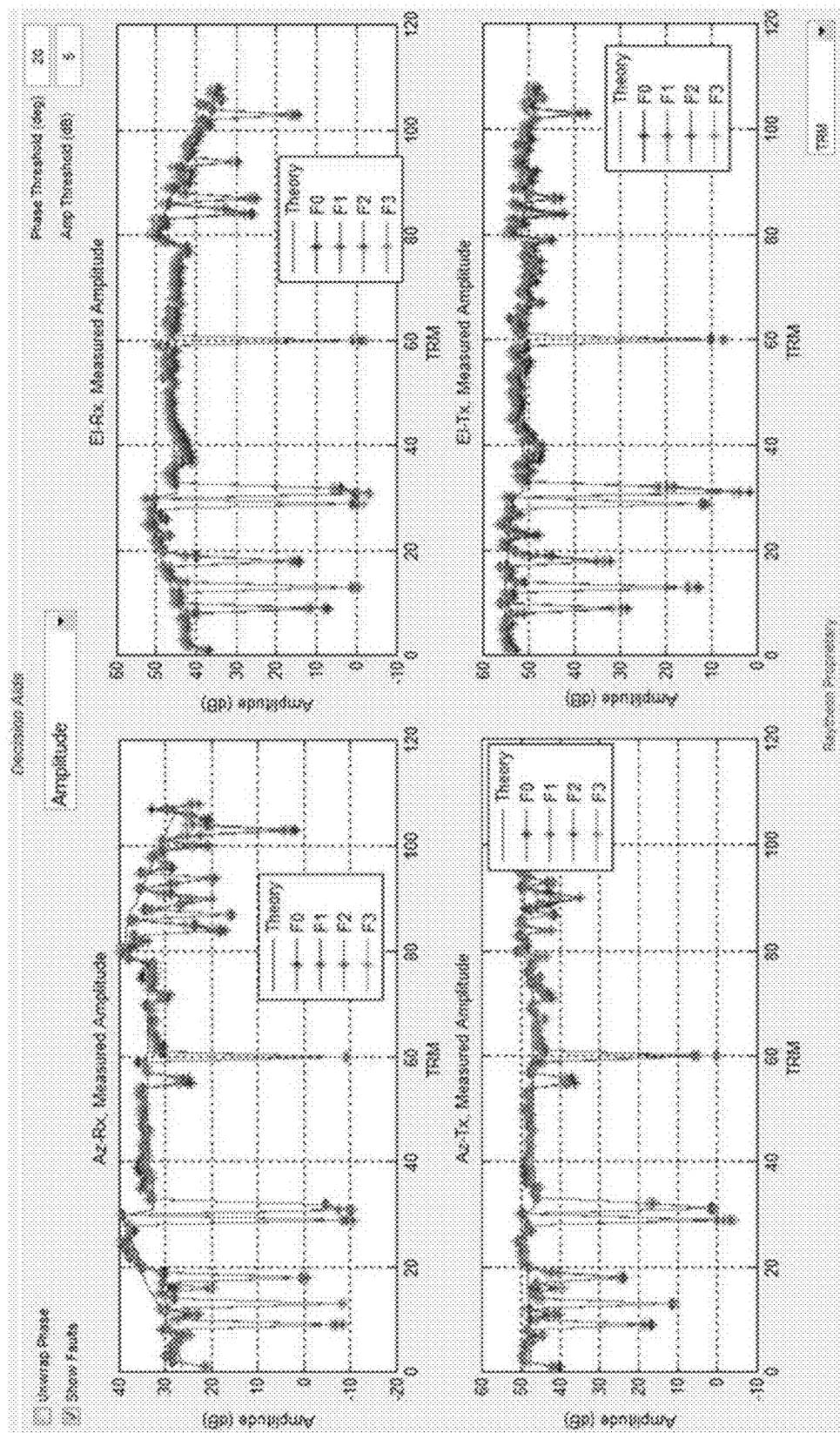
FIG. 10B is an exemplary user interface display of graphs of amplitude view decision aids, in accordance with one embodiment.

FIG. 10B is an exemplary user interface display of graphs of amplitude view decision aids, in accordance with one embodiment. The amplitude view shows the measured amplitude data for all 16 sets of data versus the theoretical curve. This view allows quick verification of the model fidelity for all 16 sets of data, as opposed to the model tune view of FIG. 10A, which only shows a single set. As an example, one of the frequency data sets may have a DC offset relative to other data sets. This issue could be investigated further, automatically or manually, with the model tune view. In a further example, the amplitude view of FIG. 10B is used to check that STC has been set correctly by verifying that the peak amplitude is about 60 dB. This example is, of course, particular to certain radar/antenna configurations (e.g., the aforementioned ATNAVICS system) and is not limiting.

Referring again to FIG. 10B, all of the graphs of the exemplary user interface display show exemplary measured data for frequencies F0, F1, F2, and F3. The graph in the top left view of the user interface display shows the azimuth array, receive mode, amplitude measurements. The graph in the top right view shows elevation array, receive mode, amplitude measurements. The graph in the bottom left view shows azimuth array, transmit mode, amplitude measurements. The graph in the bottom right view shows elevation array, transmit mode, amplitude measurements.

Figure 10C:
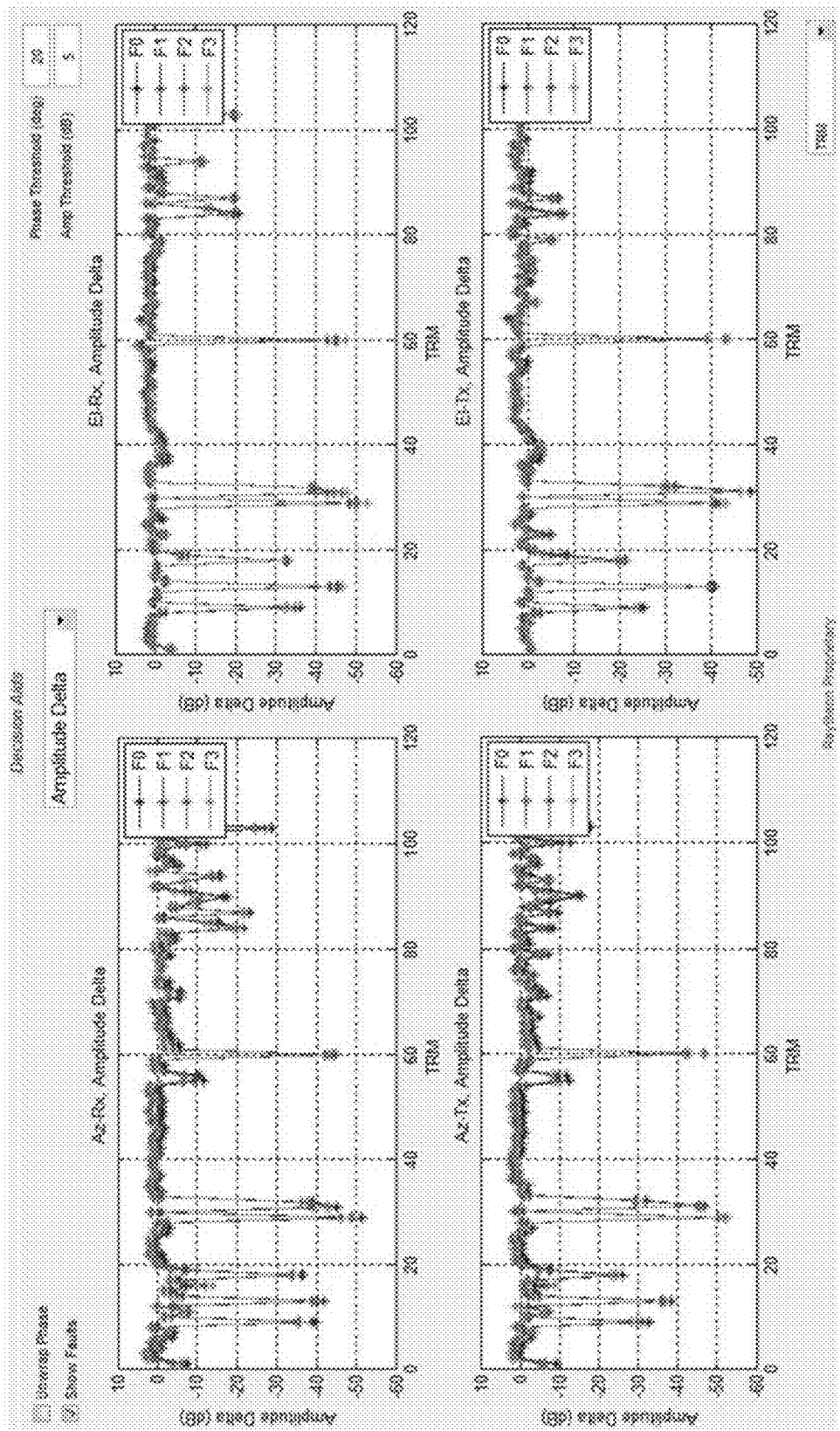
FIG. 10C is an exemplary user interface display of graphs of amplitude delta decision aids, in accordance with one embodiment.

Another decision aid is shown in FIG. 10C, which is an exemplary user interface display of graphs of amplitude delta decision aids, in accordance with one embodiment. The Amplitude Delta view shows the measured amplitude delta data for all 16 sets of data. Amplitude delta data is the difference between measured amplitude and model amplitude. This view can allow quicker verification (whether automatic or manual) of the model fidelity for all 16 sets of data as opposed to the Model Tune view which can, in one embodiment, only show a single set, so this view provides similar benefits as the Amplitude view.

For example, in the exemplary user interface display of FIG. 10C, the graphs show measured data for frequencies F0, F1, F2, and F3. The top left graph shows the azimuth array, receive mode, amplitude deltas. The top right graph shows elevation array, receive mode, amplitude deltas. The bottom left graph shows azimuth array, transmit mode, amplitude deltas. The bottom right graph shows elevation array, transmit mode, amplitude deltas.

Figure 10D:
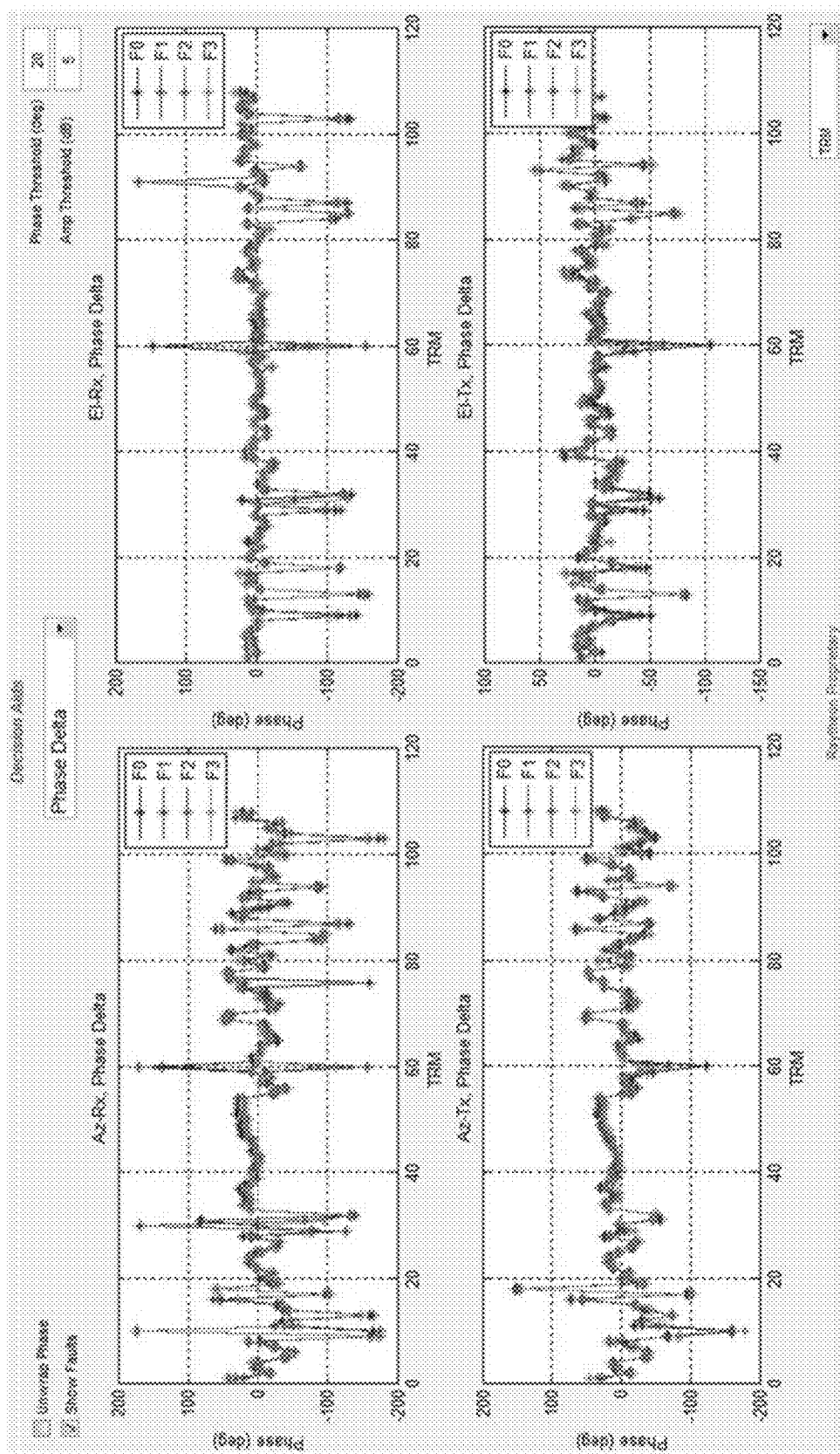
FIG. 10D is an exemplary user interface display of graphs of phase delta view decision aids, in accordance with one embodiment.

FIG. 10D is an exemplary user interface display of graphs of phase delta view decision aids, in accordance with one embodiment. The Phase Delta view in FIG. 10D shows the measured phase delta data for all 16 sets of data. Phase delta data is the difference between measured phase and model phase, phase wrapped to +/−180 degrees. The phase delta view of FIG. 10D allows the user to quickly verify the model fidelity for all 16 sets of data as opposed to the Model Tune view which can, in one embodiment, only show a single set. This view is useful for detecting at least some of the frequency outliers.

In FIG. 10D, the graphs show measured data for four frequencies F0, F1, F2, and F3. The top left graph shows the azimuth array, receive mode, and phase deltas. The top right graph shows elevation array, receive mode, amplitude deltas. The bottom left graph shows the azimuth array, transmit mode, and phase deltas. The bottom right graph shows the elevation array, transmit mode, amplitude deltas.

Figure 10E:
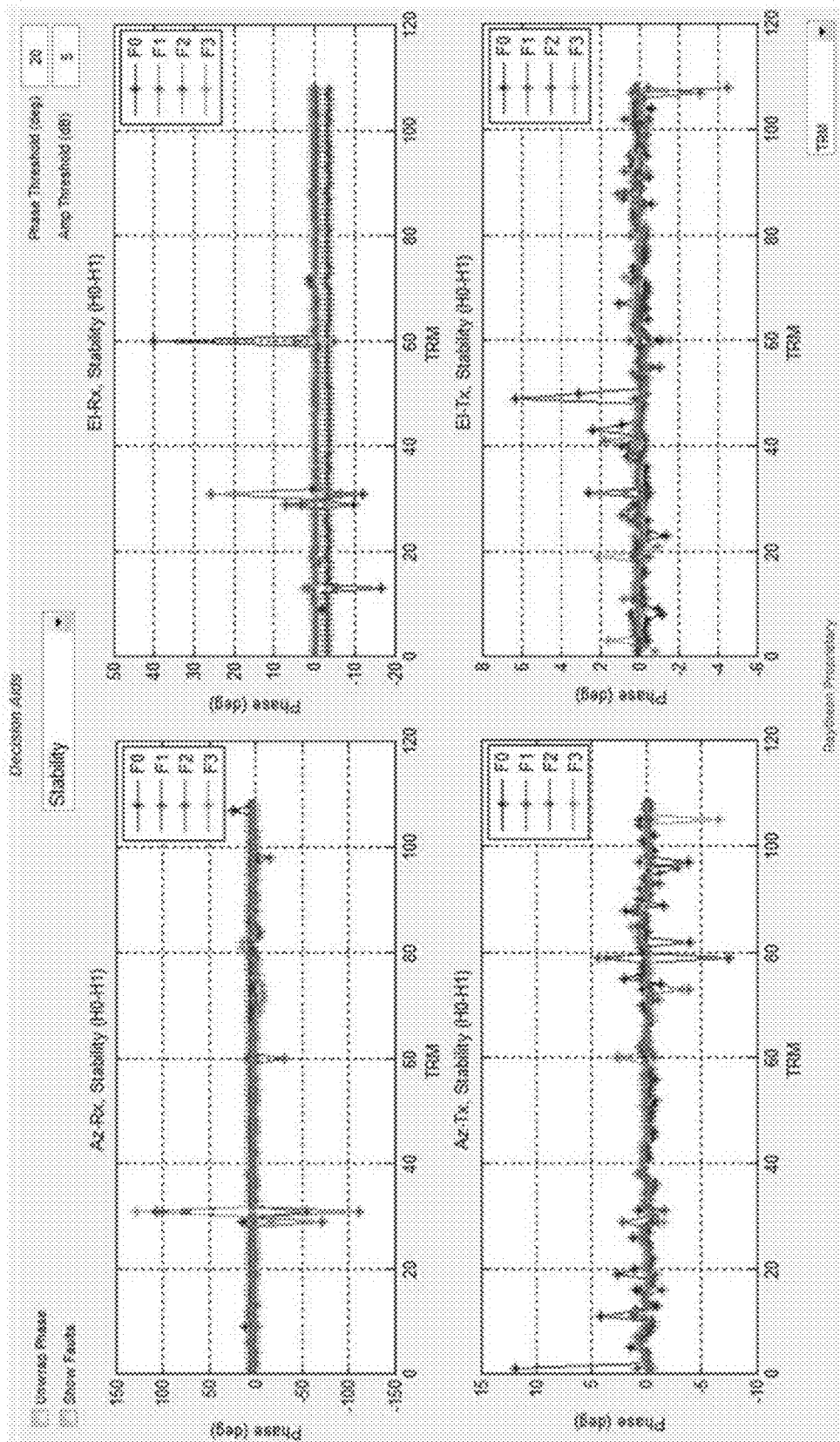
FIG. 10E is a first exemplary user interface display of graphs of stability view decision aids, in accordance with one embodiment.

FIG. 10E is a first exemplary user interface display of graphs of stability view decision aids, in accordance with one embodiment. The stability view of FIG. 1.0E shows the stability vectors for all 16 sets of data (i.e., Table 1). The stability vector is defined as the difference between the H0 and H1 measurements. The stability view of FIG. 10E provides a snapshot of the test configuration stability. Data sets H0 and H1 represent two sample sets of the same measurement (H0, H1 designation has no significance in this test mode) therefore, stability values will ideally be zero. The FFC tool 90 detects at least some large deltas between TRM 24 measurements and provides them in a report. The FFC tool 90 also detects at least some significant DC offsets between H0 and H1 measurements (i.e. El-Rx-F2 shown in FIG. 10E).

Figure 10F:
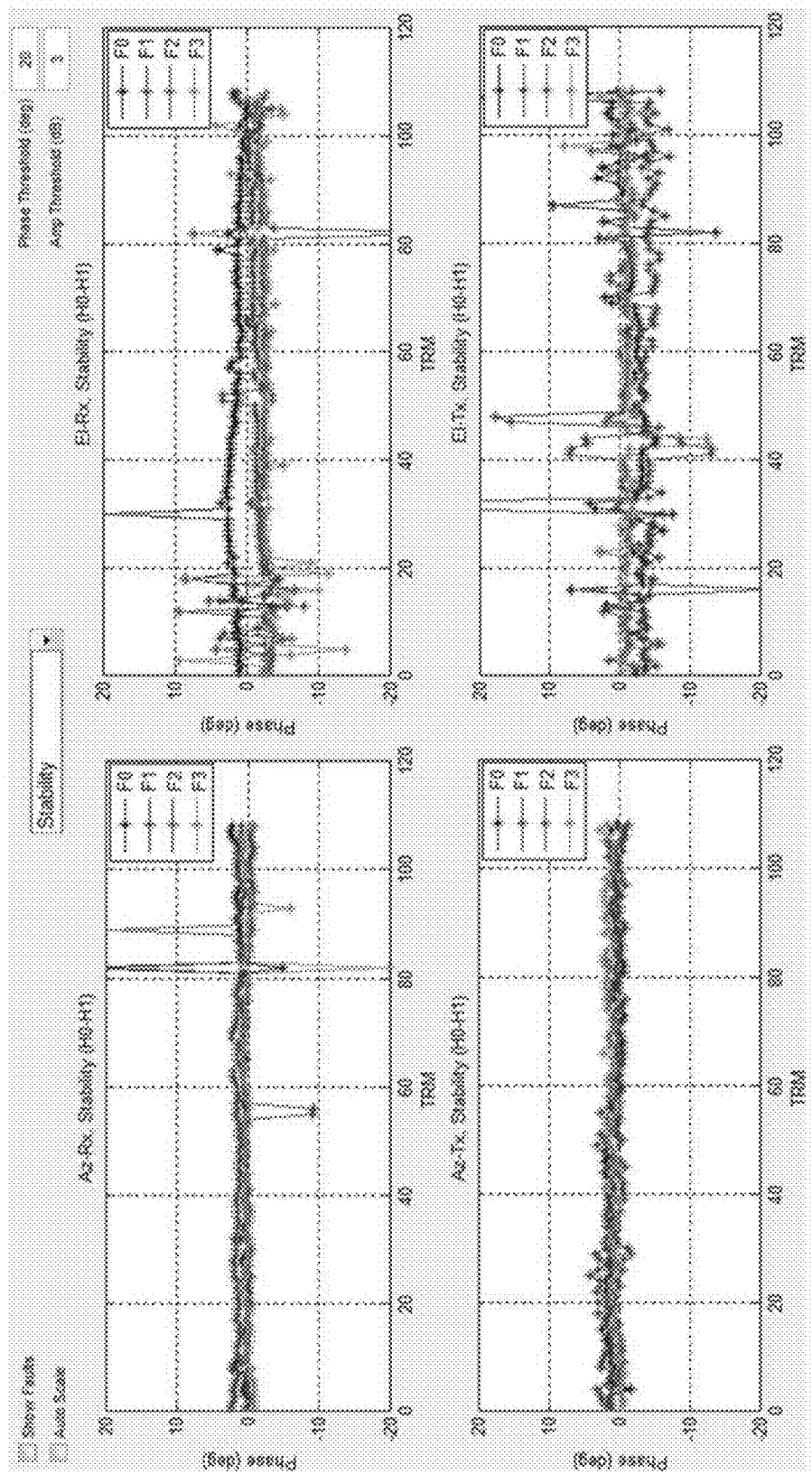
FIG. 10F is a second exemplary user interface display of graphs of stability view decision aids, in accordance with one embodiment.
Figure 10G:
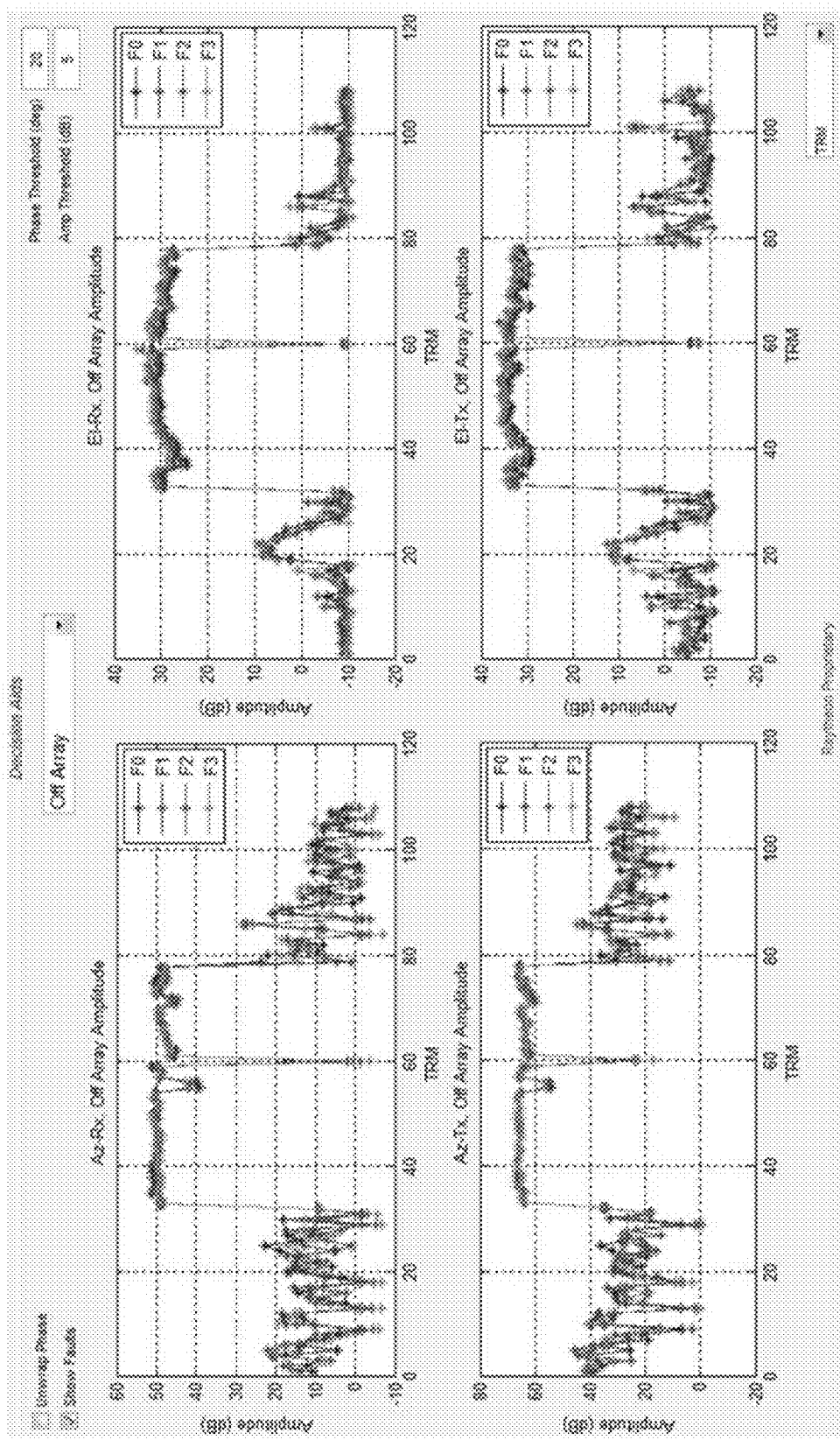
FIG. 10G is an exemplary user interface display of graphs of off-array view decision aids, in accordance with one embodiment.

In FIG. 10F, all of the graphs show stability for F0, F1, F2, and F3. The top left graph shows azimuth array received mode stability. The top right graph shows elevation array received mode stability. The bottom left graph shows azimuth array, transmit mode stability. The bottom right graph shows elevation array, transmit mode stability.

FIG. 10F is a second exemplary user interface display of graphs of stability view decision aids, in accordance with one embodiment. The FFC stability decision aid, shown in the illustrative user interface displays of graphs of FIGS. 10E and 10F, displays the difference of the two sets of on-array measured phase for all combinations if aperture, mode, and frequency. If there is physical movement of the antenna and/or calibration horn antenna during data collection, or phase instability in the receive RF modules, then the stability plots will appear to drift or oscillate. For example, in FIG. 10F, there is some drift shown in elevation data but not enough to warrant a recollection of data. Stability drill and oscillation, in at least some embodiments, advantageously should be within a predetermined limit, such as +/−10 degrees. In FIG. 10F, the large jumps in stability data are caused by amplitude failures, which are expected. Also expected are constant offsets in stability plots. Constant offsets in phase will not affect calibration as they are removed during the FFC tool 90 model solving process. Phase stability can be important for far field passes used for phase calibration.

FIG. 10O is an exemplary user interface display of graphs of off array view decision aids, in accordance with one embodiment. The of array view shows the amplitude data for the "off array" for all 16 sets of data. The off array is defined, as noted previously, as the array not under test and is, in these embodiments, covered with RF absorber 40 (FIG. 3). The off array view, in some embodiments, is used to verify the functionality of the "−2" type TRM switches (TRMs 1-30 and 79-108). These TRMs direct energy to the aperture under test using RF switches. Increased off array energy for these TRMs indicates that the aperture select RF switches are stuck in one position. Increased energy is expected for the "−1" type TRMs (31-54) which employ a quadrature hybrid to direct energy to one of the two apertures and will split energy equally to both apertures during this test.

The graphs in the user interface display of FIG. 10O show measured of array data for F0, F1, F2, and F3. The top left graph shows azimuth array, receive mode amplitude. The top right graph shows elevation array, receive mode amplitude. The bottom left graph shows the azimuth array, transmit mode amplitude. The bottom right graph shows elevation array, transmit mode amplitude.

Figure 10H:
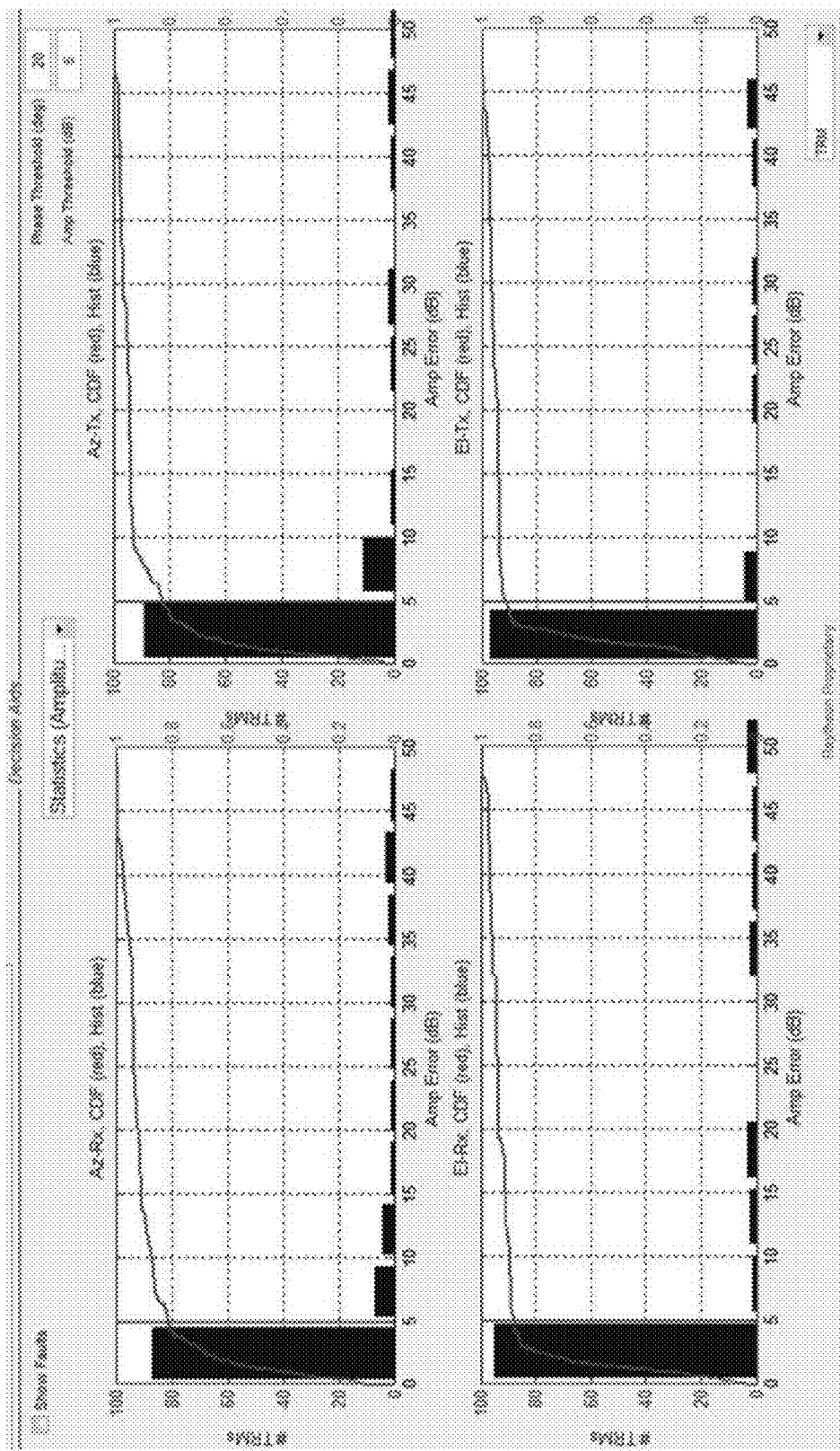
FIG. 10H is an exemplary user interface display of graphs of amplitude statistics view decision aids, in accordance with one embodiment.

FIG. 10H is an exemplary user interface display of graphs of amplitude statistics view decision aids, in accordance with one embodiment. The Amplitude Statistics view in the graph of FIG. 10H shows a Pareto chart for the amplitude delta data. A Pareto chart shows the histogram of TRM deltas with bin counts on the left y-axis, and the cumulative distribution function (CDF) on the right y-axis. The amplitude statistics view provides a summary of the array's overall amplitude performance. Referring to FIG. 10H, note that each graph shows respective information for a given preselected frequency (e.g., seeded via a user interface or other method). The top left graph in the user interface display of FIG. 10H shows the CDF and histogram of amplitude error for the azimuth array in receive mode. The top right graph shows the CDF and histogram of amplitude error for the azimuth array in transmit mode. The bottom left graph shows the CDF and histogram of amplitude error for the elevation array in receive mode. The bottom right graph shows the CDF and histogram of amplitude error for the elevation array in transmit mode.

Figure 10I:
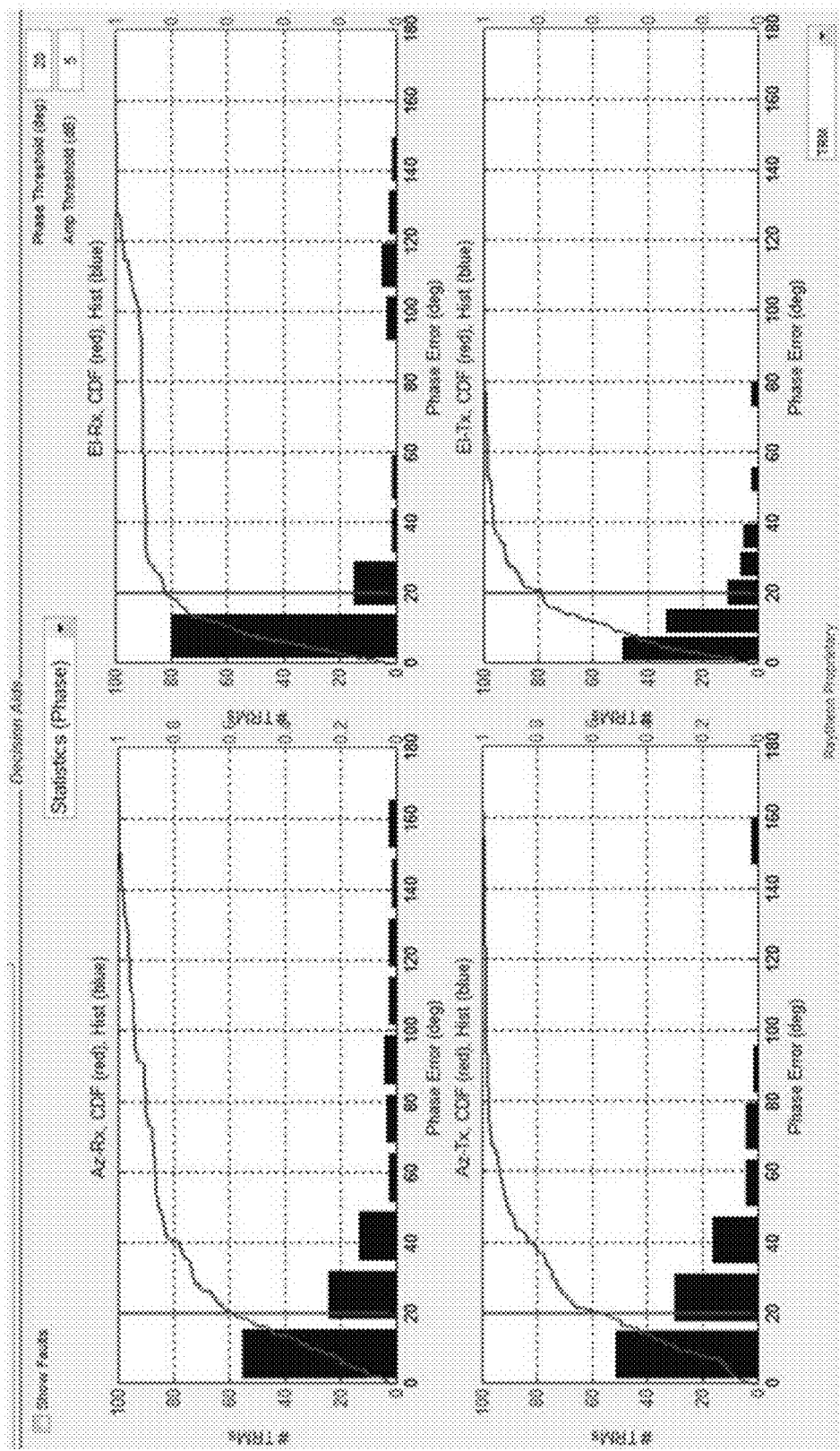
FIG. 10I is an exemplary user interface display of graphs of phase statistics view decision aids, in accordance with one embodiment.

FIG. 10I is an exemplary user interface display of graphs of phase statistics view decision aids, in accordance with one embodiment. The phase statistics view shows a Pareto chart for the phase delta data. A Pareto chart shows the histogram of TRM deltas with bin counts on the left y-axis, and the cumulative distribution on the right y-axis. Referring to FIG. 10I, note that each graph shows respective information for a given preselected frequency (e.g., selected via a user interface or other method). The top left graph in FIG. 10I shows the CDF and histogram of phase error for the azimuth array in receive mode. The bottom left graph shows the CDF and histogram of phase error for the azimuth array in transmit mode. The top right graph shows the CDF and histogram of phase error for the elevation array in receive mode. The bottom right graph shows the CDF and histogram of phase error for the elevation array in transmit mode.

Figure 10J:
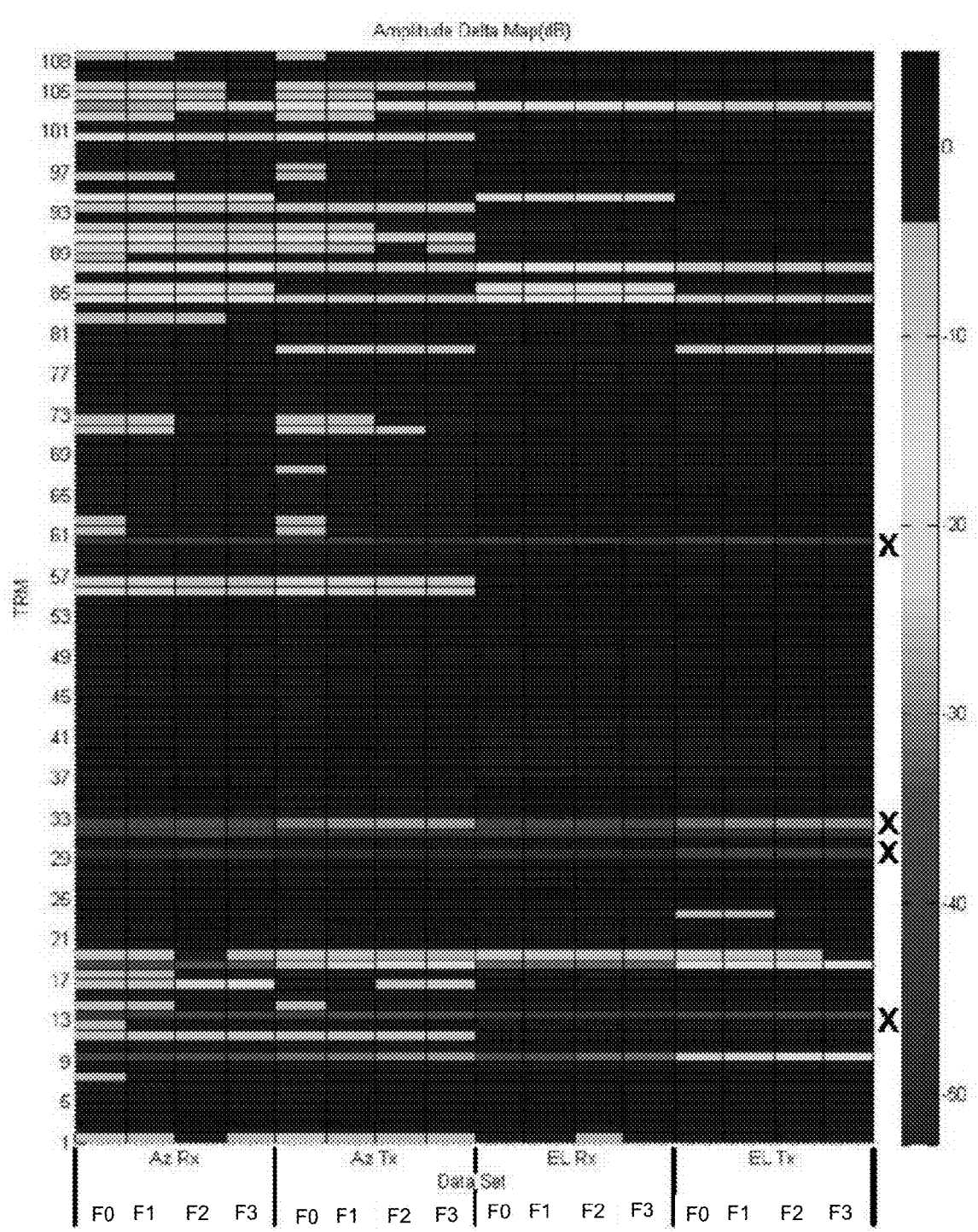
FIG. 10J is an exemplary graph of a 2-pack amplitude evaluation map decision aid, in accordance with one embodiment.
Figure 10K:
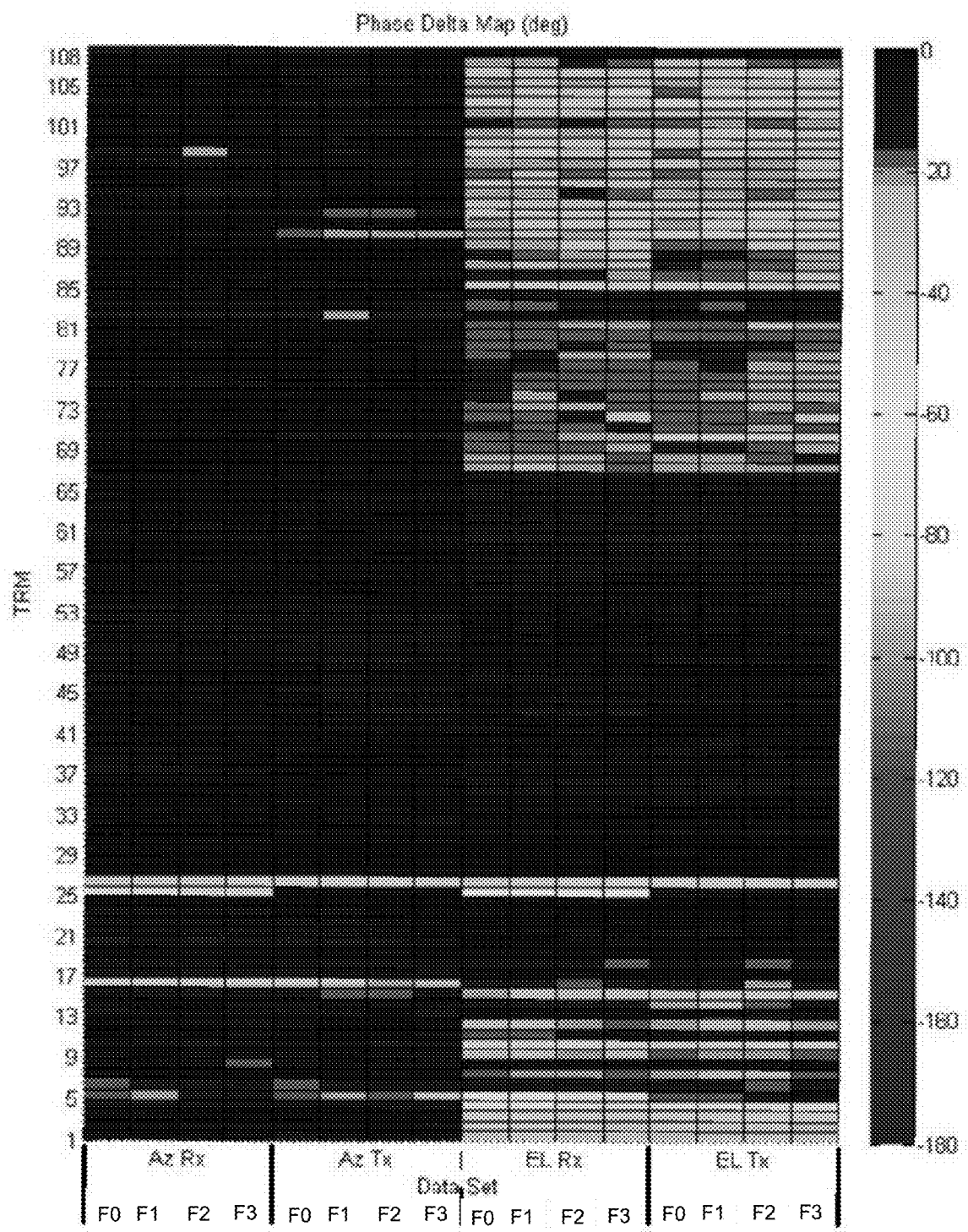
FIG. 10K is an exemplary graph of a 2-pack phase evaluation map decision aid, in accordance with one embodiment.

FIG. 10J is an exemplary graph of a 2-pack amplitude evaluation map decision aid, in accordance with one embodiment, and FIG. 10K is an exemplary graph of a 2-pack phase evaluation map decision aid, in accordance with one embodiment. The 2-Pack Evaluation selection will open two external plots (one for amplitude and one for phase) that show a map of amplitude and phase deltas for each of the 16 configurations. FIG. 10J shows an example amplitude delta map, where each cell of the map represents a single TRM delta value. The y-axis is the TRM, while the x-axis is the Array, Mode, Frequency configuration. The x-axis shows 4 sections, Az Rx, Az Tx, El Rx, and El Tx. The sub ticks within those sections represent each frequency F0-F3. The shading color of the cell corresponds to the delta value shown in the color bar.

The 2-Pack Evaluation amplitude delta plot of FIG. 10J can be used to identify bad 2-packs 1014. If all 16 cells for a given TRM 24 have a significant amplitude error, then the corresponding 2-pack 1014 likely needs replacing. In one example, if only the receive portions show a significant amplitude error, that or can possibly be improved through calibration adjustments. The 2-Pack. Evaluation phase delta plot of FIG. 10K can be used to identify 2-packs 1014 that are poorly calibrated in phase. Note that amplitude calibration adjustments will impact phase calibration and, preferably, should be adjusted incrementally (amplitude first).

In at least one embodiment, some or all of the above-described decision aids are used, at least in part, to help verify that the model is substantially accurate (block 130 of FIG. 7 and block 587 of FIG. 8).

One way of verifying the model, for example, includes graphical comparison (using the decision aids) and analysis of the data. This comparison is, in some embodiments, automated, and in other embodiments it is manual. Thus, in some embodiments, systems, methods, and apparatuses are provided that generate a tool that (a) automatically calculates a calibration model; and (b) includes a set of decision aids that help to automatically validate a calibration model. In various embodiments, the validation can be automatic, manual, or a mix of automatic and manual. As will be appreciated, if a system being calibrated has a large number of failures already present (for example, greater than 50% of elements failing, but this is not limiting), a user may need to review the calibration model and/or validation and make manual corrections to the model if necessary. This is discussed further herein.

Referring briefly to FIGS. 11A-11D, these figures are part of a user interface display of graphs showing exemplary phase stability test data, showing the difference between a first set of sample data H0 and a second set of sample data H1, in accordance with one embodiment. FIGS. 11A-11D show the difference between two samples of the same data set, for phase data, for an exemplary dual aperture phased array antenna. As FIGS. 11A-11D show, the testing was done at four different frequencies: F0 (9027 MHz); F1 (9057 MHz); F2 (9143 MHz); and F3 (9180 MHz). Each respective graph shows an indication of the fidelity of the existing calibration data for the antenna array. The stability data in these exemplary graphs shows the antenna moving during windy conditions, especially in FIG. 11C which shows "highly unstable data" during windy conditions.

Figures 11A, 11B, 11C, 11D:
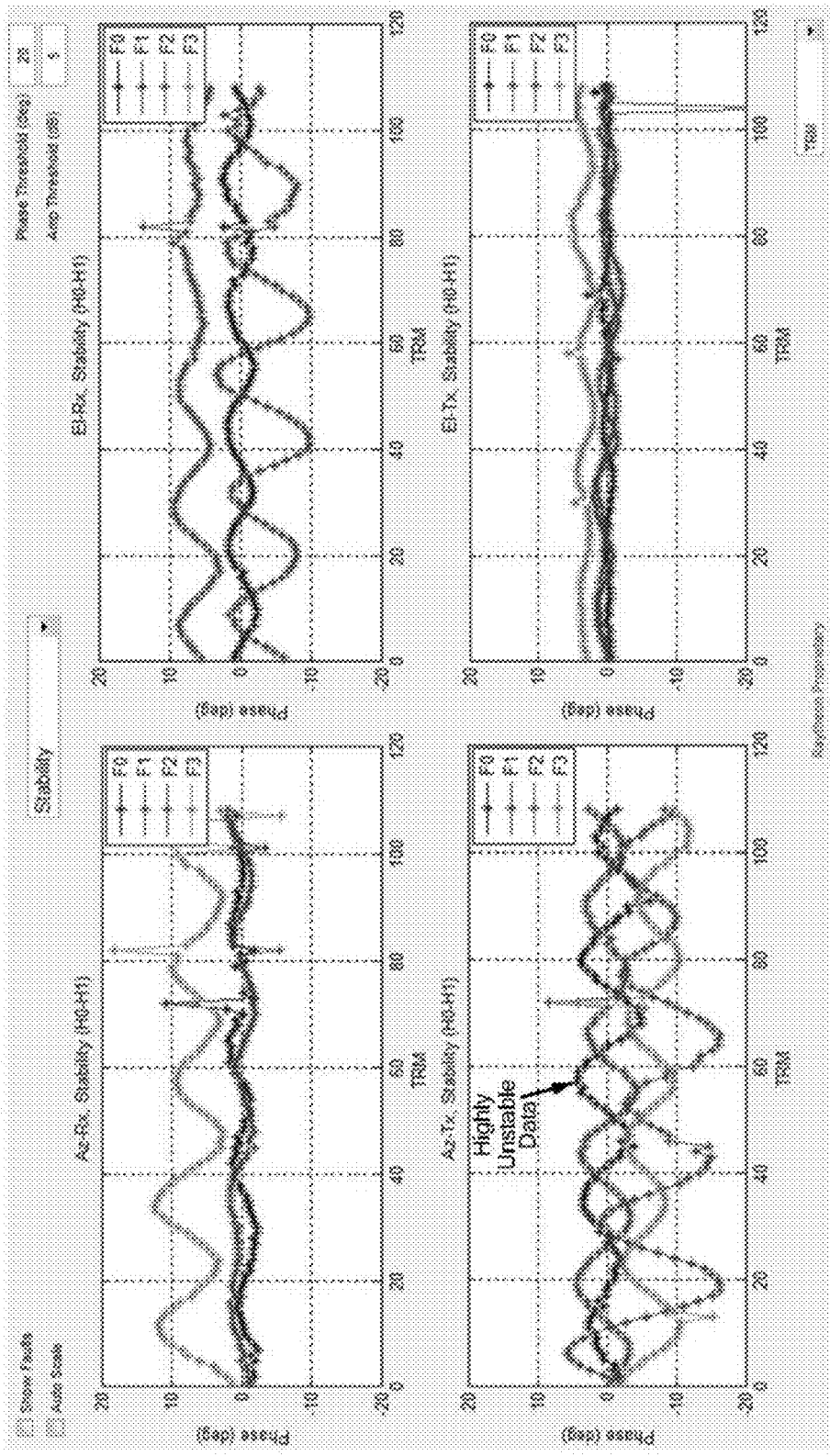
FIGS. 11A-11D are a user interface display of graphs showing exemplary stability phase test data, showing the difference between first and second samples of the same data set taken at a given time, to verify calibration data, in accordance with one embodiment.

For example, consider FIG. 11A, which is a graph of azimuth phase stability on the receive path (i.e., for antenna in receive mode) for the phased array antenna of FIG. 3 (with the second aperture covered with the RF absorber), for two different samples of data H0, H1. The expected data for phase, in this example, is a constant value, to within +−10 degrees, unless the TRM 24 that is associated with the phase also is failing in amplitude. For a TRM 24 failing in amplitude, unstable phase data is expected, as phase data is difficult to measure accurately for very low amplitude signals, and thus the results are unpredictable. As this graph shows, the phase data between sample sets is relatively stable for frequencies F0 and F1 with the exception of a few outliers, shown as discontinuities on the graph; the outliers occurred due to TRMs 24 falling in amplitude. The data at F3 for phase differs from the phase data at F0, but is itself stable as between the two samples of data, except for the outliers. As will be appreciated, an outlier in the data can be an indicator of a potential issue with one or more TRMs 24, and not movement in the test equipment itself, so the data is evaluated for trends that indicate such TRM issues. This is done at least two different times (i.e., in accordance with sample sets H0 and H1, as discussed below.)

Figures 12A, 12B, 12C, 12D:
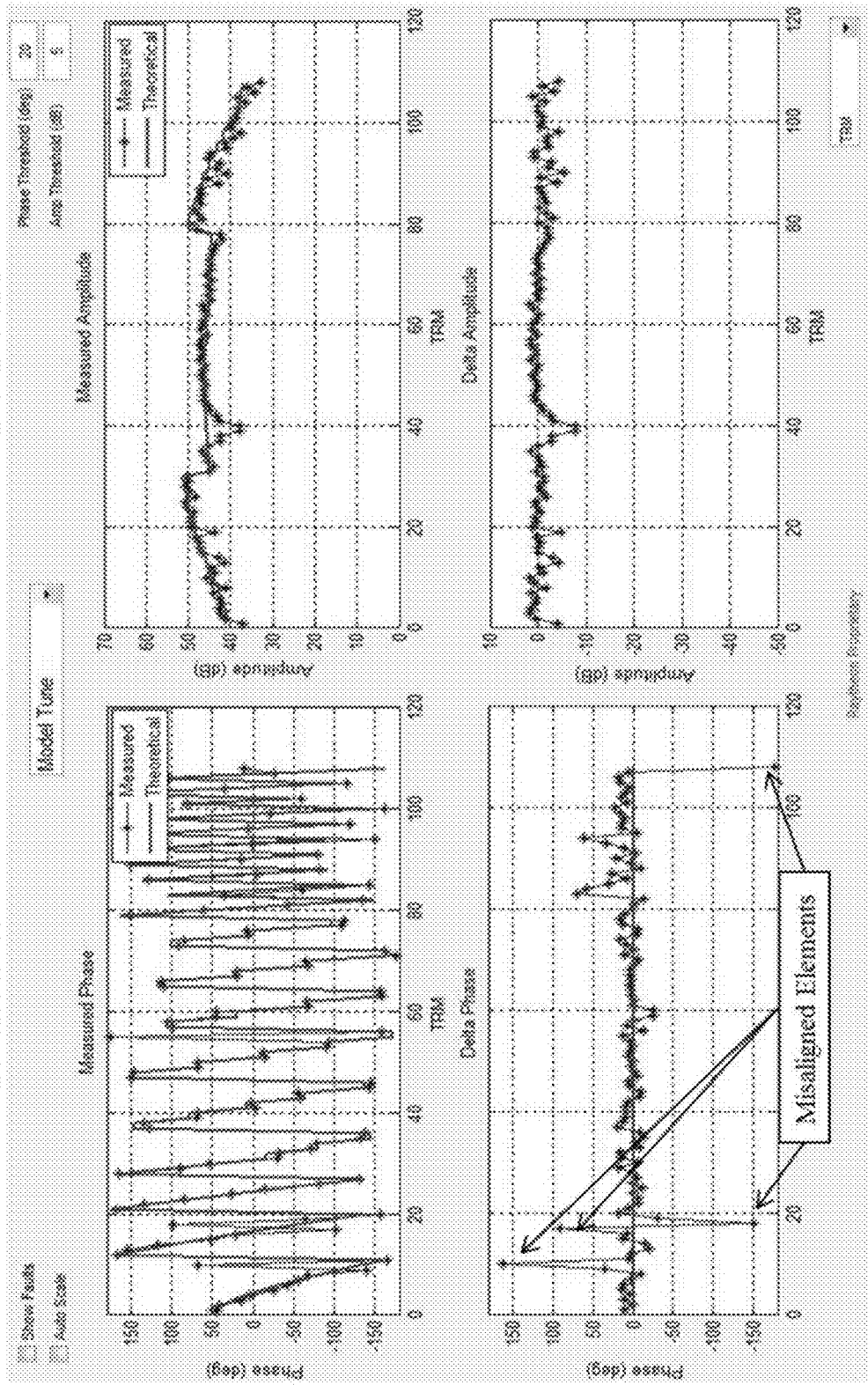
FIGS. 12A-12D are a user interface display of graphs showing exemplary model tune test data, showing a curve fit of measured amplitude and phase data to theoretical amplitude and phase data, in accordance with one embodiment.

Consider also FIGS. 12A-12D, which are part of a user interface display of graphs showing exemplary model tune test data, showing a curve fit of measured amplitude and phase data to theoretical amplitude and phase data, in accordance with one embodiment, showing unstable data in one plot. FIG. 12A is a graph of measured phase (graph with diamond dots) and theoretical phase (plain line) (i.e., the phase predicted by the model). FIG. 12C is a delta phase graph for the data of FIG. 12A, showing the differences between the measured phase and theoretical phase, across the array (i.e., the TRMs 24 along the x-axis), with suspected misaligned elements indicated.

As FIG. 12C shows, the measured phase tracks the theoretical (i.e., predicted) phase pretty closely except for several outliers. This comparison of FIGS. 12A and 12C also reinforces that the model is valid for predicting phase and that the predicted position of the calibration antenna 28 is accurate. This comparison in FIGS. 12A and 12C also shows that the model solver has calculated a position for the calibration antenna 28 close to where the calibration horn 28 has been measured to be. FIG. 12C also shows, via the anomalies/outliers in the delta phase data, that certain radiating elements are likely misaligned, as indicated in FIG. 12C (because the x-axis shows the radiating element being tested, in numerical order, it is possible to determine from FIG. 12C exactly which elements are misaligned.

Similarly, FIG. 12B is a graph of measured amplitude (in blue) and theoretical amplitude (in green), and FIG. 12D is a delta amplitude graph for the data of FIG. 12B, showing the differences between the measured amplitude and theoretical amplitude across the array. In the example delta amplitude graph of FIG. 12D, the measured amplitude tracks the predicted amplitude fairly closely, indicating that the model for amplitude is valid.

Referring again to FIGS. 7, 8 and 9, if the calibration algorithm model for theoretical amplitude or theoretical phase results in a conclusion that the model is not verified (is not a valid model—i.e., the answer at block 130 or block 587 is "No"), then, as noted above, the delta phase and or delta amplitude graph should reflect the inaccuracy, because the measured data will consistently differ from the theoretical curve for that respective type of data by a great deal. For example, if either or both of the model used to generate the predicted phase data (which results in the delta phase graph of FIG. 12C) and the model used to generate the predicted amplitude data (which result in the delta amplitude graph of FIG. 12D) were inaccurate, the graph of delta data in FIG. 12C and/or FIG. 12D would each show a line trending upwards, or in some other way would show a delta data curve indicating that the measured data differs significantly from the predicted/theoretical data, as can be appreciated.

If, at block 130 (or block 587), the model cannot be verified, an instruction is issued to indicate that the model is to be further adjusted (e.g., automatically or, in one embodiment, manually adjusted (block 140 of FIG. 7; block 591 of FIG. 8)). In one embodiment, a manual model tuner process (discussed farther below) can be used to further adjust the model until it can be verified. In one embodiment, the model tuner process is automated. For example, during model adjustment, whether automated or manual, the solved location of the calibration antenna is adjusted. As adjustments are made, the resulting changes in the corresponding model values (and/or the resulting differences between the model and measured values) can be viewed and/or analyzed dynamically. As FIGS. 12A-12D show, however, the measured, and theoretical data for the example array do not differ considerably for either amplitude or phase, so the model in this illustrative example can be considered to be verified (block 130—answer "Yes").

Referring to FIGS. 7 and 8, assume that the model that is generated (block 129) is not verified (block 130; block 587), and manual adjustments are employed (block 140; block 591). For example, in some instances (such as the elevation phase values of FIG. 9A-1 and the azimuth amplitude values of FIG. 9A-2), some manual tuning may be needed using a model tuner panel displayed on a user interface. For these cases, in at least some embodiments, model tuner parameters are adjusted so that the amplitude and phase delta curves follow a zero delta line (meaning, the values show as little delta as possible from theoretical values), excluding outliers. The following exemplary procedure explains how to use an exemplary FFC model tuner panel (which can be incorporated into a user interface) to improve the amplitude and phase model, if needed. All panels and selections can, for example, be presented to a user on a user interface, as will be appreciated, but this is not limiting. Further, in one embodiment, all options also can be part of an automated process, as will be appreciated.

Manual or Automated Model Tuner Process

1. Select the Phase Delta decision aid.
2. Select the Mode and Array data set for the plot that may need adjustment (if this step is being done manually, a user can use the Data Select panel to make these selections).
3. Based at least in part on an analysis of the plot that may need adjustment, if necessary, adjust Distance from Array (m). Increasing this value causes an increased bow (raised curve in center) for phase delta values in the center of the array.
4. Based at least in part on an analysis of the plot that may be needing adjustment, if necessary, adjust the Element Number of Cal. Increasing this value creates a clockwise tilt in phase values.
5. Repeat steps 3 and 4 until the phase data for the selected configuration is properly normalized.
6. Repeat steps 2 through 5 for at least some of the remaining configurations that may need adjustment.
7. Select the Amplitude Delta decision aid.
8. Using the Data Select panel, Select the Mode and Array data set that may need adjustment (if this step is being done manually, a user can use the Data Select panel to make these selections).
9. Adjust the Tilt Cal Horn (deg). Increasing this value creates a clockwise tilt in amplitude delta values.
10. Repeat steps 8 and 9 for at least some of the remaining configurations that may need adjustment.

It will be appreciated that the above manual or automated model tuner process can, in some embodiments, be implemented using a mix of automated and manual steps.

In one embodiment, the determination at block 130 that a model is verified (block 140) can be done by detecting whether the difference between the measured and theoretical data indicates that the FFC tool 90 has come to a good solution. In at least some embodiments, the standard fir a "good" solution is, preferably, a solution that minimizes, or at least decreases, variances between the theoretical data and the measured data. However, as will be appreciated, if an antenna 14 has a lot of misaligned elements (e.g., more than 50% misaligned), then the solver might not be able to minimize (or at least decrease) variance to a degree sufficient for a given application. Consequently, an instruction or other notification or report may be issued to a user telling the user to make manual adjustments to the model to minimize, or at least decrease, the variance as much as possible.

Thus, in one embodiment, the model solver makes its best attempt for an automatic determination of model validity, based on variance, and instructs a user, if necessary, to make manual adjustments (block 140 of FIG. 7; block 591 of FIG. 8). Then, the model is re-verified (block 130). For example, in block 140, if an antenna being tested has a lot of element failures (e.g., greater than a predetermined failure threshold, such as greater than 50% failures), such that it is not possible for measured data to come close to matching theoretical data, smaller adjustments in the model can be made to attempt to "theoretically" show a best it curve for the antenna elements that do not appear to be failing or out of alignment. In one embodiment, it may be possible to skip the verify model block 130 if the calibration antenna 28 has remained in the same spot from test to test without it moving (i.e., such that the model is predicting the correct geometrical location for the calibration antenna 28), but in at least some embodiments, it is advantageous to verify the model during each far field calibration.

Referring briefly to FIG. 8, if the model is verified at block 587, a check is made to see if at least some hardware (HW) failures exist that may require correction (block 589 of FIG. 8, similar to blocks 135 and 150 of FIG. 7). If failures that may require correction exist (answer is "yes" at block 589), then the hardware is replaced and the far-field calibration test is re-run (block 590). Once the model is verified and no hardware failures that require correction are present (as noted herein, some hardware faults may be permitted to remain uncorrected, in some instances), then in some embodiments, the model information is used to update the current beam steering tables (blocks 593 and 587) using information on selected TRMs that are known to require an adjustment (block 595). Reports (e.g., the one or more reports that can make up the output data 608 of FIG. 6) are also generated.

Figures 13A, 13B, 13C, 13D:
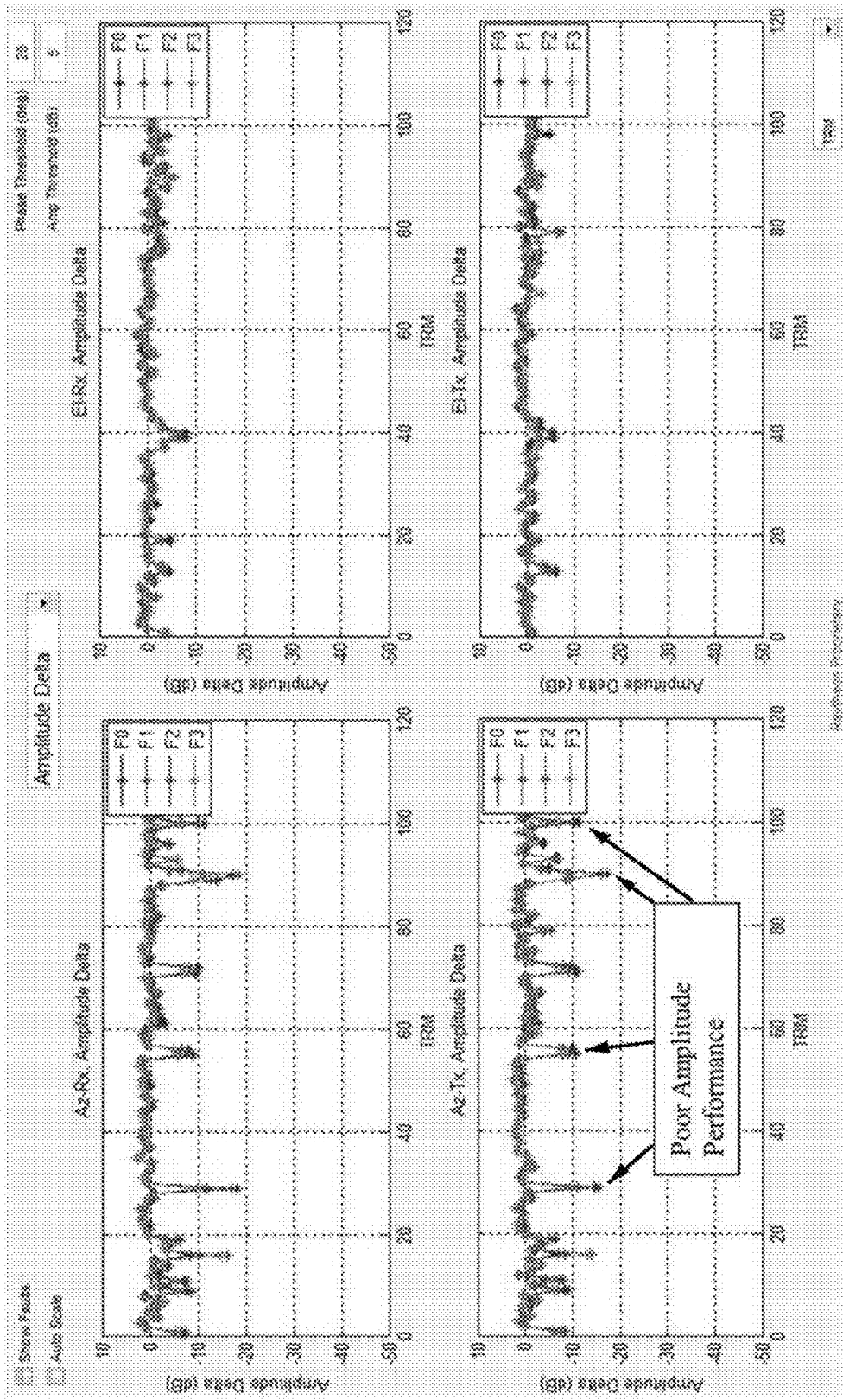
FIGS. 13A-13D are a user interface display of graphs showing exemplary amplitude model delta data for different measurement configurations, in accordance with one embodiment.

Referring again to FIG. 7, if the model is verified (block 130—answer is "Yes"; same as block 587 in FIG. 8 answer is "Yes"), TRM 24 failures, if any, are identified (block 135) and then a check is made of the far field data to see whether it indicates that there are at least some hardware amplitude failures (block 150) that may require correction. (Note that TRM 24 failures do not always, necessarily, require correction, although it is preferred, in at least one embodiment, that such failures are, at least, identified). In one embodiment, this can be done by further analyzing the differences in data between the predicted amplitude and the measured amplitude, at several frequencies, in both transmit and receive modes, for both azimuth and elevation apertures. For example, FIGS. 13A-13D are graphs that aggregate delta data (i.e., data showing the difference between what the amplitude model predicts and what is measured) for several antenna test configurations, including transmit (Tx) and receive (Rx) modes, azimuth and elevation apertures, and 4 different frequencies (F0 through F3), in accordance with one embodiment. For each frequency F0 through F3 in the graphs of FIGS. 13A through 13D, it can be seen that, with the exception of certain elements labeled in FIG. 13C as having poor amplitude performance (discussed further below) the amplitude model used to generate each delta data graph is relatively consistent in each mode (e.g., FIG. 13A—azimuth aperture, receive mode; FIG. 13B—elevation aperture, receive mode; FIG. 13C—azimuth aperture, transmit mode; FIG. 13D—elevation aperture, transmit mode).

As noted above, FIGS. 13A and 13C, illustrate examples of hardware amplitude failures (i.e., a "Yes" answer in block 150). In FIG. 13C, the outliers on the figure (labeled as "poor amplitude performance in FIG. 13C) show several of the antenna elements (i.e., the TRMs 24 shown along the x-axis) that exhibit poor amplitude performance, where the performance is poor beyond a predetermined threshold (which in the illustrative example of FIG. 13C happens to be 5 dB). Note that, per FIGS. 13A-13C, although additional elements also exhibit poor performance, the ones labeled as poor amplitude performance are amongst the worst performing ones. If analysis shows that poor amplitude performance is seen in the amplitude delta data (block 150, answer is "yes"), then an instruction is issued to replace at least a predetermined portion of the associated TRM(s) 24 (block 160) and then to rerun the far field calibration test (where the associated TRM(s) 24 can be found by looking along the x-axis, where the number along the x-axis where the failure data is corresponds to the number of the TRM 24 that could be replaced.

Some of the common failures that can result in faulty antenna components include, but are not limited to, defective TRMs 24, defective TRM output switches, damaged signal cables, and/or defective radiating elements 26. If there are a large number of repairs that may be needed, such repairs advantageously can be incorporated incrementally, with a phase calibration performed for each hardware change, but this is not required. This incremental repair and calibration process is done because, in at least some instances, FFC curve fitting as done in block 127 can degrade with antenna calibration. In one embodiment, amplitude deltas greater than 3 dB indicate a failure. This is the same threshold used during calibration at the Near Field Range. If all failures cannot be resolved through receive amplitude calibration adjustment, further antenna repairs may be needed, and further inspection for other issues (e.g., damaged cables or components, etc.) should be done.

As will be appreciated, amplitude failures that appear only in one aperture 27 could be caused by a bad radiator panel radiating element, damaged TRM output cable, or a faulty −2 type 2-pack switch. In the illustrative example of the PAR antenna 14, for single aperture failures, first determine if the TRM belongs to a −2 type (TRMs 1-30 or 79-108) or −1 type (TRMs 31-78). If the TRM belongs to a −1 2-pack 1014, the issue is likely a radiator panel issue that cannot be fixed at site. If the TRM 24 belongs to a −2 type 2-pack. 1014, and check the Off Array plot for the TRM 24. If there is a high measured amplitude for that TRM 24 in the "off" array, the cause is likely an output switch that is either fully or partially "stuck" to that array. The corrective action is to replace the corresponding 2-pack 1014. If not, the issue is likely a radiator panel or output cable issue that cannot be fixed at site.

If there is a failure in only one mode (e.g., for only receive mode), the issue might be resolved in the next FFC pass, through calibration. For TRMs 24 failing in receive only, compare the receive amplitude calibration with the corresponding amplitude delta using the FFC tool 90. If the amplitude calibration factor can be adjusted to make a particular failure pass within the failure threshold, the TRM 24 is not replaced because it will be adjusted in the next FFC phase during amplitude calibration. Note that decreasing the amplitude calibration factor will increase the amplitude by an equal amount and that (in one embodiment) the amplitude calibration factor has a range of 0-31.5 dB.

It should be noted that TRMs 24 located near the edges of the array 27 can have more attenuation already in place due to the Taylor weighting curve. This typically leaves more room to increase the receive amplitude for TRMs 24 near the edges of the array 27. If amplitude calibration will not resolve the failure, the issue should be resolved through 2-pack 1014 replacement. Losses seen only for only transmit or only for receive would likely be caused by a faulty TRM 24. For this case, losses are relative to other TRMs 24 and the only path unique for one mode that can cause this issue is internal to the TRM 24. The 2-pack 1014 corresponding to the faulty TRM 24 should be replaced in this case.

The steps of 110-150 are re-run as many times as needed to find and, if needed, replace all amplitude failures (i.e., in one embodiment, preferably until the answer at decision block 150 is "No"). FIG. 8 shows more detail about the data processing for FFC tool 90 of FIG. 7 that is repeated for all passes. Note that the decision block 150 looks for an answer to the question of whether there are hardware failures that "require" correction. It should be understood that, in at least some embodiments, not all amplitude failures (whether detected or not) need to be corrected before the ITC calibration method of FIG. 7 is able to move beyond this decision block to blocks 170 and/or 230 (discussed further herein). For example, if sufficient replacement modules are not available to perform all repairs, one option is to replace only some (but not all) of the amplitude failures. In further embodiments, it might be advantageous to ensure that at least some of the changes relating to amplitude (e.g., replacement of at least some failing modules) are performed/finished prior to phase calibration.

Referring again to FIG. 7, at step 150, once there are no more amplitude failures that are able to be corrected (or that may be required to be corrected) (i.e., the answer is "no"), far field data is checked to see if it shows that there is good amplitude calibration (block 170). In one embodiment, the standard for determining whether amplitude calibration is "good" involves using a special weighting (for lowering antenna sidelobes), where there is a weighting applied for receive mode only. The weighting is performed through use of a tapered attenuation, with increased attenuation for TRMs 24 near the edges of the array 27. An illustrative example of usable weighting is the aforementioned Taylor weighting, but the described embodiments are not so limited to this type of weighting.

In one embodiment, amplitude is calibrated for receive mode only, to apply Taylor weighting. These calibration factors are not frequency independent. This means that each TRM 24 has two amplitude calibration factors, one for the azimuth receive configuration and one for the elevation receive configuration. Amplitude calibration is applied via the TRM-adjustable attenuator 1026 (FIG. 1B), each of which has a range of 0-31.5 dB in 0.5 dB steps. TRMs 24 are automatically selected for calibration by entering an Amplitude Threshold at a user interface in the FFC tool 90 (an example threshold is 3 dB, but this is not limiting). If a TRM 24 fails this threshold for at least one of the four frequencies, the amplitude calibration factor is adjusted by the amplitude delta averaged across the four frequencies. Using the FFC tool 90, the two calibration files, Beam_pos_table_1.o and Beam_pos_table_2.o, are generated using these adjustments. Loading these files into a directory accessible to the radar computer 34 (and, if necessary, restarting the radar system 11) loads the new amplitude calibration values into the system.

As will be appreciated, it is possible to have a TRM 24 that is considered a "good" or "working" TRM 24, but still not have good amplitude calibration (i.e., the answer at block 170 is "no") in certain situations, such as if there is too much amplitude. If there is too much amplitude, an attenuation value along the transmit or receive path in the radar system can be adjusted (block 180, update/adjust amplitude calibration) to bring the amplitude down to a level that matches the amplitude in the model. That is, if amplitude calibration is not good (block 170 answer is "no"), for a given element 26, signal path compensation values are calculated for each element that is determined to be poorly calibrated (e.g., by comparing the difference between the model value and the measured value), and these signal path compensation values are used in block 160 to update the amplitude calibration information for that element. In one embodiment, amplitude calibration information is updated for at least some or all of the TRMs 24 that fail a predetermined threshold (e.g., 5 dB for amplitude, 20 degrees for phase).

The update amplitude calibration of block 180 receives certain inputs (representing either information that it updates/replaces or information that is affected by updating), as shown in FIG. 7. One input it receives, referred to in FIG. 7 as "selected TRMs" (block 210), corresponds to information as to which TRM(s) 24 has/have a calibration that requires adjustment of some kind, for whatever reason may be necessary. Another input corresponds to the block labeled "current amplitude calibration files" (block 220), which refers to the preexisting calibration files that were used when the far field calibration test was run at block 110. The pre-existing calibration files, in one embodiment, contain all the coefficients for all TRMS 24 (both failing and passing); and the coefficients associated with the TRMs 24 that are determined to be failing are changed. Those pre-existing calibration files are stored (as noted above) so as to be accessible to the radar system 11, especially its radar computer 34. As noted previously, whenever the phased array 14 is in actual use, the calibration files that are stored (to be accessible to the radar system 11) are what the radar system 11 uses during operation. These preexisting amplitude calibration files, termed "current amplitude calibration files 220" in FIG. 7, will be updated and/or replaced, as applicable, with new information that correctly sets the amplitude calibration (block 180). In one embodiment, the values for some or all of the failing TRMs 24 are updated.

In at least some embodiments, another amplitude calibration pass (e.g., proceeding from block 190 back through to block 110, etc.,) might be needed if expected results are not achieved (i.e. calibrated TRMs 24 are not within a predetermined limit, e.g., +/−3 dB in receive mode). One possible issue that might appear in this phase is a problem with the TRM-adjustable attenuator 1026. Other tests can be used to identify adjustable attenuator 1026 problems, especially if adjustable attenuator 1026 shills are not consistent across TRMs 24. If there is a problem with a TRM's adjustable attenuator 1026, the corresponding 2-pack 1014 should be replaced and the FFC method of FIG. 7 should attempt to locate further hardware amplitude failures (block 150).

After the updated calibration data step (block 180) is complete, new calibration files are generated (block 190), reports are generated (blocks 195 and 235 (when all calibration is good) in FIG. 7 and block 594 in FIG. 8) (e.g., any one or more of the reports 608 in FIG. 6), and these new calibration files are provided (e.g., via file transfer protocol (FTP)) back to the phased array system (block 200), where they are stored in a location accessible to the radar computer 34, and the process restarts at block 110, re-running and updating the model and/or the calibration files, as needed, until it is complete (block 240).

Returning to the check for good amplitude calibration (block 170), if the calibration is good (i.e., answer at block 170 is "yes"), then the method proceeds to a check for whether phase calibration is good (block 230). If phase calibration is good, a final report is generated (block 235) and then the far field calibration process is complete (block 240), and no re-running or updating of calibration files occurs. Once the process has reached block 240, there is no need to generate a new set of calibration files or adjust the model, so the calibration files that were used to run the test (i.e., the pre-existing/current calibration files) can remain in the location accessible to the radar computer 34. Thus, reaching block 240 indicates the end of the far field calibration method 90 of FIG. 7.

If, however, the check of good phase calibration (block 230) shows that phase calibration is not good answer at block 230 is "no"), then the method proceeds to block 250, update phase calibration. The standard for whether phase calibration is good, in one embodiment, involves checking the difference between the model phase and measured phase. For example, in one embodiment, the FFC tool 90 looks for phase deltas outside of the range of +/−20 degrees. FIGS. 14A-14D are graphs showing exemplary phase model delta data for different measurement configurations that use the +/−20 degree threshold, for the test setup of FIG. 3, in accordance with one embodiment.

In at least one embodiment, phase calibration factors are unique for all combinations of aperture, mode, and frequency, giving a total of 16 phase calibration factors for each TRM 24. Phase calibration is applied by the TRM phase shifters 1024 (FIG. 1B), which, in one exemplary embodiment, have a range of 0-357.1875 degrees in 2.8125 degree steps. TRMs 24 are selected for phase by entering a phase threshold at a user interface in the FFC tool 90 (an example threshold is 20 degrees, but this is not limiting). The phase calibration performed in the Near Field Range uses a phase threshold of 20 degrees. Advantageously, the correct radar system frequencies are selected in the FFC tool 90 prior to generating these files. The FFC tool 90 assumes that the original radar system calibration was performed using the correct radar system frequencies.

Using the FFC tool 90, the calibration files Beam_pos_table_1.o, Beam_pos_table_2.o, and Coupling_data.o are generated using these adjustments. Loading these files onto the radar computer 34 and restarting the radar system 11 loads the new phase calibration values into the system. If there are any existing amplitude failures at this point (due, for example, to faulty radiator panels or lack of replacement parts) then the TRM(s) 24 affected by those failures are likely to not reliably calibrate for configurations failing in amplitude due to low SNR.

Referring again to FIG. 7, during the check of phase calibration at block 230, one example of a situation that could result in or cause a bad phase calibration could occur if a TRM 24 is previously replaced (i.e., back in block 160) and its phase performance differs significantly (e.g., having a phase difference greater than a predetermined limit, such as +/−20 degrees) from that of the other modules. Another example of a situation that could cause or result in bad phase calibration could be if a rigid cable in the radar system 11 has a bend or kink in it. Other conditions can result in a phase calibration not meeting the standard, such as certain environmental conditions (e.g., high winds) that might cause movement of the phased array antenna 14 during test. Some extreme weather conditions may also be a factor for some types of phased array antennas, as will be understood.

Another phase calibration pass through blocks 110 through 280 might be needed if expected results are not achieved (i.e. previously calibrated. TRMs 24 also passing in amplitude are not phase calibrated within a predetermined threshold, such as +/−20 degrees). Similar to amplitude calibration, an issue that might appear in this set of passes through the blocks 110 through 180 is a problem with a TRM phase shifter 1024. Again, other tests, such as radar system phase/attenuation tests (as are known in the art) can be used at this point to identify problems in the phase shifters 1026. For example, when plotted, an exemplary phase/attenuation test displays 118 degree and 239 degree adjustable phase shifts. If there is a problem with a TRM's 24 phase shifter 1026, the corresponding 2-pack 1014 should be replaced and the FFC process 90 should return to block 110.

Referring again to FIG. 7, the update phase calibration of block 250 receives certain inputs (representing either information that it updates/replaces or information that is affected by updating), as shown in FIG. 7. One input it receives, referred to in FIG. 7 as "selected TRMs" (block 260), corresponds to information as to which TRM(s) 24 has/have a calibration that requires adjustment of some kind, for whatever reason may be necessary. Another input corresponds to the block labeled "current phase, calibration files" (block 270), which refers to the pre-existing calibration files that were used when the far field calibration test was run at block 110. The pre-existing calibration files, in one embodiment, contain all the coefficients for all TRMS 24 (both failing and passing); and the coefficients associated with the TRMs 24 that are determined to be failing are changed. As with the amplitude calibration files, the pre-existing phase calibration files are stored so as to be accessible to the radar system 11, especially its radar computer 34. As noted previously, whenever the phased array 14 is in actual use, the calibration files that are stored (to be accessible to the radar system 11) are what the radar system 11 uses during operation. These pre-existing phase calibration files, termed "current phase calibration files 270" in FIG. 7, will be updated and/or replaced, as applicable, with new information that correctly sets the phase calibration (block 280). In one embodiment, some or all of the values for failing TRMs 24 are updated.

After the updated calibration data step (block 250) is complete, new phase calibration files are generated (block 280), reports are generated (block 195), and these new phase calibration files are provided (e.g., via file transfer protocol (FTP)) back to the phased array system (block 200), where they are stored in a location accessible to the radar computer 34, and the process restarts at block 110, re-running and updating the model and/or the calibration files, as needed, until it is complete (block 240).

Based on the computations in blocks 550 through 585, sufficient information is generated to help determine whether the model (of the calibration setup 10, including precise location of the calibration antenna 28) is valid (block 580). The FFC tool. 90 generates one or more decision aid plots, as described herein. Referring to FIGS. 6-8, the information that is generated to help determine whether the model is valid, along with the decision aid information, is provided as one or more reports (block 195 of FIG. 7 and block 594 of FIG. 8) (see, e.g., the reports of output data 608 in FIG. 6). The one or more reports are combined with imported far field data (block 120 of FIG. 7). Model validation is completed prior to generation of the reports (see FIG. 8). and is provided to the verify model decision block 130 of FIG. 7.

Regarding the reports that can be generated, in various embodiments, known types of data export options allow FFC data to be saved to different types of files for reports, archiving, and data sharing. Data export options can be used during one or more of the multiple process steps of calibration to reproduce the decision aids that were used during the calibration process. For example, in one illustrative report, calibration data is exported in tabular form to a spreadsheet, such as a MICROSOFT EXCEL spreadsheet, where the spreadsheet data includes receive mode attenuation and bore site phase shifter commands. In a farther illustrative report, the spreadsheet data can include (but is not limited to) some or all of:

list of failed 2 pack 1014 devices list showing percentage of TRMs 24 that "Pass" amplitude and/or phase criteria list of some or all of the phase and amplitude model parameters used for calibration list of differences between the model and measured amplitude values list of phase wrapped differences between the model and measured phase values list of the last chosen calibration updates to the beam position tables graphical figures generated by the FFC tool, including some or all of the decision aid graphs/plots discussed herein.

Referring to FIG. 8, the verify model step (block 587) is identical to block 130 of FIG. 7. If the calibration data (along with the other information described above) shows that the model is not verified, then manual model adjustments are made (block 591) and the model is regenerated (block 585). If the model is verified (answer at block 587 is "yes") then, if necessary, amplitude and/or phase calibration is adjusted (block 596) and another data pass begins at block 510 of calibration is adjusted) and the beam steering stables are updated (block 593) to reflect the calibration changes. The beam steering tables, as is understood in the art, may contain the amplitude calibration values and the phase commands for some or all of the beam angles. The phase calibration values are applied to all of the phase commands. When the beam is pointed to bore site (straight forward), the phase commands are equal to the phase calibration values. In one embodiment, the phase commands in the beam steering tables are updated only if a TRM 24 is failing the phase tolerance (0+/−20 degrees). If the TRM 24 is failing phase tolerance, the phase commands are shifted by the phase delta (difference between model phase and measured phase, phase wrapped to the range of 0-360 degrees).

One input to the update beam steering tables block 592 is the selected TRMs (block 595 in FIG. 8, blocks 210 and 260 in FIG. 7), which correspond to information indicating, based on the phase and amplitude data of block 510, which TRM(s) 24 have a beam steering table that requires adjustment of some kind. Selected TRMs 24 come from failures that are identified by the FFC tool 90 (see block 135 in FIG. 7). The current (i.e., pre-existing) beam steering table (block 597) for those respective TRM(s) 24 is accessed and updated, as needed, with updated beam steering information, based on the verified model.

After the beam steering tables are updated (block 593), they are updated and exported to the radar computer 11, where they are used during operation/calibration of the radar system 11.

In the Figures of this application, in some instances, a plurality of system elements or method blocks may be shown as illustrative of a particular system element, and a single system element or method block may be shown as illustrative of a plurality of a particular systems elements or method blocks. It should be understood that showing a plurality of a particular element or block is not intended to imply that a system or method implemented in accordance with one or more of the described embodiments must comprise more than one of that element or block, nor is it intended by illustrating a single element or block that the described embodiments are limited to embodiments having only a single one of that respective elements or blocks. In addition, the total number of elements or blocks shown for a particular system element or method is not intended to be limiting. As will be appreciated, the number of a particular system element or method blocks can, in some instances, be selected to accommodate the particular user needs.

Also in the Figures, for drawings, flow charts, and/or flow diagrams illustrating methods or processes, rectangular blocks are "processing blocks" that can represent one or more instructions (or groups of instructions), such as computer software instructions. The diamond shaped blocks are "decision blocks," that one or more instructions (or groups of instructions), such as computer software instructions, that affect the execution of the computer software instructions represented by the processing blocks. Alternatively, the processing and decision blocks represent actions performed by functionally equivalent circuits such as a digital signal processor circuit, a microcontroller, or an application specific integrated circuit (ASIC). Further, actions and blocks can be implemented using combinations of hardware and software.

The drawings, flow charts, block diagrams, and flow diagrams provided herein do not depict the syntax of any particular programming language. Rather, the drawings, flow charts, block diagrams, and flow diagrams flow illustrate the functional information that may be usable to fabricate circuits and/or to generate computer software to perform the processing. Note that many routine program elements, such as initialization of loops and variables and the use of temporary variables are not shown. Unless otherwise indicated herein, the particular sequence of steps described is illustrative only and can be varied without departing from the spirit of the described embodiments. Thus, unless otherwise stated the steps described herein are unordered meaning that, when possible, the steps can be performed in any convenient or desirable order.

Additionally, the software used to implement all or part of the described embodiments may be embodied in a computer program product that includes a computer useable medium. For example, such a computer usable medium can include a readable memory device, such as a hard drive device, a memory card, a CD-ROM, a DVD-ROM, a universal serial bus (USB) storage device, an optical storage device, a computer diskette, and the like, having computer readable program code segments stored thereon. The computer readable medium can also include a communications link, either optical, wired, or wireless, having program code segments carried thereon as digital or analog signals.

In describing and illustrating the embodiments herein, in the text and in the figures, specific terminology (e.g., language, phrases, product brands names, etc) is used for the sake of clarity. These names are provided by way of example only and are not limiting. The embodiments described herein are not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, elements, circuits, modules, tables, software modules, systems, etc. Such terminology used herein, however, is for the purpose of description and not limitation.

Although the embodiments included herein have been described and pictured in an advantageous form with a certain degree of particularity, it is understood that the present disclosure has been made only by way of example, and that numerous changes in the details of construction and combination and arrangement of parts may be made without departing from the spirit and scope of the described embodiments.

Having described and illustrated at least some the principles of the technology with reference to specific implementations, it will be recognized that the technology and embodiments described herein can be implemented in many other, different forms, and in many different environments. The technology and embodiments disclosed herein can be used in combination with other technologies. In addition, all publications and references cited herein are expressly incorporated herein by reference in their entirety.

The invention claimed is:

1. A system for calibrating an array antenna, the system comprising:
  a calibration antenna positioned at a first location relative to the array antenna, and operably configured to be used as part of a far field test conducted on the array antenna, wherein the first location corresponds to an estimate of an actual location of the calibration antenna relative to the array antenna;
  a first set of calibration files usable during at least one of calibration and operation of the array antenna; and
  a processor in operable communication with the array antenna, the first set of calibration files and the calibration antenna, the processor accessing a memory storing instructions that, when executed, configure the processor to:
    (a) generate a model of a predicted calibration configuration of the calibration antenna and the array antenna, the model based at least in part on the first location, the first set of calibration files, and a first set of received far field test data generated during a first far field data test run using the first set of calibration files, wherein the model defines a predicted calibration configuration comprising information related to a prediction of the actual location for the calibration antenna relative to the array antenna during the first far field calibration test;

(b) adjust the model, if necessary, based at least in part on comparing a set of predicted far field test data generated using the model with the first set of received far field test data, the adjustment of the model configured to decrease at least a portion of a difference between at least a portion of the predicted set of far field data and the corresponding portion of the first set of received far field data; and (c) generate, based at least in part on the model, a second set of calibration files usable to replace at least a portion of the first set of calibration files.

2. The system of claim 1, wherein the instructions further configure the processor to identify, based at least in part on at least one of the model, the first set of received far field test data, and the predicted set of far field test data, whether one or more hardware components of the antenna array require at least one of replacement and adjustment.

3. The system of claim 1, wherein, if at least one hardware component of the antenna array is adjusted or replaced, the instructions further cause the far field data test to be repeated using the second set of calibration files in place of at least a portion of the first set of calibration files; to result in a second set of far field data, and wherein the instructions further configure the processor to repeat steps (a) through (c), using the second set of far field data and the second set of calibration flies, to adjust, if necessary, the first model, and to adjust, if necessary, the second set of calibration files.

4. The system of claim 1, wherein the instructions further configure the processor to remove at least one outlier from the received far field data results before generating the first model.

5. The system of claim 1, wherein the array antenna comprises a plurality of antenna elements and wherein the model is generated based at least in part using an assumption that a predetermined portion of the antenna elements having substantially good calibration.

6. The system of claim 1, wherein the instructions further configure the processor to:
   identify at least one outlier in first set of received far field test data, the outlier comprising at least one of an amplitude outlier, a phase outlier, and a frequency outlier; and
   determine, based at least in part on the identified outlier, whether one or more hardware components that comprise the antenna array require either replacement or adjustment.

7. The system of claim 1, wherein;
   the prediction of the actual location comprises an approximate predetermined position, within a predetermined model range of positions; and
   the model is based at least in part on determining a position, within the predetermined model range of position, where at least a portion of a set of received far field test data for that position best matches to a corresponding portion of predicted far field test data for that position.

8. A system for calibrating an array antenna, the system comprising:
   a calibration antenna positioned at an actual location relative to an array antenna, the calibration antenna operably configured to be used as part of a far field test data test conducted on the array antenna;
   a first set of calibration files usable during at least one of calibration and operation of the array antenna; and
   a processor in operable communication with the first set of calibration files and further in operable communication with and operable control of the array antenna and the calibration antenna, wherein the actual location of the calibration antenna is not known to the processor, the processor accessing a memory storing instructions that, when executed, configure the processor to:
   analyze a set of received far field data test generated during a far field data test, to determine if one or more data outliers exist and, if necessary, to remove at least one outlier from the far field test data results, to generate a set of processed received far field test data;
   generate, based at least in part on the set of processed received far field test data, one or more curves that approximately match the set of processed received far field test data;
   generate, based at least in part on the one or more curves, a first model corresponding to a second calibration configuration of the calibration antenna and array antenna, the second calibration configuration comprising information related to a predicted location for the calibration antenna, the predicated location corresponding substantially to the actual location of the calibration antenna during the far field data test;
   generate, based at least in part on the first model, a set of predicted far field data results;
   generate a second model for an actual position of the calibration antenna, the second model based at least in part on a comparison between at least a portion of the received far field data results and at least a portion of the set of predicted far field data results;
   modify the second model, if necessary, to ensure that the at least a portion of the set of predicted far field test data correlate, within a predetermined threshold, with the set of processed received far field test data;
   generate, based at least in part on the second model, a second set of calibration files usable during operation of the array antenna; and
   replace at least a portion of the first set of calibration files with the second set of calibration files.

9. The system of claim 8, wherein the instructions further configure the processor to:
   identify at least one outlier in the set of received far field test data, the outlier comprising at least one of an amplitude outlier, a phase outlier, and a frequency outlier; and
   identify, based at least in part on the identified outlier, at least one hardware component in the antenna array requiring either replacement or adjustment.

10. The system of claim 8, wherein
    the predicted location comprises an approximate predetermined position, within a predetermined model range of positions; and
    at least one of the first and second models for the actual position of the calibration antenna is based at least in part on finding a position within the predetermined model range of positions, where at least a portion of the set processed received far field test data for that position best matches to a corresponding portion of predicted far field test data for that position.

11. The system of claim 8, wherein the instructions configure the processor to update at least one of the first model, second model, and the second set of calibration files if a hardware component of the array antenna has been replaced or adjusted.

12. A method of calibrating an array antenna, the method comprising;

(a) receiving, at a processor in operable communication with an array antenna and a calibration antenna, a set of far field test data resulting from a far field calibration test run on the array antenna using the calibration antenna, the set of received far field test data comprising data measured using a calibration configuration comprising:
   a first set of calibration data files used during at least one of array antenna calibration and operation; and
   the calibration antenna positioned at a first location relative to the antenna array, the first location comprising an actual location that is unknown to the processor;
(b) processing the set of received far field data to remove at least one outlier from the set of received far field test data, resulting in a set of processed received far field test data;
(c) generating a model based at least in part on the set of processed received, far field test data, the model corresponding to a second calibration configuration of the calibration antenna and array antenna, the second calibration configuration comprising information related to a predicted location for the calibration antenna, the predicated location corresponding substantially to the actual location of the calibration antenna during the far field data test;
(d) generating, based at least in part on the model, a set of predicted far field test data;
(e) modifying the model, if necessary, based at least in part on a comparison between at least a portion of the set of processed received far field data and at least a portion of the set of predicted far field test data, wherein the modification is configured to reduce a difference between at least a portion of the processed received far field test data and at least a portion of the predicted far field test data to within a predetermined threshold; and
(f) generating, based at least in part on the model, a second set of calibration files usable to replace at least a portion of the first set of calibration files.

13. The method of claim 12, wherein processing the set of received far field test data to remove at least one outlier further comprises:
(b-1) identifying at least one outlier in the set of received far field test data, the outlier comprising at least one of an amplitude outlier, a phase outlier, and a frequency outlier; and
(b-2) determining, based at least in part on the identified outlier, whether one or more hardware components that comprise the antenna array require either replacement or adjustment.

14. The method of claim 12, wherein if a hardware component in the array antenna is determined to have been replaced or adjusted, then the method further comprises:
(g) causing the far field data test to be repeated using the second set of calibration files to replace at least a portion of the first set of calibration files; and
(h) repeating steps (a) through (f).

15. The method of claim 14, wherein step (h) further comprises repeating steps (a) through (f) until at least a predetermined portion of the hardware components requiring replacement or adjustment have been replaced or adjusted.

16. The method of claim 14, wherein step (h) farther comprises repeating steps (a) through (f) until at least one of the following conditions is satisfied:
amplitude and phase measurements within the set of processed received far field test data substantially match amplitude and phase measurements that are predicted based on the second model;
measured amplitude results in the set of processed received far field test data show adequate gain and substantially no saturation;
when two different sets of far field test data are compared, there is substantially no phase data oscillation; and
when two different sets of processed received far field test data are compared, phase drift does not exceed a predetermined limit.

17. The method of claim 12, wherein;
the predicted location comprises an approximate predetermined position, within a predetermined model range of positions; and
the model is based at least in part on finding a position, within the predetermined model range of positions, where at least a portion of the set of processed received far field test data for that position best matches to a corresponding portion of predicted far field test data for that position.

18. The method of claim 12, wherein the array antenna comprises a plurality of antenna elements and wherein the model is generated based at least in part using an assumption that a predetermined portion of the antenna elements have substantially good calibration.

19. The method of claim 18, wherein the predetermined portion comprises at least half of the antenna elements.

20. The method of claim 12, wherein the generation of the model is further based at least in part on at least one of:
(d-1) the predicted location of the calibration antenna;
(d-2) a predetermined distance between the calibration antenna and the may antenna; and
(d-2) a predetermined distance between individual elements in the antenna array.

* * * * *